United States Patent
Desoli et al.

(10) Patent No.: US 11,740,870 B2
(45) Date of Patent: Aug. 29, 2023

(54) CONVOLUTIONAL NETWORK HARDWARE ACCELERATOR DEVICE, SYSTEM AND METHOD

(71) Applicants: STMICROELECTRONICS S.R.L., Agrate Brianza (IT); STMicroelectronics International N.V., Geneva (CH)

(72) Inventors: Giuseppe Desoli, San Fermo Della Battaglia (IT); Thomas Boesch, Rovio (CH); Carmine Cappetta, Battipaglia (IT); Ugo Maria Iannuzzi, Milan (IT)

(73) Assignees: STMICROELECTRONICS S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 274 days.

(21) Appl. No.: 16/833,353

(22) Filed: Mar. 27, 2020

(65) Prior Publication Data
US 2020/0310758 A1   Oct. 1, 2020

Related U.S. Application Data

(60) Provisional application No. 62/826,781, filed on Mar. 29, 2019.

(51) Int. Cl.
*G06F 7/544* (2006.01)
*G06N 3/04* (2023.01)

(52) U.S. Cl.
CPC ............ *G06F 7/5443* (2013.01); *G06N 3/04* (2013.01)

(58) Field of Classification Search
CPC .................. G06F 7/5443; G06N 3/04
See application file for complete search history.

(56) References Cited

U.S. PATENT DOCUMENTS

| | | | |
|---|---|---|---|
| 5,084,834 A | 1/1992 | Hartley et al. | |
| 5,422,983 A * | 6/1995 | Castelaz | G06N 3/063 706/42 |

(Continued)

FOREIGN PATENT DOCUMENTS

JP    9-198373 A    7/1997

OTHER PUBLICATIONS

Arrigoni et al., "Approximate operations in Convolutional Neural Networks with RNS data representation," European Symposium on Artificial Neural Networks, Computational Intelligence and Machine Learning, Apr. 26-28, 2017, Bruges, Belgium, 6 pages.

(Continued)

*Primary Examiner* — Michael D. Yaary
(74) *Attorney, Agent, or Firm* — Seed Intellectual Property Law Group LLP

(57) ABSTRACT

A Multiple Accumulate (MAC) hardware accelerator includes a plurality of multipliers. The plurality of multipliers multiply a digit-serial input having a plurality of digits by a parallel input having a plurality of bits by sequentially multiplying individual digits of the digit-serial input by the plurality of bits of the parallel input. A result is generated based on the multiplication of the digit-serial input by the parallel input. An accelerator framework may include multiple MAC hardware accelerators, and may be used to implement a convolutional neural network. The MAC hardware accelerators may multiple an input weight by an input feature by sequentially multiplying individual digits of the input weight by the input feature.

28 Claims, 50 Drawing Sheets

(56) References Cited

U.S. PATENT DOCUMENTS

| | | | |
|---|---|---|---|
| 5,867,601 A | 2/1999 | Phillips | |
| 8,645,450 B1 | 2/2014 | Choe et al. | |
| 10,372,416 B2 | 8/2019 | Fais et al. | |
| 2018/0121796 A1* | 5/2018 | Deisher | G06N 3/0472 |
| 2018/0341495 A1* | 11/2018 | Culurciello | G06N 5/046 |
| 2019/0042199 A1* | 2/2019 | Sumbul | G11C 11/404 |
| 2020/0192726 A1* | 6/2020 | Joo | G06N 3/0454 |

OTHER PUBLICATIONS

Bipin, "Design and Implementation of a Multiplier Using Regular Partial Product," Master's dissertation, Thapar University, Patiala, India, Jul. 2013, 56 pages.

Chang et al., "Design and Implementation of Low-Power Digit-Serial Multipliers," IEEE International Conference on Computer Design, Oct. 12-15, 1997, Austin, Texas, 10 pages.

Chang et al., "Low-Power Digital-Serial Multipliers," IEEE International Symposium on Circuits and Systems, Jun. 12, 1997, Hong Kong, 4 pages.

Desoli et al., "A 2.9TOPS/W Deep Convolutional Neural Network SoC in FD-SOI 28nm for Intelligent Embedded Systems," IEEE International Solid-State Circuits Conference, Feb. 5-9, 2017, San Francisco, California, pp. 238-240.

Dumoulin et al., "A guide to convolution arithmetic for deep learning," arXiv:1603.07285v2, 2018, 31 pages.

Fayed et al., "A Novel Architecture for Low-Power Design of Parallel Multipliers," IEEE Computer Society Workshop on VLSI 2001. Emerging Technologies for VLSI Systems, Apr. 19-20, 2001, Orlando, Florida, 6 pages.

Goodfellow et al., *Deep Learning*, MIT Press, Cambridge, Massachusetts, 2016, 705 pages.

Gupta et al., "Deep Learning with Limited Numerical Precision," arXiv:1502.02551, 2015, 10 pages.

Gysel, "Ristretto: Hardware-Oriented Approximation of Convolutional Neural Networks," Master Thesis, Bern University, Bern, Switzerland, 2012, 73 pages.

Hartley et al., *Digit-Serial Computation*, Springer Science & Business Media, LLC, New York, New York, 1995, 312 pages.

Hashemi et al., "Understanding the Impact of Precision Quantization on the Accuracy and Energy of Neural Networks," arXiv:1612,03940v1, 2016, 6 pages.

Kapasi et al., "Programmable Stream Processors," *Computer* 36(8):54-62, 2013.

Karpathy, "CS23 in Convolutional Neural Networks for Visual Recognition," downloaded on Mar. 31, 2020 from https://cs231n.github.io/, 112 pages.

Krizhevsky et al., "ImageNet Classification with Deep Convolutional Neural Networks," Advances in Neural Information Processing Systems 25, Dec. 3-6, 2012, Lake Tahoe, Nevada, 9 pages.

Lecun et al., "Gradient-Based Learning Applied to Document Recognition," *Prioceedings of the IEEE* 86(11):2278-2324, 1998.

Mrazek et al., "Design of Power-Efficient Approximate Multipliers for Approximate Artificial Neural Networks," 2016 IEEE/ACM International Conference on Computer-Aided Design, Nov. 7-10, 2016, Austin, Texas, 7 pages.

Parhi, "A Systemic Approach for Design of Digit-Serial Signal Processing Architectures," *IEEE Transactions on Circuits and Systems* 38(4):358-375, 1991.

Perry, "David Patterson Says It's Time for New Computer Architectures and Software Languages," published online on Sep. 17, 2018, at https://spectrum.ieee.org/view-from-the-valley/computing/hardware/david-patterson-says-its-time-for-new-computer-architectures-and-software-languages, downloaded on Mar. 31, 2020, 2 pages.

Shinde et al., "Clock Gating—A Power Optimizing Technique for VLSI Circuits," Annual IEEE India Conference, Dec. 16-18, 2011, Hyderabad, India, 4 pages.

Sze et al., "Efficient Processing of Deep Neural Networks: A Tutorial and Survey," arXiv:1703.09039v2, 2017, 32 pages.

\* cited by examiner

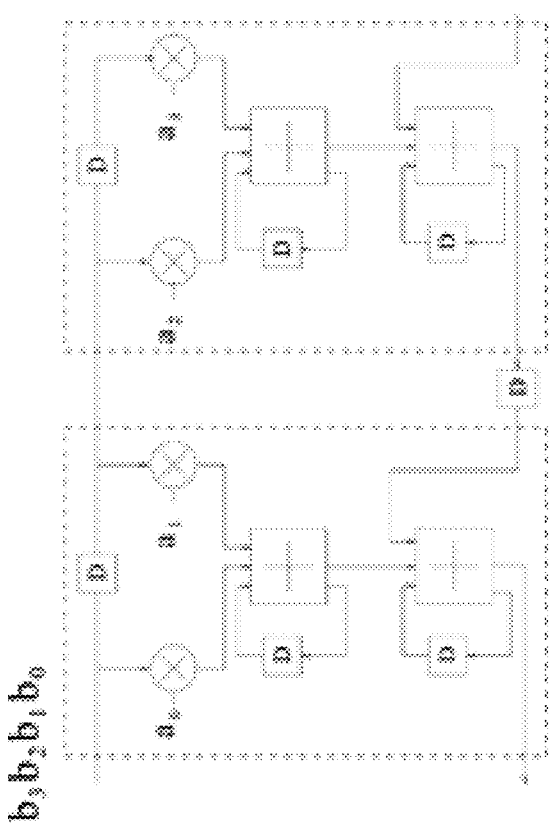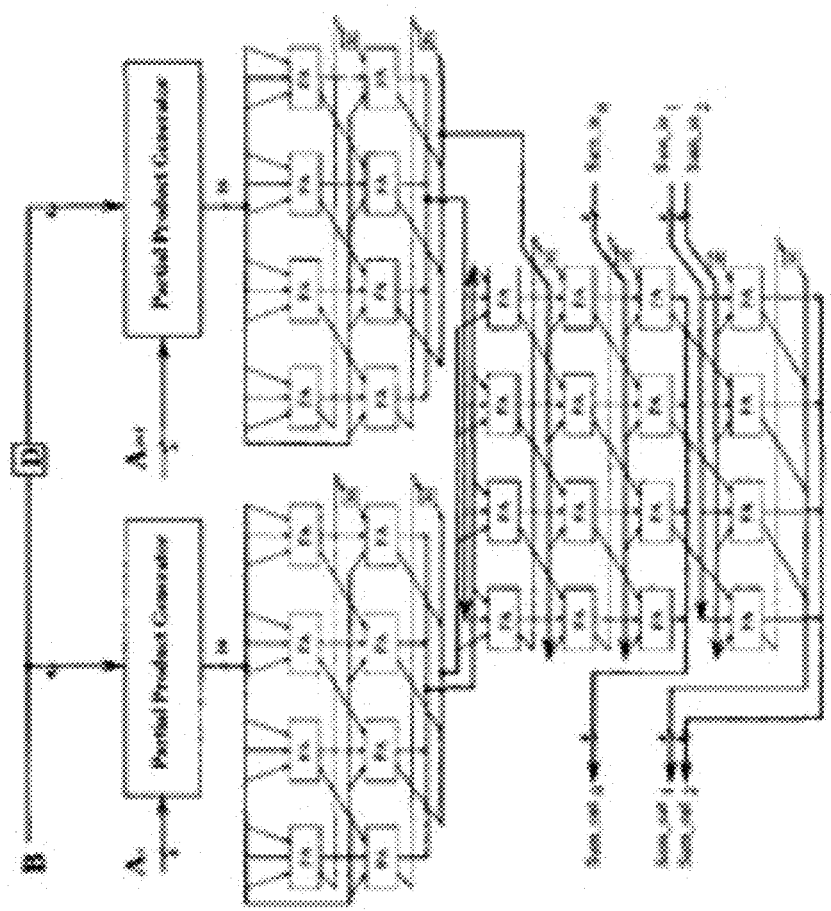
FIG. 26

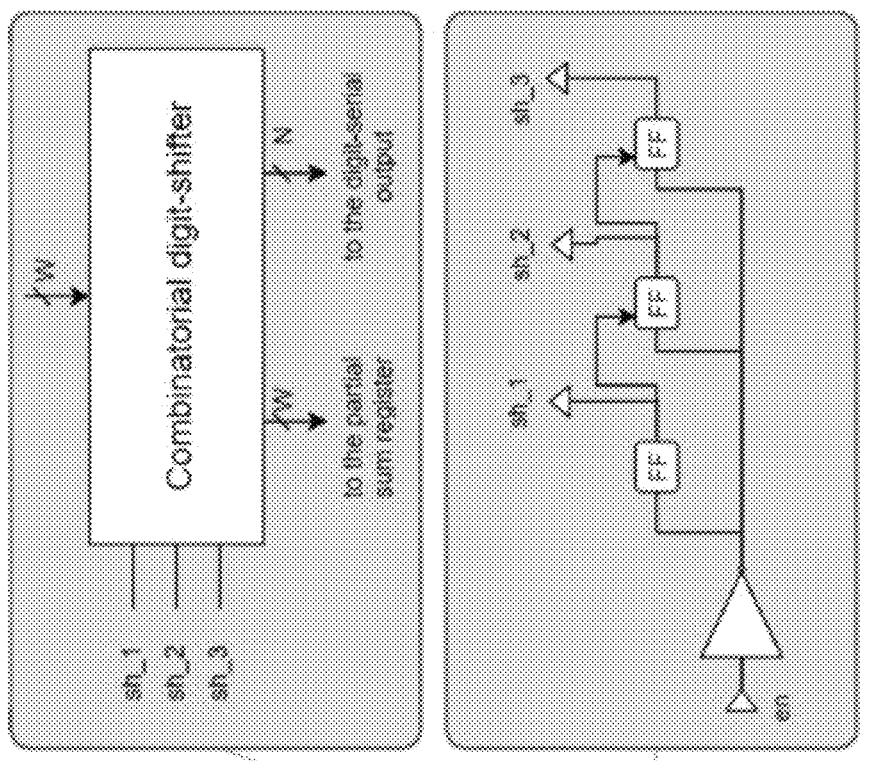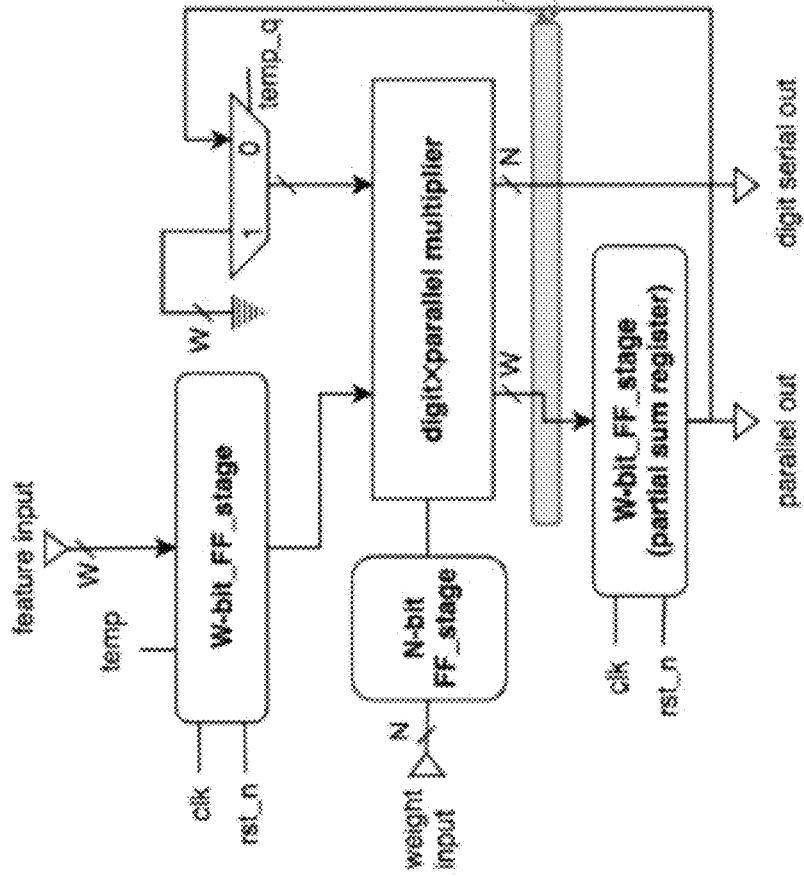
FIG. 34

| Clock cycle | MAC unit 0 | MAC unit 1 | MAC unit 2 | MAC unit 3 |
|---|---|---|---|---|
| 1st | 1)acc1 MAC1 | | | |
| 2nd | 2)acc1 MAC1 | 1)acc1 MAC2 | | |
| 3rd | 3)acc1 MAC1 | 2)acc1 MAC2 | 1)acc1 MAC3 | |
| 4th | 4)acc1 MAC1 | 3)acc1 MAC2 | 2)acc1 MAC3 | 1)acc1 MAC4 |
| 5th | 1)acc2 MAC1 | 4)acc1 MAC2 | 3)acc1 MAC3 | 2)acc1 MAC4 |
| 6th | 2)acc2 MAC1 | 1)acc2 MAC2 | 4)acc1 MAC3 | 3)acc1 MAC4 |
| 7th | 3)acc2 MAC1 | 2)acc2 MAC2 | 1)acc2 MAC3 | 4)acc1 MAC4 |
| 8th | 4)acc2 MAC1 | 3)acc2 MAC2 | 2)acc2 MAC3 | 1)acc2 MAC4 |
| 9th | 1)acc3 MAC1 | 4)acc2 MAC2 | 3)acc2 MAC3 | 2)acc2 MAC4 |
| 10th | 2)acc3 MAC1 | 1)acc3 MAC2 | 4)acc2 MAC3 | 3)acc2 MAC4 |
| 11th | 3)acc3 MAC1 | 2)acc3 MAC2 | 1)acc3 MAC3 | 4)acc2 MAC4 |
| 12th | 4)acc3 MAC1 | 3)acc3 MAC2 | 2)acc3 MAC3 | 1)acc3 MAC4 |
| 13th | 1)acc1 MAC5 | 4)acc3 MAC2 | 3)acc3 MAC3 | 2)acc3 MAC4 |
| 14th | 2)acc1 MAC5 | 1)acc1 MAC6 | 4)acc3 MAC3 | 3)acc3 MAC4 |
| 15th | 3)acc1 MAC5 | 2)acc1 MAC6 | 1)acc1 MAC7 | 4)acc3 MAC4 |
| 16th | 4)acc1 MAC5 | 3)acc1 MAC6 | 2)acc1 MAC7 | 1)acc1 MAC8 |
| ... | ... | ... | ... | ... |
| 24th | 4)acc3 MAC5 | ... | ... | ... |
| 25th | ... | 4)acc3 MAC6 | ... | ... |
| 26th | ... | ... | 4)acc3 MAC7 | ... |
| 27th | ... | ... | ... | 4)acc3 MAC8 |

Table 1

FIG. 50

| Clock cycle | Multiplier unit 0 | Multiplier unit 1 | Multiplier unit 2 | Multiplier unit 3 |
|---|---|---|---|---|
| 1st | 1)mult1 MAC1 | | | |
| 2nd | 2)mult1 MAC1 | 1)mult2 MAC1 | | |
| 3rd | 3)mult1 MAC1 | 2)mult2 MAC1 | 1)mult3 MAC1 | |
| 4th | 4)mult1 MAC1 | 3)mult2 MAC1 | 2)mult3 MAC1 | 1)mult1 MAC2 |
| 5th | 1)mult2 MAC2 | 4)mult2 MAC1 | 3)mult3 MAC1 | 2)mult1 MAC2 |
| 6th | 2)mult2 MAC2 | 1)mult3 MAC2 | 4)mult3 MAC1 | 3)mult1 MAC2 |
| 7th | 3)mult2 MAC2 | 2)mult3 MAC2 | 1)mult1 MAC3 | 4)mult1 MAC2 |
| 8th | 4)mult2 MAC2 | 3)mult3 MAC2 | 2)mult1 MAC3 | 1)mult2 MAC3 |
| 9th | 1)mult3 MAC3 | 4)mult3 MAC2 | 3)mult1 MAC3 | 2)mult2 MAC3 |
| 10th | 2)mult3 MAC3 | 1)mult1 MAC4 | 4)mult1 MAC3 | 3)mult2 MAC3 |
| 11th | 3)mult3 MAC3 | 2)mult1 MAC4 | 1)mult2 MAC4 | 4)mult2 MAC3 |
| 12th | 4)mult3 MAC3 | 3)mult1 MAC4 | 2)mult2 MAC4 | 1)mult3 MAC4 |
| 13th | ... | 4)mult1 MAC4 | 3)mult2 MAC4 | 2)mult3 MAC4 |
| 14th | ... | ... | 4)mult2 MAC4 | 3)mult3 MAC4 |
| 15th | ... | ... | ... | 4)mult3 MAC4 |

Table 2

*FIG. 51*

| Memory location | Digit 3 | Digit 2 | Digit 1 | Digit 0 |
|---|---|---|---|---|
| 1st | $3)w_1$ | $2)w_1$ | $1)w_1$ | $0)w_1$ |
| 2nd | $3)w_2$ | $2)w_2$ | $1)w_2$ | $0)w_2$ |
| 3rd | $3)w_3$ | $2)w_3$ | $1)w_3$ | $0)w_3$ |
| 4th | $3)w_4$ | $2)w_4$ | $1)w_4$ | $0)w_4$ |
| 5th | $3)w_5$ | $2)w_5$ | $1)w_5$ | $0)w_5$ |
| 6th | $3)w_6$ | $2)w_6$ | $1)w_6$ | $0)w_6$ |
| 7th | $3)w_7$ | $2)w_7$ | $1)w_7$ | $0)w_7$ |
| 8th | $3)w_8$ | $2)w_8$ | $1)w_8$ | $0)w_8$ |
| ... | ... | ... | ... | ... |

Table 3

*FIG. 52*

| Memory word | Digit 3 | Digit 2 | Digit 1 | Digit 0 |
|---|---|---|---|---|
| 1st | ... | ... | ... | 0)$w_1$ |
| 2nd | ... | ... | 0)$w_2$ | 1)$w_1$ |
| 3rd | ... | 0)$w_3$ | 1)$w_2$ | 2)$w_1$ |
| 4th | 0)$w_4$ | 1)$w_3$ | 2)$w_2$ | 3)$w_1$ |
| 5th | 1)$w_4$ | 2)$w_3$ | 3)$w_2$ | 0)$w_5$ |
| 6th | 2)$w_4$ | 3)$w_3$ | 0)$w_6$ | 1)$w_5$ |
| 7th | 3)$w_4$ | 0)$w_7$ | 1)$w_6$ | 2)$w_5$ |
| 8th | 0)$w_8$ | 1)$w_7$ | 2)$w_6$ | 3)$w_5$ |
| 9th | 1)$w_8$ | 2)$w_7$ | 3)$w_6$ | ... |
| 10th | 2)$w_8$ | 3)$w_7$ | ... | ... |
| 11th | 3)$w_8$ | ... | ... | ... |
| ... | ... | ... | ... | ... |

Table 4

*FIG. 53*

| count[1] | count[0] | Accumulation register | Digit-serial to bit-parallel converter |
|---|---|---|---|
| 0 | 0 | 1 | conv1 |
| 0 | 1 | 2 | conv2 |
| 1 | 0 | 3 | conv1 |
| 1 | 1 | 4 | conv2 |

Table 5

FIG. 54

| Layer | Weights range | 95% occurrences interval | Biggest magnitude boundary | Corresponding word | |
|---|---|---|---|---|---|
| conv1 | [-0,36;0,44] | [-0,13;0,13] | 0,13 | 0010 0101 | 0010 1101 |
| conv2 | [-0,26;0,48] | [-0,050;0,051] | 0,051 | 0000 1101 | 1001 1001 |
| conv3 | [-0,22;0,47] | [-0,032;0,034] | 0,034 | 0000 1001 | 0011 0100 |
| conv4 | [-0,16;0,45] | [-0,033;0,038] | 0,038 | 0000 1010 | 0000 1101 |
| conv5 | [-0,18;0,34] | [-0,035;0,041] | 0,041 | 0000 1111 | 0000 0111 |

Table 6

FIG. 55

| Gate count | Described architecture | Reference architecture |
|---|---|---|
| | 3897 | 3665 |

Table 7

*FIG. 56*

CONVOLUTIONAL NETWORK HARDWARE ACCELERATOR DEVICE, SYSTEM AND METHOD

BACKGROUND

Technical Field

The present disclosure generally relates to a Multiply ACcumulate (MAC) hardware accelerator, which may be used, for example, in deep convolutional neural networks (DCNN).

Description of the Related Art

Known computer vision, speech recognition, and signal processing applications benefit from the use of deep convolutional neural networks (DCNN). A seminal work in the DCNN arts is "Gradient-Based Learning Applied To Document Recognition," by Y. LeCun et al., Proceedings of the IEEE, vol. 86, no. 11, pp. 2278-2324, 1998, which led to winning the 2012 ImageNet Large Scale Visual Recognition Challenge with "AlexNet." AlexNet, as described in "ImageNet Classification With Deep Convolutional Neural Networks," by Krizhevsky, A., Sutskever, I., and Hinton, G., NIPS, pp. 1-9, Lake Tahoe, Nev. (2012), is a DCNN that significantly outperformed classical approaches for the first time.

A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

For example, if a plurality of two-dimensional pictures of faces is provided as input to a DCNN, the DCNN will learn a variety of characteristics of faces such as edges, curves, angles, dots, color contrasts, bright spots, dark spots, etc. These one or more features are learned at one or more first layers of the DCNN. Then, in one or more second layers, the DCNN will learn a variety of recognizable features of faces such as eyes, eyebrows, foreheads, hair, noses, mouths, cheeks, etc.; each of which is distinguishable from all of the other features. That is, the DCNN learns to recognize and distinguish an eye from an eyebrow or any other facial feature. In one or more third and then subsequent layers, the DCNN learns entire faces and higher order characteristics such as race, gender, age, emotional state, etc. The DCNN is even taught in some cases to recognize the specific identity of a person. For example, a random image can be identified as a face, and the face can be recognized as Orlando Bloom, Andrea Bocelli, or some other identity.

In other examples, a DCNN can be provided with a plurality of pictures of animals, and the DCNN can be taught to identify lions, tigers, and bears; a DCNN can be provided with a plurality of pictures of automobiles, and the DCNN can be taught to identify and distinguish different types of vehicles; and many other DCNNs can also be formed. DCNNs can be used to learn word patterns in sentences, to identify music, to analyze individual shopping patterns, to play video games, to create traffic routes, and DCNNs can be used for many other learning-based tasks too.

SUMMARY

In an embodiment, a system comprises: an addressable memory array; one or more processing cores; and an accelerator framework including a plurality of Multiply ACcumulate (MAC) hardware accelerators, wherein a MAC hardware accelerator of the plurality of MAC hardware accelerators, in operation, multiplies an input weight by an input feature by sequentially multiplying individual digits of the input weight by the input feature. In an embodiment, the system comprises pre-processing logic that, in operation, controls gating of multipliers of the MAC hardware accelerators. In an embodiment, the pre-processing logic includes passive selection logic within one or more gating circuits. In an embodiment, a gating circuit of the one or more gating circuits includes an OR gate, a flip-flop, and an AND gate that are serially coupled to control a clock of a digit-serial multiplier unit within one of the MAC hardware accelerators. In an embodiment, the controlling the gating of a multiplier of a MAC hardware accelerator of the plurality of MAC hardware accelerators comprises: detecting zero-value digits of weight inputs to the multiplier; and gating the multiplier of the MAC hardware accelerator in response to detection of a zero-value digit weight input to the multiplier. In an embodiment, a MAC hardware accelerator of the plurality of MAC hardware accelerators has a number P of digit-serial multipliers, and, in operation, the P digit-serial multipliers produce one W-bit by W-bit multiplication result in a clock cycle, wherein W and P are integers greater than 1. In an embodiment, the MAC hardware accelerator comprises accumulation circuitry and timing control circuitry, and the timing control circuitry, in operation, controls data flow between the P digit-serial multipliers and the accumulation circuitry of the MAC hardware accelerator. In an embodiment, the accelerator framework, in operation, controls data flow to the plurality of MAC hardware accelerators to synchronize operation of the plurality of MAC hardware accelerators. In an embodiment, the MAC hardware accelerators, in operation, perform one or more multiplication operations via sign-magnitude coding. In an embodiment, the MAC hardware accelerators, in operation, convert an output of at least one multiplication operation of the one or more multiplication operations to 2's complement prior to an accumulation step associated with the at least one multiplication operation. In an embodiment, the individual digits of the input weight are stored in a sign and magnitude coding format. In an embodiment, the individual digits of the input weight are stored in a series of words of the memory array. In an embodiment, a word in the series of words stores digits of a plurality of different input weights.

In an embodiment, a mobile computing device comprises: an imaging sensor that captures images; and processing circuitry, which, in operation, implements a deep convolutional neural network, the processing circuitry including: a memory; and an accelerator framework coupled to the memory, the accelerator framework including a plurality of Multiply ACcumulate (MAC) hardware accelerators, which, in operation, multiply an input weight by an input feature by sequentially multiplying individual digits of the input weight by the input feature. In an embodiment, the mobile computing device comprises pre-processing logic, which, in operation, controls gating of multipliers of the MAC hardware accelerators. In an embodiment, the controlling the gating of a multiplier of a MAC hardware accelerator of the plurality of MAC hardware accelerators comprises: detecting zero-value digits of weight inputs to the multiplier; and gating the multiplier of the MAC hardware accelerator in response to detection of a zero-value digit weight input to the multiplier. In an embodiment, a MAC hardware accelerator of the plurality of MAC hardware accelerators has a number P of digit-serial multipliers, and, in operation, the P digit-serial multipliers produce one W-bit by W-bit multiplication result in a clock cycle, wherein W and P are integers greater than 1. In an embodiment, the individual digits of the input weight are stored in a series of words of the memory array.

In an embodiment, a method comprises: performing a plurality of multiply accumulate operations using a plurality of Multiply ACcumulate (MAC) hardware accelerators, wherein the MAC hardware accelerators multiply a digit-serial input having a plurality of digits by a parallel input having a plurality of bits by sequentially multiplying individual digits of the digit-serial input by the plurality of bits of the parallel input; and generating an output based on results of the plurality of multiple accumulate operations. In an embodiment, the method comprises: gating a multiplier of a MAC hardware accelerator of the plurality of MAC hardware accelerators in response to detecting a zero-value input digit to the multiplier. In an embodiment, the method comprises: storing the individual digits of the digit-serial input in a series of words of a memory. In an embodiment, a word in the series of words stores digits of a plurality of different digit-serial inputs.

In an embodiment, a Multiple Accumulate (MAC) hardware accelerator comprises: a plurality of multipliers, which, in operation, multiply a digit-serial input having a plurality of digits by a parallel input having a plurality of bits by sequentially multiplying individual digits of the digit-serial input by the plurality of bits of the parallel input; and circuitry coupled to the plurality of multipliers, wherein the circuitry, in operation, outputs a result based on the multiplication of the digit-serial input by the parallel input. In an embodiment, the MAC hardware accelerator comprises preprocessing logic that, in operation, controls gating of the plurality of multipliers. In an embodiment, the pre-processing logic includes an OR gate, a flip-flop, and an AND gate that are serially coupled to control a clock of a multiplier of the plurality of multipliers. In an embodiment, the pre-processing logic, in operation: detects zero-value digits input to a multiplier of the plurality of multipliers; and gates the multiplier in response to detection of a zero-value digit input to the multiplier. In an embodiment, the plurality of multipliers produce one W-bit by W-bit multiplication result in a clock cycle, wherein W is an integer greater than 1. In an embodiment, the MAC hardware accelerator comprises accumulation circuitry and timing control circuitry, and the timing control circuitry, in operation, controls data flow between the P digit-serial multipliers and the accumulation circuitry of the MAC hardware accelerator.

In an embodiment, a system on chip (SoC) comprises: a system bus; a plurality of addressable memory arrays coupled to the system bus; at least one applications processor core coupled to the system bus; and an accelerator framework coupled to the system bus. The SOC implements a deep convolutional neural network. The accelerator framework includes a plurality of Multiply ACcumulate (MAC) hardware accelerators which process an input feature in parallel with multiple individual digits of an input weight. In an embodiment, the SoC comprises pre-processing logic which controls gating of the MAC hardware accelerators. In an embodiment, the pre-processing logic includes passive selection logic within one or more gating circuits. In an embodiment, a gating circuit includes an OR gate, a flip-flop, and an AND gate that are serially coupled to control a clock of a digit-serial multiplier unit within one of the MAC hardware accelerators. In an embodiment, a MAC hardware accelerator of the plurality of MAC hardware accelerators has a number P of digit-serial multipliers, and, in operation, multiplies W-bit word length values using the P digit-serial multipliers in P clock cycles, wherein W and P are integers greater than 1. In an embodiment, the MAC hardware accelerators, in operation, perform one or more multiplication operations via sign-magnitude coding. In an embodiment, the MAC hardware accelerators, in operation, convert an output of at least one multiplication operation of the one or more multiplication operations to 2's complement prior to an accumulation step associated with the at least one multiplication operation.

In an embodiment, a mobile computing device comprises an imaging sensor that captures images and a system on chip (SoC). The SoC, in operation, implements a deep convolutional neural network, and includes: an SoC bus; an on-chip memory coupled to the SoC bus; and an accelerator framework coupled to the SoC bus. The accelerator framework includes a plurality of Multiply ACcumulate (MAC) hardware accelerators, which, in operation, process an input feature in parallel with multiple individual digits of an input weight. In an embodiment, the mobile computing device comprises pre-processing logic, which, in operation, controls gating of the MAC hardware accelerators. In an embodiment, the pre-processing logic includes passive selection logic within one or more gating circuits. In an embodiment, a MAC hardware accelerator of the plurality of MAC hardware accelerators has a number P of digit-serial multipliers, and, in operation, multiplies W-bit word length values using the P digit-serial multipliers in P clock cycles, wherein W and P are integers greater than 1.

In an embodiment, a system on chip (SoC) implements a deep convolutional neural network architecture. The SoC includes means for storing kernel data; means for processing applications; and means for performing multiply accumulate operations on a digit-serial basis using parallel stream processing, wherein the means for performing the multiply accumulate operations includes means for processing an input feature in parallel with multiple individual digits of an input weight. In an embodiment, the SoC comprises means for controlling gating of the means for performing the multiply accumulate operations. In an embodiment, the means for controlling the gating includes means for controlling a clock that is coupled to the means for performing the multiply accumulate operations. In an embodiment, the means for performing the multiply accumulate operations includes means for performing a multiplication of multiple W-bit word length values via a quantity P of digit-serial multiplier units in P clock cycles, and wherein W and P are integers greater than 1.

In an embodiment, a method of implementing a convolutional neural network comprises: performing a plurality of multiply accumulate operations using a plurality of Multiply ACcumulate (MAC) hardware accelerators, wherein the MAC hardware accelerators process an input feature in parallel with multiple individual digits of an input weight; and generating an output of the convolutional neural network based on results of the plurality of multiple accumulate operations. In an embodiment, the method comprises gating the plurality of MAC hardware accelerators. In an embodiment, the gating includes controlling a clock coupled to a multiplier of a MAC hardware accelerator of the plurality of MAC hardware accelerators. In an embodiment, a multiply accumulate operation includes performing a multiplication of multiple W-bit word length values via a quantity P of digit-serial multiplier units in P clock cycles, and wherein W and P are integers greater than 1.

BRIEF DESCRIPTION OF THE SEVERAL VIEWS OF THE DRAWINGS

FIG. 6 illustrates example steps of a convolution computation.

FIGS. 8A to 8D illustrate an example of a discrete convolution operation.

FIG. 20 illustrates an example two's complement computation of −5×5.

FIG. 21 illustrates an example two's complement computation of −5×7.

FIG. 26 illustrates an example embodiment of a bit-serial multiplier unit and digit cell.

FIG. 34 illustrates an example embodiment of an architecture of an embodiment of a digit-serial multiplier unit or circuit.

FIG. 50 depicts in the form of a table an example timing diagram of an embodiment of a digit-serial MAC circuit.

FIG. 51 depicts in the form of a table an example of the sequence of operations computed by the cluster obtained using word level unfolding on a digit-serial multiplier.

FIG. 52 depicts in the form of a table an example of storing weights to be applied in a digit-serial MAC architecture.

FIG. 53 depicts in the form of a table another example of storing weights to be applied in a digit-serial MAC architecture.

FIG. 54 depicts in the form of a table an example relationship between counter values and accumulation register ports on which an output is produced.

FIG. 55 depicts in the form of a table an example of trained weights of example AlexNet convolutional layers.

FIG. 56 depicts in the form of a table an example area comparison between a disclosed digit-serial MAC architecture and a reference bit-parallel MAC architecture.

DETAILED DESCRIPTION

Figure 1:
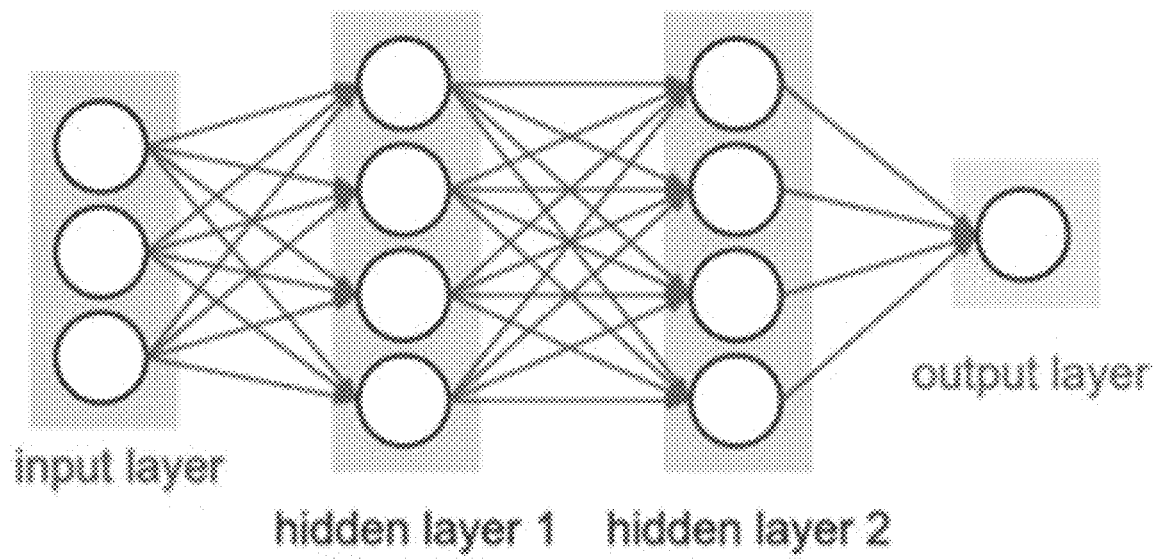
FIG. 1 is a schematic representation of an embodiment of a neural network.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, integrated circuits, logic gates, finite state machines, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

An embodiment uses digit-serial architectures to implement a low power Multiply ACcumulate (MAC) hardware accelerator for convolution operation employed during a forward step of Convolutional Neural Networks (CNNs). More in detail, the disclosure concerns the exploration of the advantages of a non-conventional use of serial architectures and their integration in a parallel, stream computation framework. These units may be employed in order to facilitate implementing input data-dependent gating on multiplier units using a finer granularity in the detection of specific nibbles in the input words, facilitating the gating of the structure. Convolutional Neural Networks are a specific type of Artificial Neural Networks, which have been one of the Machine Learning technologies of greater interest in the Artificial Intelligence research field during the last decade.

Artificial Intelligence can be defined, in an informal way, as the branch of computer science concerned with developing technologies enabling computers to solve problems which, conventionally, are solved by human intelligence. In fact, computers and computer science have always helped to solve problems which are hard to deal with for human beings; whereas, an algorithmic description of their resolution task is easy to obtain and makes them straightforward for computers. Usually, artificial intelligence regards problems which are hard to be formally described but are easily and intuitively solved by people. Examples of such problems are spoken words recognition, image classification and detection—which, respectively, have the purpose of identifying objects in images and determining their position in the scene—handwritten digits and letters recognition and many others.

These problems and, as a consequence, artificial intelligence, are becoming every day of major interest, not only for academic research purposes, but also for industries, for which AI systems represent a way to implement new applications and services and to improve the existing ones with innovative features.

Some examples are: improvements in user-device interaction systems, used in consumer electronics and smart devices such as smartphones, wearable devices and vocal assistants, which make use of speech recognition, gesture recognition and user identification technologies; autonomous driving systems, utilizing technologies as video object detection and event recognition; innovative systems for fault detection and prediction, used for maintenance of production lines etc. The difficulties in describing effectively, in a way which is enough complex and flexible, the resolution tasks for the mentioned problems suggest that AI systems need to acquire knowledge on how to solve them on their own, by extracting models and patterns from raw data.

Systems which have this capability to learn the correct behavior from examples are called Machine Learning technologies. Their development concerns with the definition of an efficient learning method rather than with the description of a procedure or the population of a knowledge database. As depicted in more detail in the discussion below, Artificial Neural Networks, particularly, are a technology in which the overall behavior of the system is obtained connecting simpler functional operators, called neurons. Neurons are arranged in groups called layers; consecutive layers are connected: the processing of the input data starts with the computations made by the neurons of the first layer, called input layer, and proceeds with the information flowing through the following layers, until the output of the network is produced by the last group of neurons, called an output layer.

The most computationally expensive operation made by neurons is the dot product between a matrix of input values, often named feature map, and a kernel matrix of coefficients, called weights. On the result of this operation, a translation and a nonlinear activation function are applied.

This activity of the neurons is seen in the forward computation step, which is the operation of a network finalized to solve the problem for which it has been trained. The weight values for all neurons in the network are learned during the training phase, in which, according to a technique named supervised learning, inputs with known expected outputs, also called training set, are supplied to the network. More in detail, the Backpropagation Algorithm is used, by which it is possible to find weight values minimizing a loss function; the latter quantifies the difference between the desired outputs and the ones obtained submitting the training inputs.

Convolutional Neural Networks are one type of Artificial Neural Networks which, in the forward step, include other operations, as convolution and subsampling, which introduce invariance to translations and distortions in the input feature map and reduce the amount of memory required to memorize the parameters of the network.

The major interest for convolutional neural networks in this disclosure is due to the fact that they have proven their effectiveness in various applications and, in the past five years, their performances went beyond the ones of all the competing Machine Learning technologies. The main breakthroughs and the better results in the CNNs research field have been reached only in recent years also because the availability of computational power has played an important role in order to understand the correlation between the performance of a network, measured as the accuracy of its results, and its depth, which is the number of layers in the network and gives an estimation of its complexity.

This means that networks which are good enough to be used in real world applications, that are the ones of interest for both industrial and consumer fields, are computationally expensive; therefore, using general-purpose hardware units—as general-purpose GPUs—which are powerful enough to execute them with realtime constraints, would determine a power consumption and a cost which are not compatible with the use of these technologies in consumer electronics devices.

A promising method to enable CNN based applications to be prototyped and commercialized, with reasonable costs, is executing the training of the networks offline and uploading the learned parameters on the mentioned devices. In order to be suitable for embedded and mobile applications, having ad-hoc hardware units able to accelerate the most computationally expensive operations of the forward step may be advantageous in order to save power and reduce costs. This approach relies on the development of new, application specific hardware units and computer architectures. This disclosure arises in this context and, more in detail, concerns the exploration of an alternative, digit-serial architecture based, MAC hardware units or circuits; the latter may play a major role in the forward step of a CNN since, with an appropriate scheduling and a proper organization of the architecture at a system level, these circuits may conveniently implement dot products and convolutions in hardware.

As already said, these operations dominate the forward step in complexity, and it is desirable to implement them in an efficient way. Serial architectures are known for being an interesting alternative to bit-parallel units in DSP applications in which there are low or moderated required sample rates and then speed performance can be traded with power consumption and area occupation reduction. This disclosure is focused on digit-serial systems which process one nibble per clock cycle; the mentioned nibbles, commonly called digits, contain more than one, but not all bits of the input samples. A whole computation by a digit-serial unit takes a number of cycles equal to a ratio between the word-length used for the samples and the digit-size, which is the number of bits in a digit.

In the present disclosure the integration of a digit-serial MAC unit in a bit-parallel stream-computation context is described; for this purpose word-level unfolding techniques have been used and the digit-serial units have been replicated and rearranged—in particular, with reference to the accumulation units—to adapt their reduced word-rate to the one of the parallel data streams. A rearrangement of the memory containing values of the weights allows eliminating the input parallel to serial converters, which have been employed when using digit-serial units in a parallel context.

In this case, the expected advantages which should derive from the use of the digit-serial architecture are due to a non-conventional use of the latter which has been explored.

Previous approaches and studies have been made with respect to AlexNet, a popular Convolutional Neural Network. In such efforts, distributions of the weights for the trained network have been shown to be distributed approximately in the range [−1; +1], but most of them have values very close to zero.

It will be appreciated that, using a fixed-point coding with uniform quantization, more of 90% of the magnitudes of the weights should present zero nibbles on the most significant positions of the words. If we consider digits of approximately the same size of the mentioned nibbles, a digit-serial MAC unit, and more precisely its multiplier component, would be subject to useless commutations in the clock cycles in which a zero partial product is the correct result since these zero nibbles are given as an input. In these clock periods, applying gating techniques and pre-processing operations could lead to savings in the switching component of the overall power consumption if compared to the bit-parallel counterpart. In order to enable the considered multiplier architecture to "skip" useless computations, some selection logic is added.

In the present disclosure, multiplier modules for partial multiplication generation may be gated when input zero nibbles are recognized by the pre-processing logic. In contrast to previous approaches, in order to obtain the final multiplication result, starting from the computed partial products, external adder units are not required. These represent additional active logic and, therefore, should have a greater impact on the overall power consumption, compared to the passive selection logic added to the digit-serial multiplier unit of an embodiment.

In order to increase the probability of having cycles in which the multiplier unit can be gated, the inventors have observed that when input factors are coded in two's complement, only positive numbers close to zero present zero nibbles on the most significant bits; negative numbers, instead, have ones on the MSBs and, even if they are close to zero, all the partial products may be computed and added together to get the correct result. Therefore, other improvements may be achieved computing the multiplication in sign-magnitude coding, and then reconverting the multiplication result in 2's complement before the accumulation step. Considerations on how to implement these conversion stages with minimum overhead are carried out.

The present disclosure is organized as follows: an introduction to neural networks is provided, with a focus on the feed forward computation of Convolutional Neural Networks; serial architectures are then described, as well as a review of the features of bit-serial and digit-serial structures. A review of the methods for digit-serial architecture design and example of some digit-serial units follows. The design procedure, in which the considered MAC architecture is provided for use in the bit-parallel computation stream context is then discussed. Gating strategy and pre-processing logic relative to such embodiments is also described. Results with respect to area consumption and power consumption estimations are then presented.

1 Introduction to Artificial Neural Networks

Artificial Neural Networks (ANNs) are a subclass of the Machine Learning algorithms. It was already mentioned that Machine Learning is the branch of Artificial Intelligence having the purpose of developing programs specialized in determining their correct behavior from experience; this is acquired during a learning phase, called training. In the specific case of ANNs, the training procedure has the purpose of determining the parameters of the algorithm; as further explained below, the latter is used by the network during its forward-step, also called inference phase, to compute the output required for a specific task, starting from some input data. When the task to be carried out by the network changes, there is no need for rewriting its algorithm, but only a new training phase is to be executed.

More in detail, a neural network is organized in computational stages called layers which, during the forward step, process the input data in a chained manner; this means that layers are connected "in series" and the output of a certain layer is the input of the following one. The first layer of a network is usually called input layer, since it is the one which processes the input to the network. The output layer is the last one and produces the output of the network. Layers between the input and the output ones are called hidden layers. A simplified schematic representation of a small neural network is depicted in FIG. 1.

The size of a neural network, often called depth, is expressed as the number of layers in it. By convention, when we talk about an N-layer neural network, we do not count for the input layer; for example: a single layer network is made of the input and the output layer, directly connected. Deeper networks can often achieve better results in terms of accuracy, defined as the percentage of errors made on a given set of inputs. For this reason, Deep Neural Networks (DNNs) are an important subclass of neural networks and the whole field of study concerning ANNs is often identified as Deep Learning.

Figure 2:
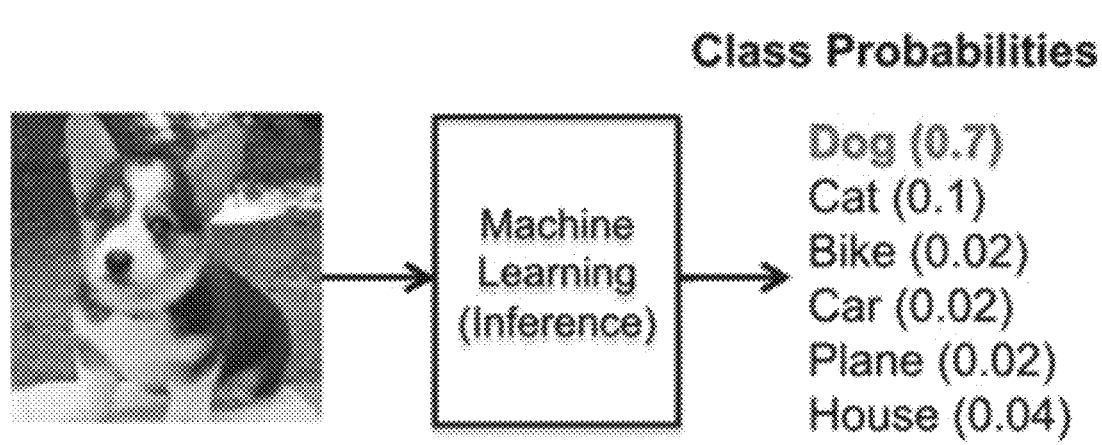
FIG. 2 illustrates an example of the operation of an ANN for an image classification task.

There are several fields in which ANNs can be used, as explained earlier, but in order to have a more intuitive idea of their global operation during both training and inference steps, it is convenient to consider an example concerning one specific application. The image classification process will be considered, which is the task of associating an input image to a label, belonging to a defined fixed set. When a neural network is used for this task, during the forward-step, its input is the image to be classified. The latter, according to a common raw digital representation, is a three-dimensional array of brightness values which, together with the parameters of the network, are used to compute the output vector. This includes a set of scores, one for each of the considered classes. The class having the highest score is the one which, according to the network, is more likely associated with the input image, as exemplified by FIG. 2, which provides an example of operations in an ANN for an image classification task.

In the considered example, therefore, the goal of the training step is to determine the set of parameter values of the network maximizing the score of the correct class and minimizing the ones of incorrect classes, for any given input image. This is usually done by giving the network a group of example input images, called a training set, which is used to tune parameters.

Among other techniques described in this disclosure, details on the arithmetic operations involved in the forward step of Artificial Neural Networks are provided, including a description of the operation of a fully-connected layer (both with and without involving the neuron model). Socalled Regular Neural Networks, which are composed mainly of fully-connected layers, are also described. Here the discrete convolution and the operation of the main layers used in CNNs are also described, along with a description of the training technique commonly used for neural networks.

1.1 Fully-Connected Layer Operation

The operation of an Artificial Neural Network may be explained using linear algebra to describe how one of its layers works. A fully-connected layer is typified by a weight matrix $\underline{W}$, a bias vector $\underline{b}$ and a nonlinear function, usually called activation function. As will be shown in more detail later, the input of such a layer may be represented as a mono-dimensional vector $\underline{I}$ and its output $\underline{O}$ is obtained through the following steps, each operating on the output of the previous one:

1. Matrix product between the input vector $\underline{I}$ and the matrix $\underline{W}$;
2. Addition of the bias vector $\underline{b}$;
3. Application of the activation function.

The parameters of the network mentioned above are the elements of the matrix $\underline{W}$ and of the bias vector $\underline{b}$, which are called weights and biases, respectively. It can be observed that, since a matrix product is to be computed, the length of the input vector $\underline{I}$ along the height dimension is equal to the extension of the matrix $\underline{W}$ along its width dimension. Furthermore, in order to sum the bias vector $\underline{b}$ to the result of the previous operation, its length along the height dimension is the same as that of the weight matrix $\underline{W}$. Equation 2.1 depicts the linear operations computed by a fully-connected layer showing explicitly the relations between the array dimensions. The reason for which two subscripts are used for the column index of the weight matrix and for the row index of the input vector, respectively, will be made clear below.

Equation 2.1

$$\begin{bmatrix} w_{1;1,1} & w_{1;1,2} & \cdots & w_{1;1,w} & \cdots & w_{1;h,1} & w_{1;h,2} & \cdots & w_{1;h,w} \\ w_{2;1,1} & w_{2;1,2} & \cdots & w_{2;1,w} & \cdots & w_{2;h,1} & w_{2;h,2} & \cdots & w_{1;2,1} \\ \vdots & \vdots & \vdots & \vdots & \vdots & \vdots & \vdots & \ddots & \vdots \\ w_{l;1,1} & w_{l;1,2} & \cdots & w_{l;1,w} & \cdots & w_{l;h,1} & w_{l;h,2} & \cdots & w_{l;h,w} \end{bmatrix} \begin{bmatrix} i_{1,1} \\ i_{1,2} \\ \vdots \\ i_{1,w} \\ \vdots \\ i_{h,1} \\ i_{h,2} \\ \vdots \\ i_{h,w} \end{bmatrix} + \begin{bmatrix} b_1 \\ b_2 \\ \vdots \\ b_l \end{bmatrix} \quad 2.1$$

As mentioned above, this description is suitable to understand the operation of an input fully-connected layer on all kinds of input data, like images, audio tracks etc.: these are represented by multi-dimensional vectors in which order matters in one or more dimensions (e.g., height and width of the image, time axis of the audio track, etc.). Usually, one of the input matrix dimensions can be identified as channel axis: along this dimension, channels are arranged, which are input data partial depictions which together contribute to a more complex representation (e.g., red, green blue channels off an image, right and left channels of a stereo audio track, etc.). Considering this, it is clear that all possible inputs of a neural network can be arranged into mono-dimensional vectors and, therefore, the presented operation of the layer can be used. An example of that is the often called im2col transformation which is often done on images at the beginning of their digital-processing operations. In this transformation, image pixels are reorganized in a mono-dimensional vector and are ordered according to their position in the matrices which constitute color channels (e.g., from left to right, from the top down, with channels following each other).

The description is also valid for output and hidden layers which take as an input the mono-dimensional output vector of the preceding layer.

1.2 Fully-Connected Layer Operation with Brain-Derived Models

Another common scheme used to describe the operation of a fully-connected layer is the one using models and terminologies coming from biology and biologic neural systems. Indeed, in the first place, neural networks were developed with the aim of modeling a biologic brain, but early this purpose was abandoned since it was realized that these structures were not complex enough in order to be effective for this purpose. Nonetheless, neural networks continued to be used in the machine learning field, where, as said before, they obtained remarkable results. A vocabulary recalling analogies with biological neural networks survived. Layers, indeed, can be seen as composed of smaller computational units, called neurons. These units recall, in a simplified version, the operation and the morphology of biologic neurons, which are the cells composing the human neural system.

Figure 3:
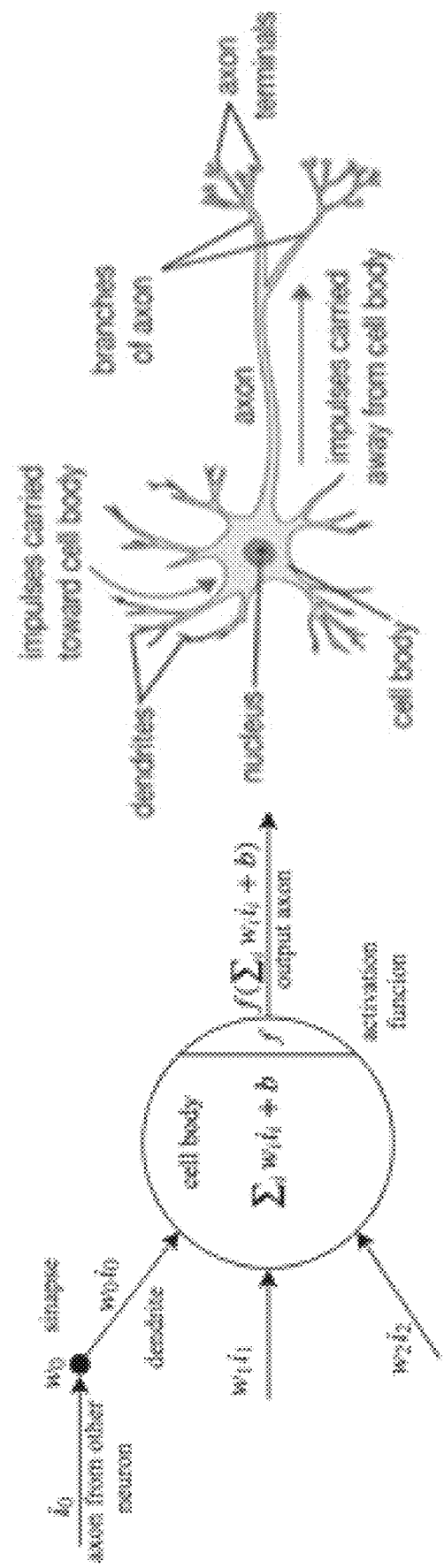
FIG. 3 illustrates an embodiment of a scheme of an artificial neuron as comparison with a representation of a biologic neuron.

An artificial neuron receives several mono-dimensional signals $i_{n,m}$ from the axons connected to it; received signals reach the neuron through its dendrites, where each input is a multiplier for a weight value $w_{n,m}$. Obtained values are summed together in the nucleus of the neuron, where a bias parameter b is also added. A non-linear scalar function, named activation function, is then applied to the result of this operation. The output of the activation function is called activation and it's the overall output of the neuron, transferred along its axon to neurons connected to it. FIG. 3 depicts an artificial neuron in comparison with a representation of a biological neuron.

In other terms, the first steps of a neuron operation can be described as a dot product between an input matrix, often named input feature map, and a kernel associated with the specific neuron. The mentioned kernel has the same size of the input feature map and therefore contains one weight value for each element of the input matrix. Since the operation performed by the neuron is a dot product, weights in kernel matrices are in the same position of the input values for which they are multiplied. Intuitively, this part of the operation of a neuron can be thought as the research of a certain pattern, encoded in the trained weights of the kernel, in the input feature map. The dot product, indeed, is often used as a similarity index in the signal processing theory.

The linear part of the computation carried out by a neuron, without the application of the activation function, is represented in Equation 2.2:

$$\underline{I} \cdot \underline{K} + b = \begin{bmatrix} i_{1,1} & i_{1,2} & \cdots & i_{1,w} \\ i_{2,1} & i_{2,2} & \cdots & i_{2,w} \\ \vdots & \vdots & \ddots & \vdots \\ i_{h,1} & i_{h,2} & \cdots & i_{h,w} \end{bmatrix} \cdot \begin{bmatrix} w_{1,1} & w_{1,2} & \cdots & w_{1,w} \\ w_{2,1} & w_{2,2} & \cdots & w_{2,w} \\ \vdots & \vdots & \ddots & \vdots \\ w_{h,1} & w_{h,2} & \cdots & w_{h,w} \end{bmatrix} + b = \sum_n \sum_m i_{n,m} w_{n,m} + b \qquad 2.2$$

in which subscripts w and h identify the size of the input matrix along its two dimensions.

Since the whole operation described by Equation 2.2 results in a weighted sum of the elements of the input feature map followed by the addition of the bias constant, it can be implemented using MAC operations.

Equation 2.2 describes the operation of a neuron on a bidimensional signal, like a greyscale image. As already mentioned, typical input data for a neural network is represented by tri-dimensional vectors, in which the third dimension is the channel axis. In these cases, also the kernel related to each neuron is tri-dimensional and it contains a w×h matrix (with same size of the input image) for each channel of the input signal. Therefore, more in general, the dot product depicted in equation 2.2 is done for each of the mentioned channels. In order to obtain the input to the activation function, results obtained for each channel are summed, together with the bias constant, as reported in equation (2.3); in the latter, constant C in the subscript is the number of input channels.

Equation 2.3

$$\underline{I} \cdot \underline{K} = \underline{I_1} \cdot \underline{K_1} + \underline{I_2} \cdot \underline{K_2} + \cdots + \underline{I_C} \cdot \underline{K_C} + b \qquad 2.3$$

Comparing Equation 2.1 with Equation 2.2, it can be noticed that the two presented models are equivalent: in (2.1), each line of the matrix $\underline{W}$ is a mono-dimensional version of kernel $\underline{K}$ of (2.2); as in (2.2), elements of rows in $\underline{W}$ are multiplied for samples of the input signal and results are summed together. In both the equations, a polarization constant is added, which in (2.1) corresponds to elements of the vector $\underline{b}$, and a non-linear function is applied.

Equation 2.1, in conclusion, is a synthetic description of the operation of all neurons in a layer; each row of the output vector is the output of a neuron building the layer. Therefore, the activation of each neuron in a layer represents one element of its output feature map.

As mentioned, in a fully-connected layer, each neuron computes the entire input feature map, but the presented model of an artificial neuron is general and it is used in the following to describe the operation of a convolutional layer.

1.2.1 Activation Functions

The application of the non-linearity after the computation depicted in (2.2) is one of the differences between the operation of a neural network and that of other mathematical tools, called linear classifiers, which can sometimes be used for the same purposes. Probably, this is one of the features enabling the outstanding performances which can be obtained using neural networks.

The introduction of the activation function as the last step of the artificial neuron computation derives from the notion that biological neurons generate an output only when they are driven by inputs which cross a certain threshold.

Figure 4:
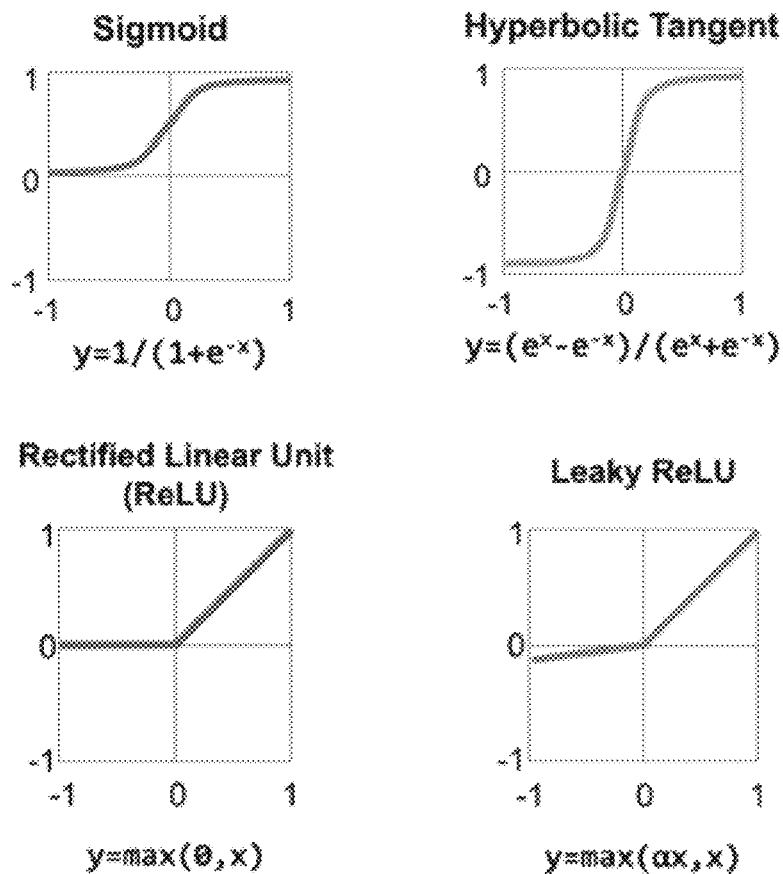
FIG. 4 illustrates examples of activation functions.

Several non-linear functions can be used for this purpose: traditionally, sigmoid and hyperbolic tangent functions were employed (see FIG. 4, which provides examples of various activation functions). A disadvantage of these functions is that they are relatively costly in terms of computation power. Therefore, later almost all neural networks began to use the Rectified Linear Unit (ReLU) as the activation function. The latter maps negative inputs to zero output, implementing the function: f(x)=max(0, x). Variations of ReLU have also been explored in order to obtain improved accuracy. An example is the leaky ReLU function, which implements: f(x)=ax, for, f(x)=x, for x>0; here α is a small, positive constant.

1.3 Convolutional Neural Networks

From the description carried out above, it should be clear that a neural network can be modeled as a collection of neurons connected in a graph. The structure of the latter depends on the type of artificial neural network considered and on the kind of layers which compose it.

In a regular neural network, the most common layer type is the fully connected one. As mentioned, in the latter each neuron is connected to all the ones in the previous layer; neurons in the same layer share no connections. In such a network, therefore, each kernel associated with a neuron has size depending on the number of the neurons in the previous layer. For example the input feature map of the input layer will be the data to process (for example a properly cropped input image in the example of image classification). Therefore, the kernel associated with each of the first layer neurons will be of the same size of the input data matrix. This is the source of a problem of regular Neural Networks: they don't scale well with the size of the input data. An example is provided concerning the image classification task. The CIFAR-10 is an image dataset, that is a collection of images, which is commonly used to train machine learning algorithms and to evaluate their performances in image classification. In this dataset, images are of size 32×32×3 only (32 pixels wide, 32 pixels high, 3 color channels). This means that the input layer of a regular neural network taking input images from CIFAR-10 would be made up of neurons with associated kernels made of 32×32×3=3072 elements each. Images of more realistic size, as 200×200×3, would lead to 120000 weights for a single input neuron. Considering that, as mentioned earlier, a single layer includes multiple neurons and that a network is made of several layers, it is clear that the number of parameters to store for such a neural network and the computational power required for the execution of its forward step would be huge. This is a big issue, recalling that there is a correlation between the depth of a neural network and its performances, as mentioned more than once.

Figure 5:
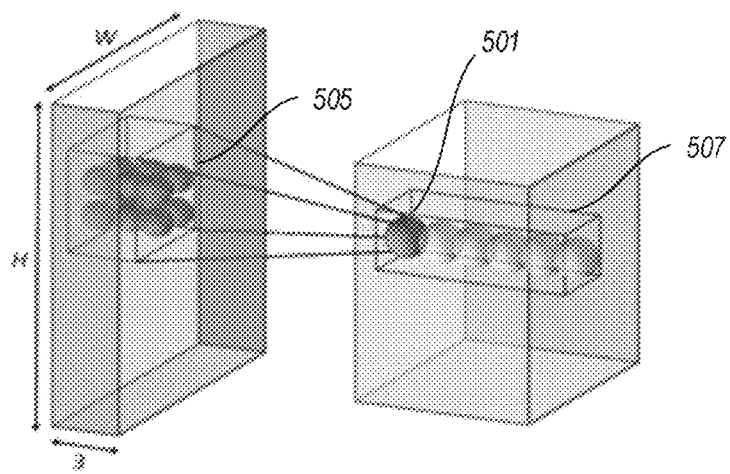
FIG. 5 illustrates example connections of neurons between layers of a CNN.

This problem is, of course, one of the reasons for the success of Convolutional Neural Networks (CNNs). CNNs are a kind of Artificial Neural Networks with some specific features:

- In their layers, neurons are typically arranged in three dimensions: width, height and depth; from now on, a single bi-dimensional slice of neurons belonging to a layer will be called depth-slice (the depth dimension of a layer should not be confused with the depth of the entire network);
- Using the brain inspired models, discussed elsewhere herein, a neuron in a convolutional layer is connected only to the neurons in a small planar region of the previous layer (across width and height), but to all neurons which are in this region in the depth dimension. For example, see FIG. 5, in which each neuron 501 of a first convolutional layer is connected only to neurons in a small 2×2 region 505 of the previous layer, but also connected to all neurons of the region 507 along the depth dimension. This feature reduces the number of parameters per neuron and consequently makes the problem of bad scalability with an input dimension less relevant in convolutional neural networks, making them more suitable for real-world application.

In order to better understand the operation of CNNs, it will be appreciated that they are made up of three main kinds of layers: convolutional, pooling and fully connected. Since the latter have already been discussed elsewhere herein, the other two types of layers are described in greater detail below.

1.3.1 Convolutional Layers

Convolutional layers are the majority in a CNN; from a mathematical point of view, they implement discrete convolution between the input feature map and one or more kernels, which number is equal to the depth dimension of the layer. Their neurons have small sized associated kernels, for example 3×3, 5×5 or 11×11 (width×height). The mentioned kernels have a small size in the planar dimensions, for example 3×3, 5×5 or 11×11 (width×height).

After this operation is carried out, the application of the activation function follows, as for a fully connected layer.

In the discrete convolution operation, a kernel slides across the input feature map; for each position, the dot product between the kernel and a kernel-sized part of the input feature map is computed. Results are collected in an output matrix, called output feature map, which has size $o_h \times o_v$, where $o_h$ is the number of horizontal positions of the kernel on the input feature map, $o_v$ is the number of vertical positions.

Figure 6:
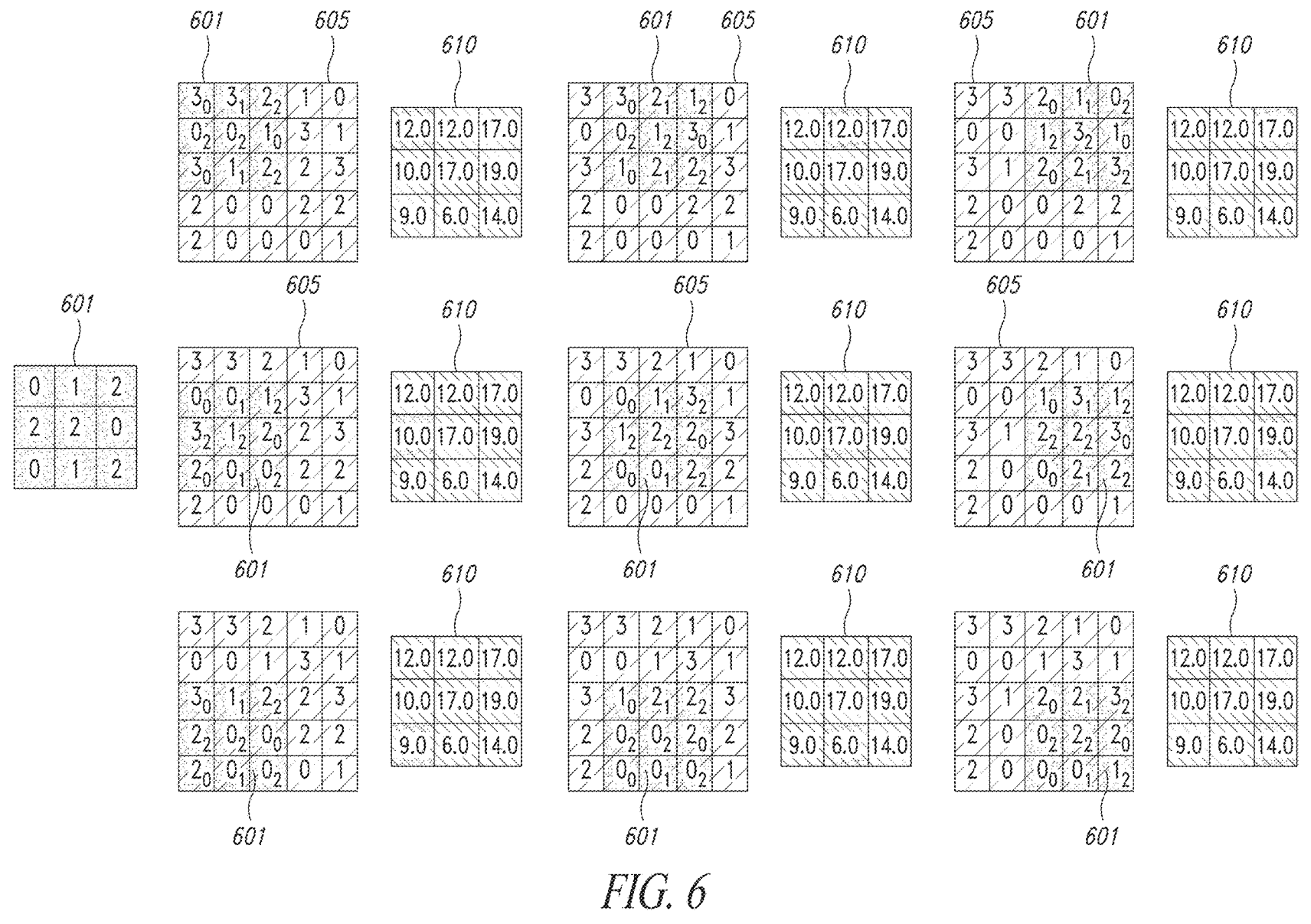

FIG. 6 shows an example of a convolution in which input feature map and kernel are 2-D matrices. In particular, FIG. 6 depicts steps of a convolution computation in which the Col. 601 is superimposed over an input feature map 605; each position determines a corresponding element on the output matrix 610.

In case of a convolution with 3-D input feature map, each kernel is a 3-D matrix too and has the same size of the input along the third dimension. Here again, the kernel will slide across the input feature map along the width and height dimensions. For each kernel position, an element of the output matrix will be computed as the dot product between kernel and a kernel-sized part of the input.

Figure 7:
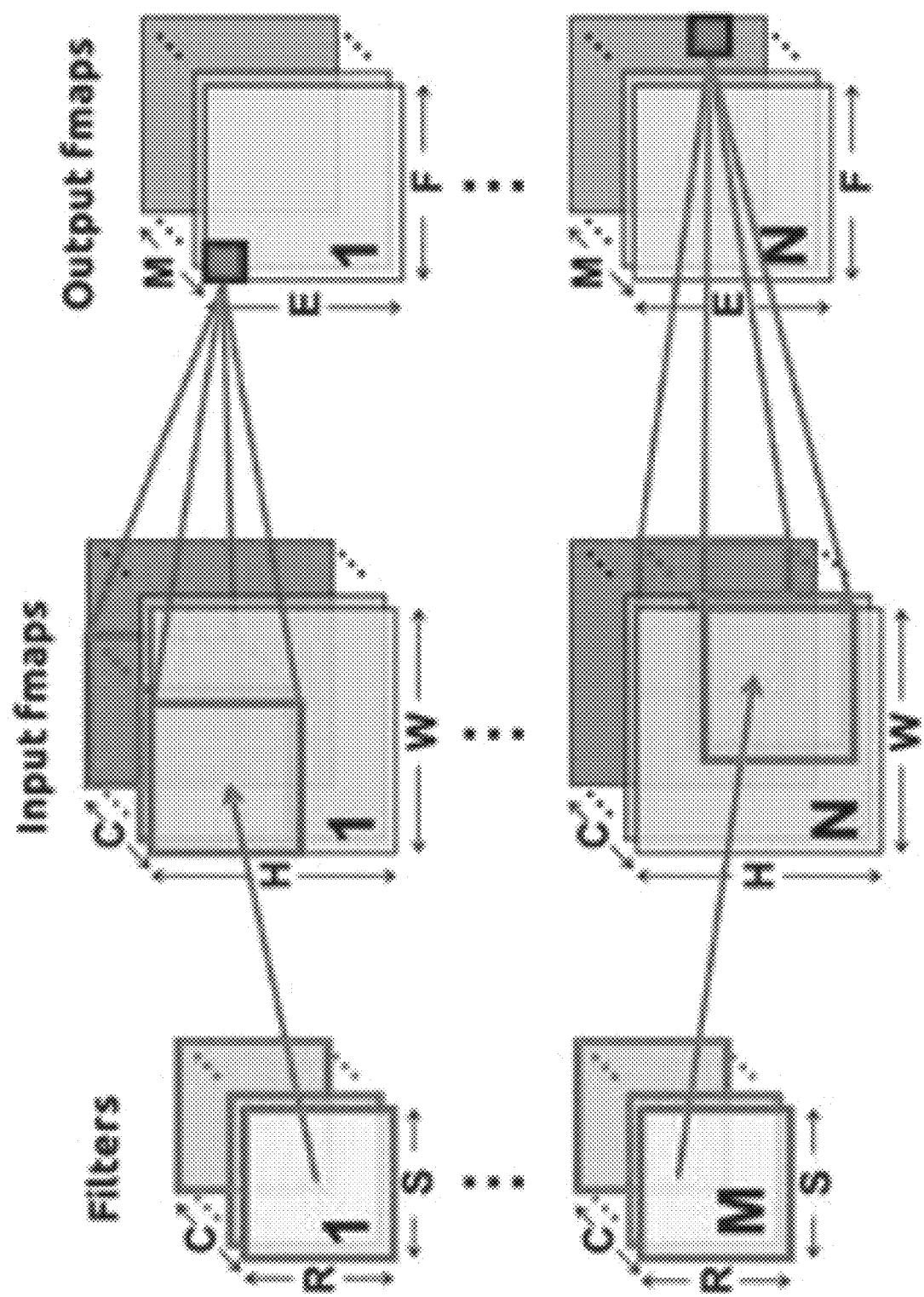
FIG. 7 illustrations an example operation of a convolutional layer with M depth-slices on N input feature maps having C channels.

As it was mentioned before, each convolutional layer implements several convolution operations using different kernels; their number corresponds to the number of depth-slices of the layer. From the description carried out above, it should be clear that each of these convolutions generates one 2-D matrix. All output matrices computed using all the kernels of a layer are stacked in the channel dimension to build the output feature map. The latter, therefore, has a number of channels equal to the depth size of the convolutional layer itself. In the example of FIG. 7 the operation of a convolutional layer with M depth-slices over N input feature maps having a height H and width W across C channels is depicted.

The operation of a convolutional layer can be also modeled using the previously described neuron model. Such a layer is characterized by parameter sharing: neurons belonging the same depth slice use the same weights and bias and they are connected to different planar regions of the previous layer. Thus, comparing the neuron model with the previous description of convolution, each neuron in a convolutional layer implements the operations related to one kernel position on the input feature map and, therefore, computes one element of the output feature map using the chosen activation function.

An intuitive interpretation of the neuron operation has been presented above, according to which it looks for a pattern in its input using the dot product. Starting from this, it is possible to state that a whole depth slice of a convolutional layer is trained to look for a single pattern in the input feature and it does this using the convolution operation. As it is known from signal processing theory, the result of a convolution is a better signal similarity index than the dot product, since it shows properties of invariance to translations.

In various embodiments, two parameters may be specified to define precisely the discrete convolution operation and, consequently, how neurons of consequent layers are to be connected.

The stride (s) is the distance between two consecutive positions of the kernel on the input feature map along a certain dimension; we will assume to use the same stride across each planar dimension.

Sometimes it is convenient to use zero-padding (p), which means to add zeros to the input feature map at the beginning and at the end of a certain dimension; we will assume to use the same padding for both dimensions.

Figure 8A:
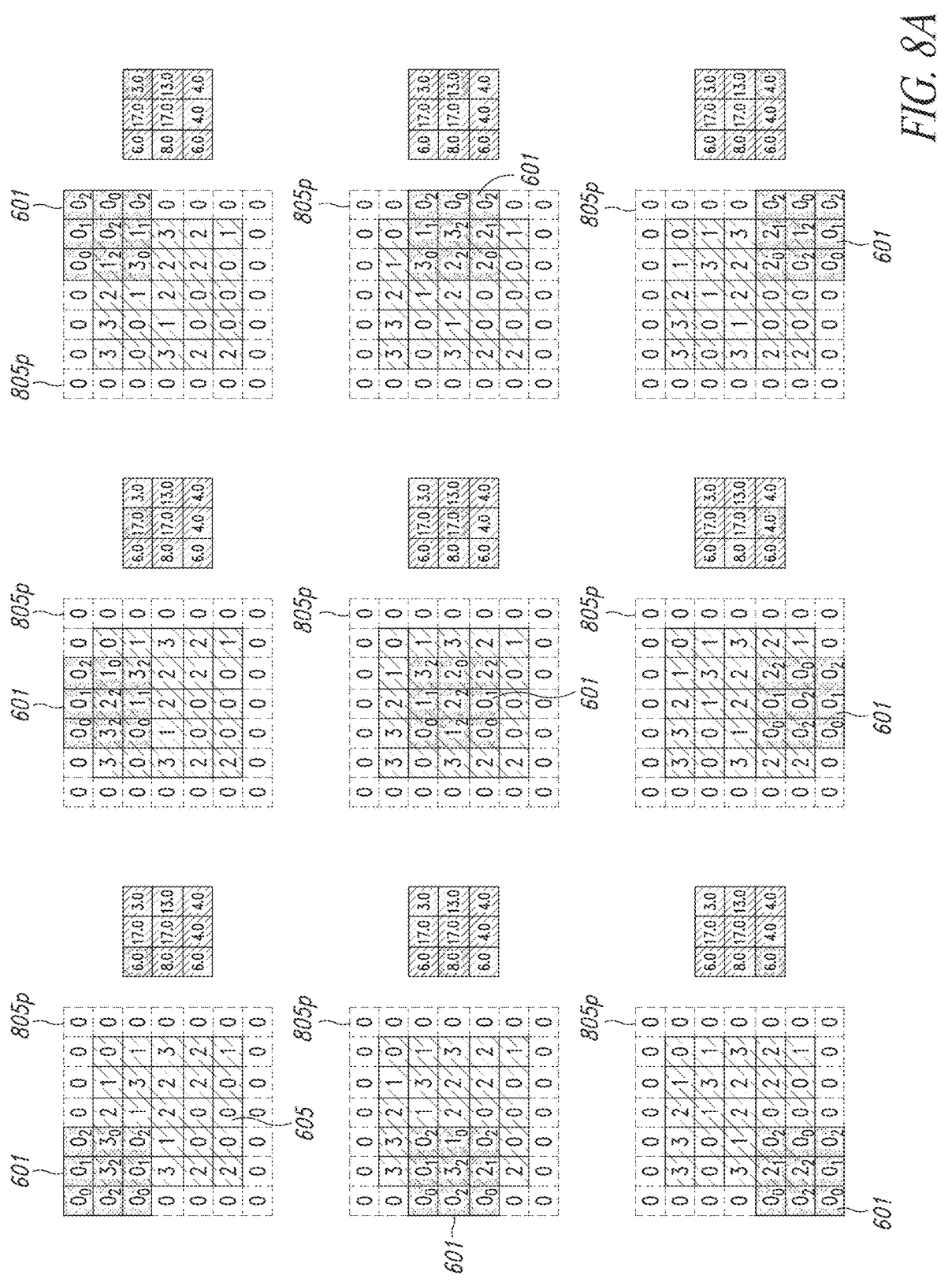
Figure 8B:
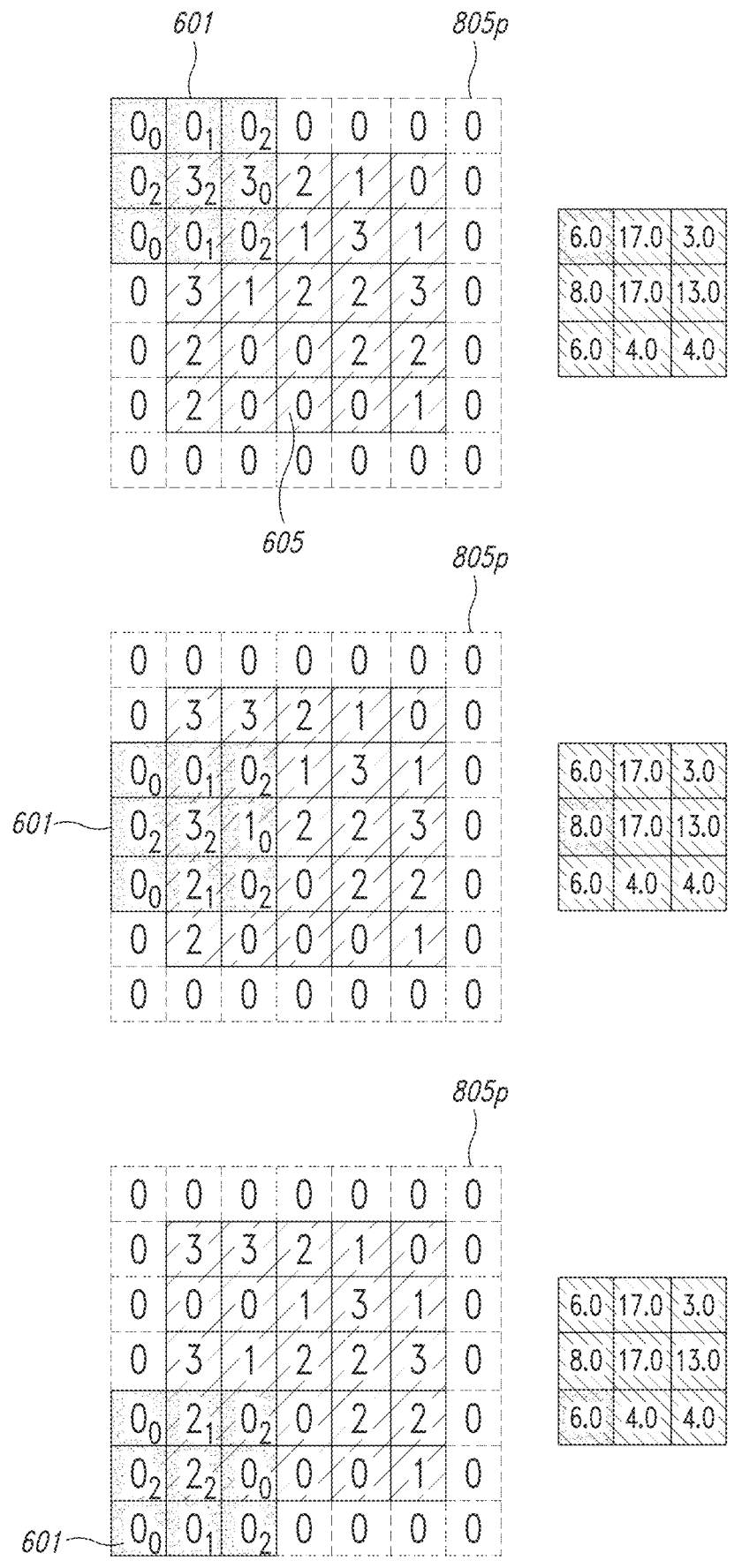
Figure 8C:
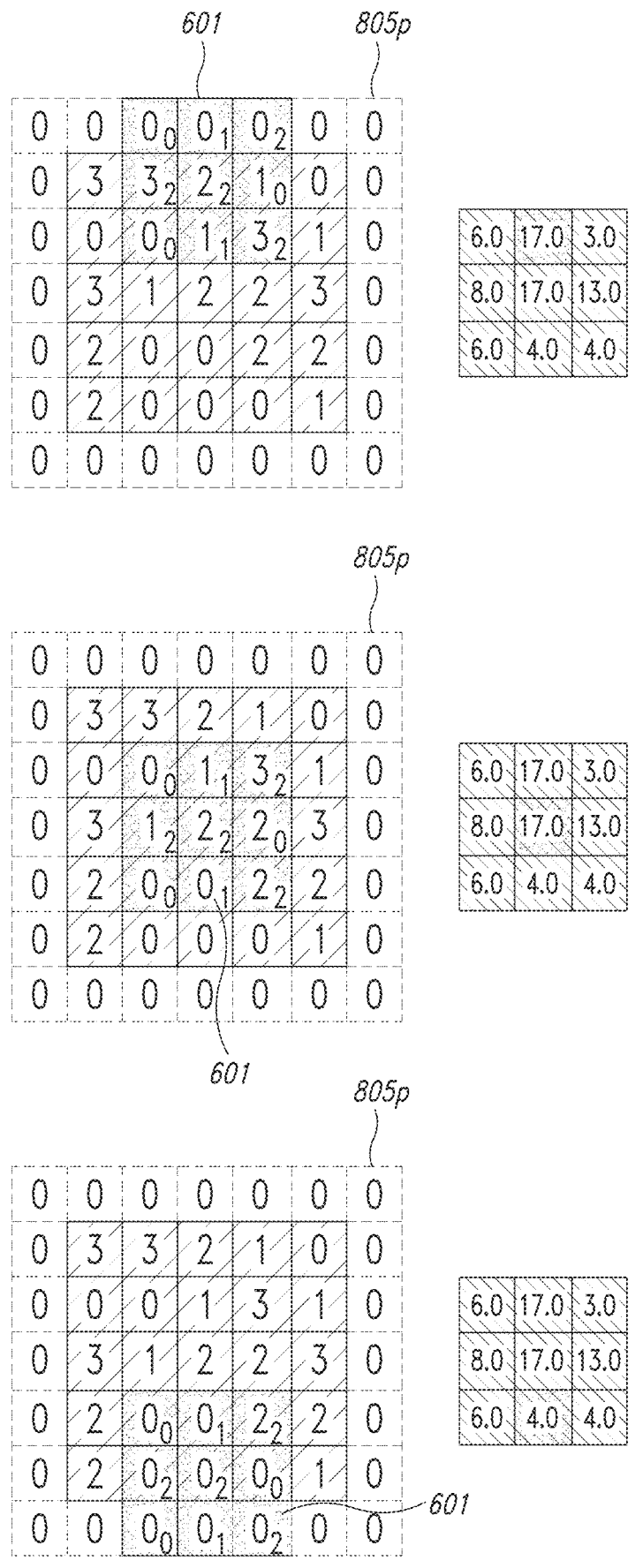
Figure 8D:
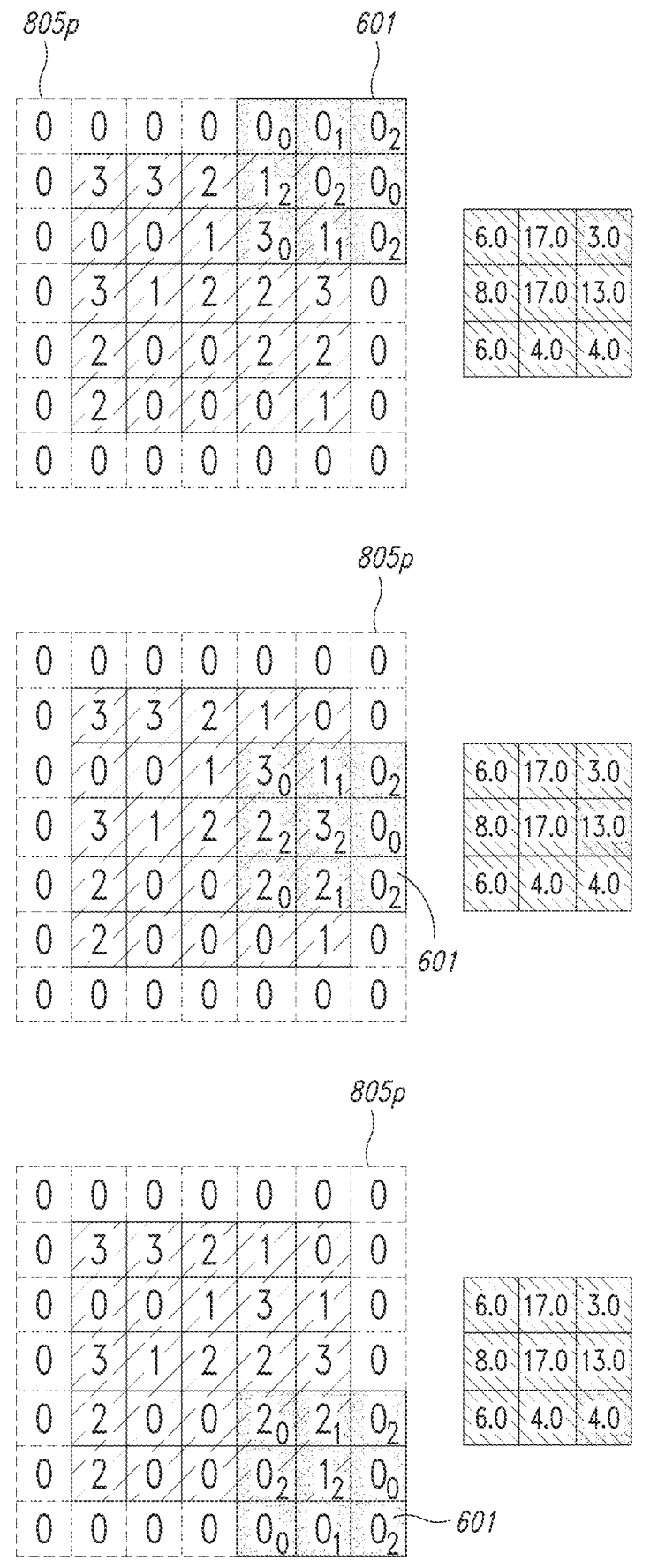

FIGS. 8A to 8D show the same kernel 601 of FIG. 6 applied to the same 5×5 input feature map 605, but with p=1 (as shown by padding 805p) and s=2. FIGS. 8B to 8D are enlarged portions of FIG. 8A.

Both the presented parameters influence the convolution operation and they affect the output feature map dimension along with kernel size and input feature map size. The precise relation between these parameters and the output size will be derived using examples; in the following discussion, both input feature map and kernel are assumed to have the same size (respectively i and k) along the two planar dimensions.

As said before, the output feature map size o is equal to the number of possible placements of the kernel on the output feature map. If s=1 and p=0, then kernel positions will differ one from another for one element shift along the considered dimension (see figure FIG. 6). If the first position of the kernel is on the leftmost part of the input feature map, it is possible to move it until it touches the right border of the input matrix; at this point, further shifts would cause part of kernel to be out of the input map (see third kernel position in FIG. 6). Therefore, in this case, the number of positions, corresponding to the output dimension, is equal to the number of possible shifts plus one, accounting for the initial position:

$$o = i - k + 1 \qquad 2.4$$

Then we use zero padding (p>0) we are adding p zeros to both edges of the input feature map along the considered dimension. The added elements represent other 2p possible positions for the kernel on the input feature map; in this case we have Equation 2.5:

$$o = i - k + 2p + 1 \qquad 2.5$$

Equation 2.5 represents the maximum number of kernel placements on the output feature map for a certain p value. If s>1, two consecutive positions of the kernel differ for a shift of s elements along the considered dimension and, therefore, the number of possible kernel moves is s times smaller (Equation 2.6):

$$o = \frac{i - k + 2p}{s} + 1 \qquad 2.6$$

Equation 2.6 represents the most general relation between the mentioned parameters and the output feature map size.

1.3.2 Pooling Layers

Pooling layers are used to do a down-sampling operation along the planar dimensions of the data traveling across a Convolutional Neural Network. More in detail, inserting these layers between the convolutional ones, a reduction in the number of parameters of a network can be achieved and, consequently, fewer operations are required to execute its forward step.

As mentioned, these layers leave the channel dimension of their input feature map unchanged, since they operate independently on each of its channels applying filters. As for convolutional layers, the mentioned filters operate on small regions of the input feature map having a fixed size. Often, filters applying a MAX operation on their inputs are used, which means that their output is equal to their maximum input; in this case these layers are called MAX-pooling. Another type of layers are average-pooling layers, in which the applied filters have an output equal to the average of their inputs.

For example, the operation of a pooling layer with filter dimension f on an input feature map of size i×i×c can be considered. Here, i is the size of the input along the planar dimensions (supposing its width is equal to its height) and c is the size along the channel dimension. If a strides is used, the output size is be o×o×c, where o is defined according to Equation 2.7:

$$o = \frac{i - f}{s} + 1 \qquad 2.7$$

Figure 9:
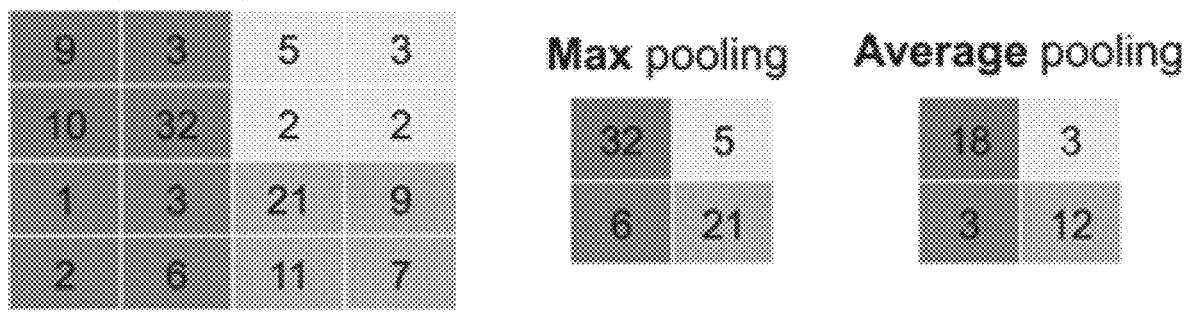
FIG. 9 illustrates an example operation of Max-pooling and Average-pooling layers having filers.

An example of the operation of pooling layers is depicted in FIG. 9. In particular, FIG. 9 shows operation of Max-pooling and Average-pooling layers having filters with f=2 and using s=2.

1.4 A Brief Discussion about Training

It was already mentioned that the set of weights and biases used in the forward step of a neural network is determined during its training step. In the following, further details on this phase of the operation of neural networks are given, considering the already presented example of a network used for image classification. In this case, the input of the feed forward operation is the image to be classified and the output is a vector of class scores.

The most common approach to tune the parameters of the network is through supervised learning. According to this technique, during the training step, the network is supplied with a group of already labeled images, called training set. The elements of the training set are used as inputs for the forward step, which is computed using the current untrained values of the network parameters. The difference between the expected results and the ones obtained is quantified using a loss function (L); this depends on the considered inputs and on the network parameter values. The final and intermediate results of each of the mentioned forward computations are used in order to numerically compute the values of the partial derivative of the loss function with respect to each of the network parameters. These values are valid for the considered input and with the current parameter values. The partial derivatives are obtained using a technique based on the chain rule of calculus for the derivative computation, called backpropagation, which may use the final and intermediate results of the computed forward step in other layers to compute the partial derivative of the loss function with reference to each of the parameters of the network. The results of this operations are the numerical values of the mentioned partial derivatives for the considered inputs and with the current values of the network parameters. The partial derivative values obtained with this technique can therefore be used to update each of the parameter values in order to minimize the average loss over the training set, according to Equation 2.8:

$$w_j^{t+1} = w_j^t - \alpha \frac{\delta}{\delta w_j} L \bigg|_{w=w_j^t \forall j} \qquad 2.8$$

In the Equation 2.8, $w_j^t$ is the current value of the considered network parameter, $w_j^{t+1}$ is its updated version; the parameter a is called learning rate.

The described procedure may be iterated multiple times in order to minimize the loss function with respect to the parameters of the network.

The different possible definitions for the loss function and the criteria leading to the choice of a function are not examined here since they go beyond the purposes of this discussion, which has only the aim of giving an intuitive explanation of the training process. The same holds for the details of the backpropagation technique and the update of the parameters.

1.5 Considerations about Feed-Forward Processing Implementation

Of the whole discussion carried out about neural networks, some concepts provide the basis for the following sections. First, it was shown that the operation of the fundamental computational unit of a neural network, the neuron, can be arranged as a weighted sum of its input values. Therefore, as mentioned previously, this operation can be implemented in hardware with MAC units.

The discrete convolution operation was also examined, and its variants due to the parameters which can be specified, namely stride and zero-padding, were considered. From this point of view, the convolution may seem a complex task to execute. Nonetheless, it was shown that it can be described using the mentioned neuron model, considering parameter sharing and specifying the connections between the layers according to the values of the parameters.

From the considerations carried out, it is possible to conclude that the implementation of the forward step of a neural network, and of convolutional layers particularly, can be divided into two problems. First, most of the computations performed in order to determine the output vector can be implemented with MAC operations. It was already pointed out that a lot of multiply-accumulate operations are employed in the forward step and, therefore, computational efficiency is a consideration. As mentioned in the introduction chapter, a purpose of the present disclosure is to develop a MAC architecture which is efficient in implementing the computations required to compute the convolutions of a CNN.

In order to use MAC units to implement complex operations, as convolutions with given stride and padding values, a high-level organization of the computation may be employed. The latter, for example, determines which data is to be computed, in what order and how the output of the MAC operations are interpreted and combined. There are different scheduling methods and system architectures which allow the efficient implementation of the forward step, many of them organize the computation using batches of data. For example, the weighted sum corresponding to a neuron operation can be implemented dividing it in smaller MAC computations which results are to be summed together. A common way to do this is to divide feature maps and, consequently, kernels along their channel dimension. In this way, batches of data containing b channels are created; the parameter b is commonly called batch size. This approach is often used to take advantage of the parallelism of a hardware architecture. Other strategies can be used to enhance data locality and, thus, reduce memory accesses.

2 Serial Architectures

As already mentioned, serial architectures are traditionally used as an alternative to bit-parallel designs in order to match the application specific constraints on hardware.

Indeed, not always common bit-parallel architectures are the most suitable choice: these process all the bits of all their input sample words in each clock cycle and, in order to do that, occupy a large area and require complex wiring. In the following discussion, the number of bits of a word coding an entire sample will be identified as W.

Bit-serial and digit-serial architectures, on the other hand, process respectively one bit or more than one bit of the input samples per clock cycle; as already mentioned and reported in literature, these architectures are usually considered for applications in which low or moderate computation rates are required and therefore it is possible to trade processing speed with a reduction in hardware complexity and area occupation.

As noted elsewhere herein, a focus of the present disclosure is on digit-serial architectures; nonetheless, a brief description of bit-serial architectures is carried out in the next section since a proper understanding of bit-serial computation helps to approach the digit-serial one. After the two serial architectures are introduced and compared, methods to obtain digit-serial structures are described and some examples of digit-serial units are presented. Elsewhere in this disclosure, word level unfolding is presented as a technique to adapt the computation rate of a serial structure to the data rate of a parallel processing context.

2.1 Bit-Serial Architectures

In bit-serial architectures, only one bit of each input sample is taken in each clock period and the outputs are streamed one bit at the time. For this reason, input and output ports of a bit-serial architecture are made of one single wire on which words are transmitted in bit-serial format, one after another, with no brakes in between.

From the short description of bit-serial units made, it is already possible to observe that word-length is a constant in the entire bit-serial circuit. This is because the contrary would imply a mismatch between input and output data rates and, in order to have output words with more than W bits from a bit-serial unit with W bit inputs, more than W bits should be produced in the W cycles in which the inputs are processed. Another option which would allow enlarging the word-length would be using more than W cycles to produce the output word; in such a way, however, one computation would take more cycles than the W in which the related input samples are transferred to the input ports of the unit. As a consequence, one or more words of the input data streams would be totally or partially lost.

A direct consequence of the input words being processed one bit at the time and of the constant word length all over the circuit is that a full computation takes W cycles to be completed from a bit-serial unit. More in detail, there are two modes in which a bit-serial computation can be carried out: least-significant-bit first (LSB first), which is the most common, and most-significant-bit first (MSB first).

Thinking about arithmetic operations, one of the reasons for which the most diffused bit-serial format is LSB first, is that it allows to process the least significant digits of the output and the related carries in the first cycles; carry signals can be therefore delayed and used as an input in the following computation cycle.

In a context in which a single operation takes more than one cycle, we define the concept of latency of an operator, at least for the simplest case in which we suppose that all inputs arrive in the same clock cycle and all outputs are produced at the same time. In the presented conditions and embodiment, latency is defined as the number of clock cycles between the arrival of the first bit of the input words at the input of a bit-serial operator and the appearance of the first bit of the output word, at its output. It will be appreciated that latency and timing of a structure may be depicted using a timing diagram of the unit.

As already mentioned, during normal operation of a bit-serial structure, consecutive words transmitted to the same input of a unit, and processed one after another, follow each other on the mentioned input port without any break; some indication may be used for operators to understand the end of a sample and the beginning of the next one. This information may be given using timing signals, often identified with the name "TIME", which are one-bit wide periodic signals having high logic value in the period when the first or the last bit of a sample (according to the specific implementation of the operator) is being transferred, low logic value otherwise. Since usually each bit-serial unit is followed by a register stage, various operators in the circuit will receive their inputs in different clock periods and therefore they receive different timing signals. However, from the description of the timing signals made, it should be clear that only W different timing signals are possible and they all can be obtained delaying the signal indicating the timing of the input data signals; the latter is to be generated or given as input from outside the unit. For these reasons, the control logic required for bit-serial circuits is very simple, but in large circuits, where each of the timing signals could have a large fanout, having sufficient driving strength may be a concern.

Figure 10:
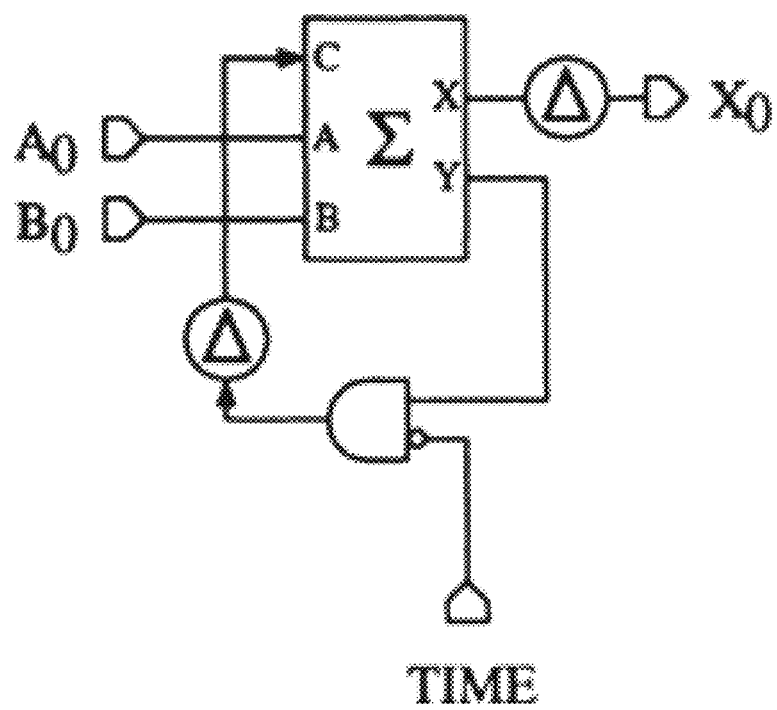
FIG. 10 illustrates an embodiment of a bit-serial adder architecture.

In order to better understand what was told about bit-serial architectures and bit-serial computation, it's useful to consider the example of a bit-serial adder circuit, shown in FIG. 10. The considered adder is composed by a single full-adder: bits of the addends arrive on the single line input ports of the unit one bit per time in LSB-first format; during every clock cycle, current bits of the addends are added together, along with the carry generated in the previous cycle, in order to compute one bit of the output sum and the carry output. Both computed signals are delayed: the first goes to the output line of the unit, the second is fed back and constitutes the carry input in the next clock cycle. TIME signal is used to reset the carry register when a new addition is to be computed. In this implementation of the circuit, the timing signal is 1 during the last cycle of computation in order to have 0 on the output of the carry register at the beginning of the following period, when a new computation begins.

In conclusion, embodiments of the present disclosure illuminate various advantages and disadvantages of bit-serial architectures which can be derived from the description carried out and from the depicted implementations. First, a system architecture build using bit-serial units advantageously occupies a much smaller area since, compared with their bit-parallel counterparts, they are smaller and have reduced wiring overhead, having a smaller number of input and output wires. Furthermore, higher clock frequencies can be used for bit-serial units since their critical paths and, consequently, their propagation delays are smaller (see for example the serial adder circuit where there is no carry propagation in the combinatorial circuit unlike in a bit-parallel adder).

2.2 Digit-Serial Architectures

As bit-serial units have been discussed above, digit-serial architectures are now introduced as a generalization of the latter, something in-between bit-serial and bit-parallel units. They compute more than one bit, but not all W bits of their input samples in each clock cycle; usually, the number of bits (N) computed in one clock cycle is a divisor of the number of bits in a sample word and it's referred to as digit-size. This parameter is often also called width of the digit-serial signal; the length of the latter is the number of digits composing an entire sample word and it's identified as P=W/N. The sequence of W/N clock cycles in which a digit-serial signal is transmitted is called sample period and corresponds to the time required from a digit-serial unit to carry out an entire computation.

Since in digit-serial computation more than one bit is processed in each clock cycle, typically digit-serial architectures require more hardware than their bit-serial counterparts; furthermore, their input and output ports are made of N wires. The area occupied by a digit-serial implementation, therefore, grows with the digit-size of the latter. Larger values of N, however, make the overhead due to timing logic and feedback loops relatively less relevant, since this circuitry is amortized over a bigger hardware architecture. In addition, the duration of the sample period is reduced for bigger values of N and, consequently, there is an improvement in the computation rate of the unit.

The overall conclusion is that, changing the digit size, a trade-off can be done between data rate and area occupation; for each value of N, a different digit-serial implementation is obtained. In this perspective, bit-serial and bit-parallel architectures can be obtained as extreme cases of digit-serial units in which, respectively, N=1 or N=W.

As has been shown elsewhere, the efficiency of a silicon implementation of an operation or an algorithm may be measured using the parameter 1/AT, where A is the area occupied by the hardware and T is a measure of its throughput.

Figure 11:
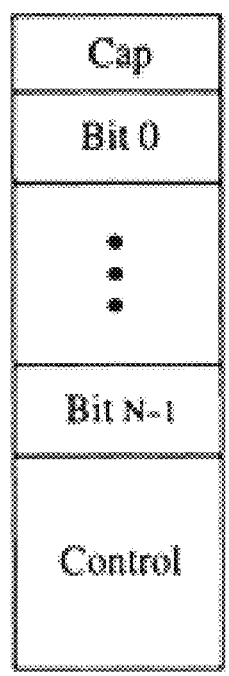
FIG. 11 is a schematic representation of a digit-serial layout cell of an embodiment.

The area occupation of a certain implementation is strongly dependent on technology parameters, but general considerations can be done making some assumptions. If a standard cell approach is considered and bit-slicing is used, a layout cell implementing an operation on input digits will be composed of several sub-cells which, usually, are vertically stacked. The mentioned sub-cells can be distinguished in three types: a SLICE cell contains the circuitry implementing the required operation on one bit of the input digits and, therefore, it is repeated N times in the layout cell (there is one SLICE cell for each bit in the digit); CAP and CONTROL cells are contained once in each layout cell and include, respectively, connections and the mentioned control and timing logic required for serial implementations. A schematic representation of a digit-serial layout cell is depicted in FIG. 11.

A consequence of this organization of the circuit is that there is a constant contribution $a_0$ to the overall area of a design, which is not dependent on the digit-size chosen because it's due to the overhead circuitry required in serial designs and to the clock and power distribution lines. In addition to $a_0$, each bit-slice requires an area which is be referred to as $a_s$. Therefore, the total area occupied by a digit-serial design can be estimated as shown in Equation 3.1:

$$A = a_0 + N a_s \qquad 3.1$$

Figure 12:
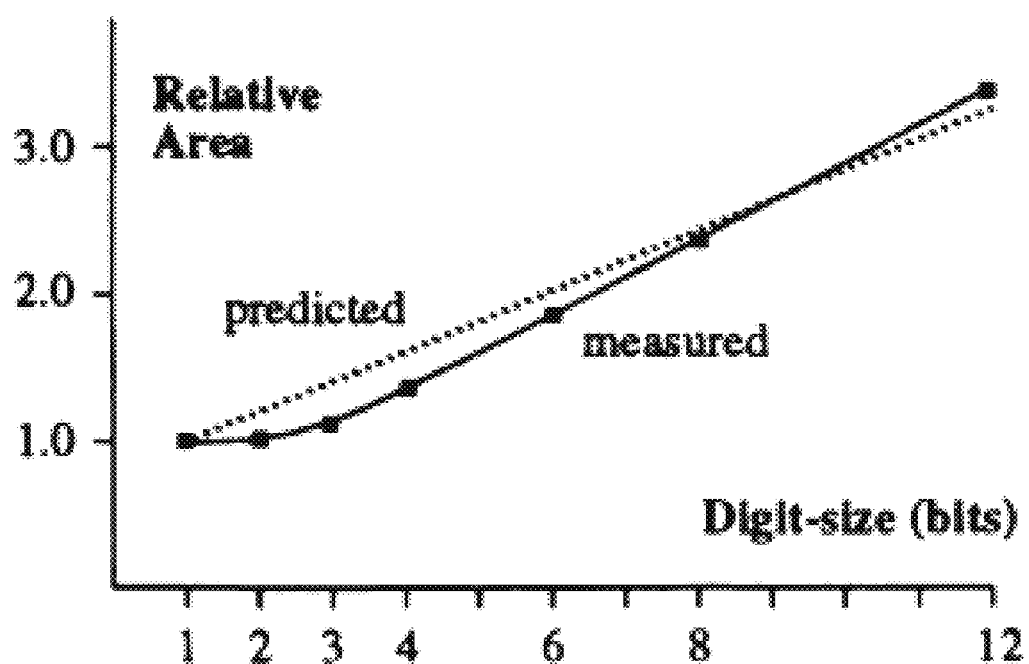
FIG. 12 is a graphical representation of an example area occupation versus digit size.

A reasonable estimation, based on hardware implementations of typical operators, is that $a_0 \approx 4a_s$. This predicted linear dependency between digit-size and area occupation, however, does not hold for low values of the digit-size: the actual area occupied, generally, is smaller than the theoretical one, as depicted in FIG. 12. This happens because some contributors to $a_0$, such as constant generation circuits for timing signals, actually become smaller when digit size increases; this dependence is relevant for low values of the digit-size (i.e. timing signals have smaller period for higher N, since the sample period is reduced, therefore counter units used to generate them can be smaller and less registers are required in order to generate all the WIN timing signals).

For this reason, as depicted in FIG. 12, for values of the digit-size between one and four, there is only a slight growth of area occupation, while throughput grows, as explained in greater detail below. FIG. 12 illustrates area occupation versus digit size; the area values are normalized to the area occupation of the bit-serial architecture. This shows an advantage of digit-serial implementations.

For what concerns the throughput of digit-serial architectures, an entire computation is carried out in an entire sample period, which is P=W/N clock cycles; this is true in implementations in which the rule of having a constant word length all over the circuit is respected. As for all synchronous circuits, the minimum clock period suitable can be determined as the addition of a constant part $t_o$, due to setup and clock to output times of the registers used in it, and of the delay of the path in the combinatorial logic. The latter, in a digit-serial unit, can be approximated as $Nt_s$, where $t_s$ is the delay due to a single bit slice. The duration of a sample period, therefore, can be estimated as shown in Equation 3.2:

$$T = (t_0 + Nt_s)\frac{W}{N} \qquad 3.2$$

Figure 13:
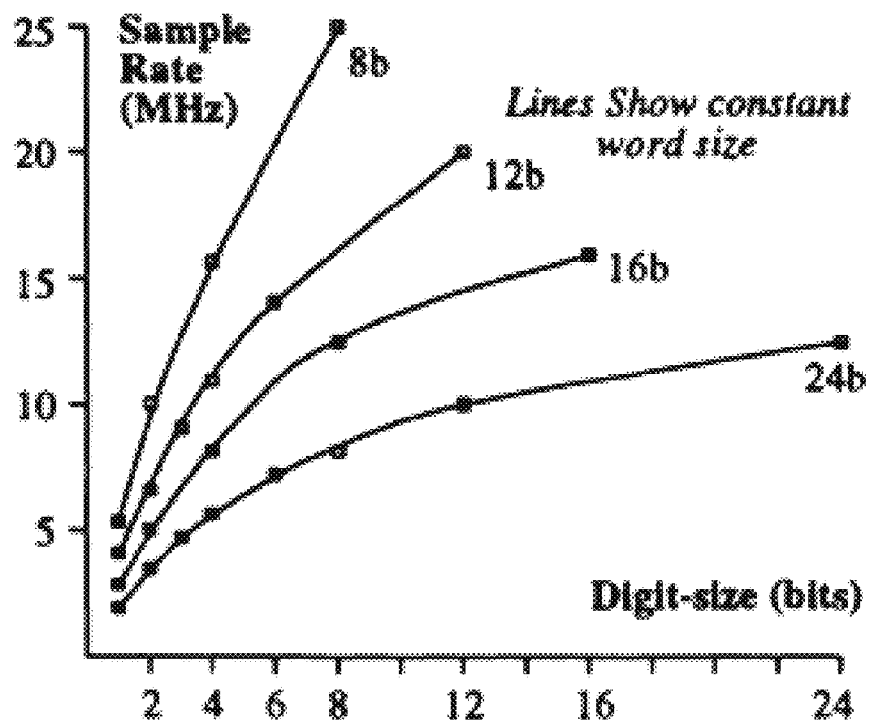
FIG. 13 illustrates an example of throughput versus digit-size of an embodiment.

The reciprocal of the parameter computed in Equation 3.2 can be used as an estimation of the throughput of a given architecture. Since a reasonable estimation is $t_0 \approx 8t_s$, in the plot of FIG. 13, a quasi-linear dependence between digit-size and throughput can be observed for low values of the digit-size, for which the clock period is almost equal to $t_0$. For bigger values of the digit-size, throughput grows sub-linearly with the digit-size because of the growth of the clock period due to the term $Nt_s$.

The throughput efficiency of the design can be therefore computed as the reciprocal of the value computed in Equation 3.3:

$$AT = \frac{W(a_0 + Na_s)(t_0 + Nt_s)}{N} \qquad 3.3$$

The value of the digit-size minimizing AT can be determined analytically computing the derivative of the second member of Equation 3.3 and imposing that the latter is equal to zero. Since W appears as a multiplicative constant in equation 3.3, the analytically derived value of the optimal digit-size is independent from the word length; its value is showed in Equation 3.4:

$$N = \sqrt{\frac{a_0 t_0}{a_s t_s}} \approx 6 \qquad 3.4$$

Figure 14:
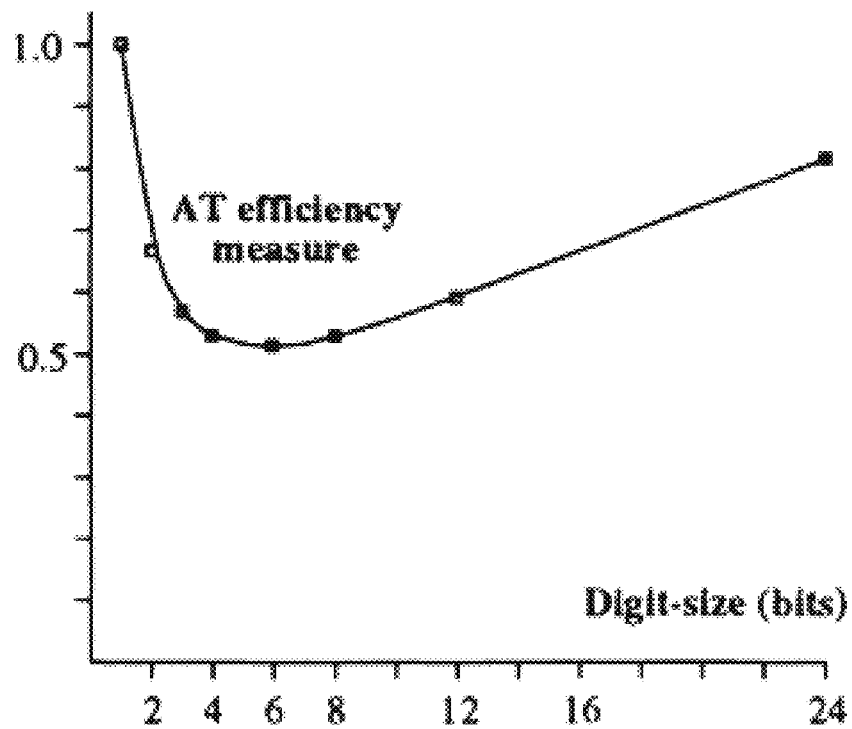
FIG. 14 is an example illustration of area-time product versus digit-size.

Considering that, as already mentioned, the digit-size value usually chosen is a divisor of the word length, in general, the optimal value of N is between 4 and 8 bits. FIG. 14 shows a plot of area-time product AT versus digit-size for an example in which W=24.

2.3 Design Methods for Digit-Serial Architectures

In the following section the basic principles of three different design methods used to derive digit-serial structures from bit-serial or bit-parallel architectures are presented. Bit-level unfolding and folding are systematic techniques that may be used to obtain these architectures. One or more alternative methods may allow obtaining units with reduced number of feedback loops, suitable for bit-level pipelining.

2.3.1 Bit-Level Unfolding

This technique is used to obtain digit-serial units from bit-serial implementations and assumes that the starting bit-serial architecture is a synchronous circuit, which usually is the case.

Figure 15:
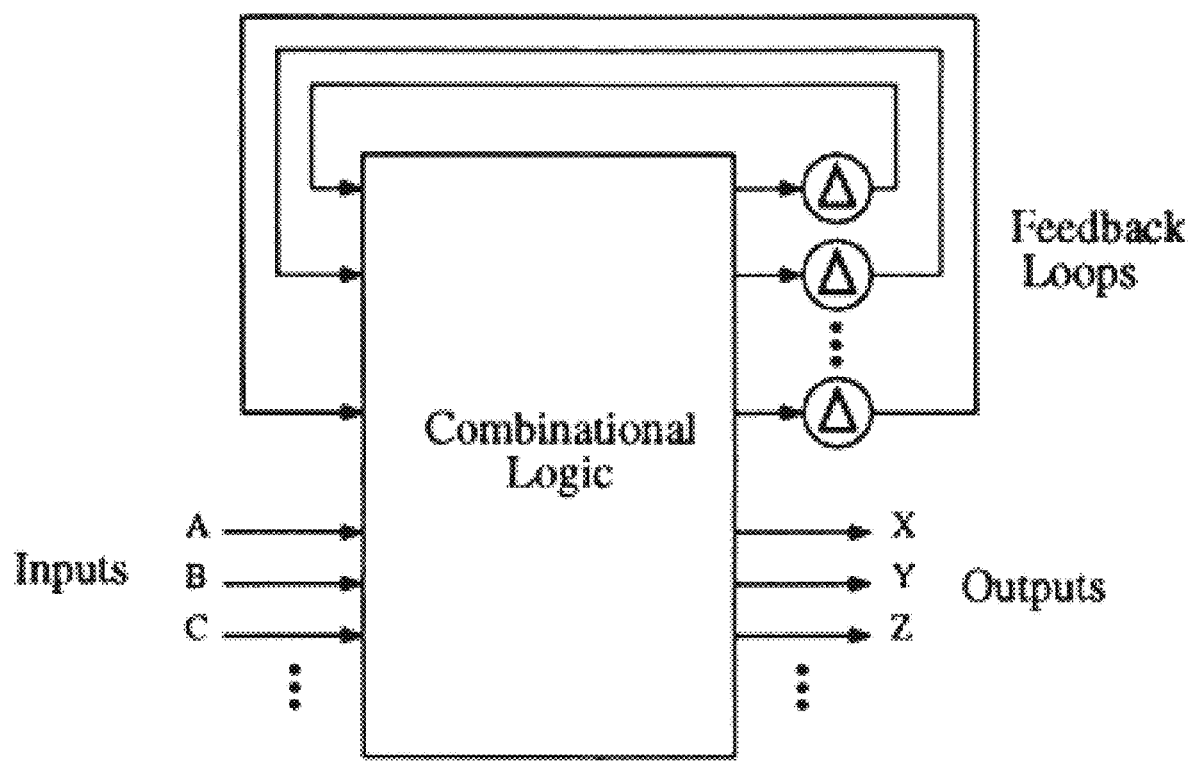
FIG. 15 illustrates an example scheme of a synchronous system.

A synchronous system can be 38abelled as a combinatorial circuit M having inputs, 38abelled as A, B, C, . . . , and outputs, identified by X, Y, Z, . . . ; feedback loops are present, with registers introducing at least one clock cycle delay on signals transmitted on them. A schematic representation of a synchronous system is depicted in FIG. 15.

Values assumed by signals in a given clock cycle, identified by the index i, will be identified with the symbol of the port by which they are transmitted followed by the mentioned index. For example, the sequence of inputs transmitted on input port A is: A(0), A(1), . . . .

Figure 16:
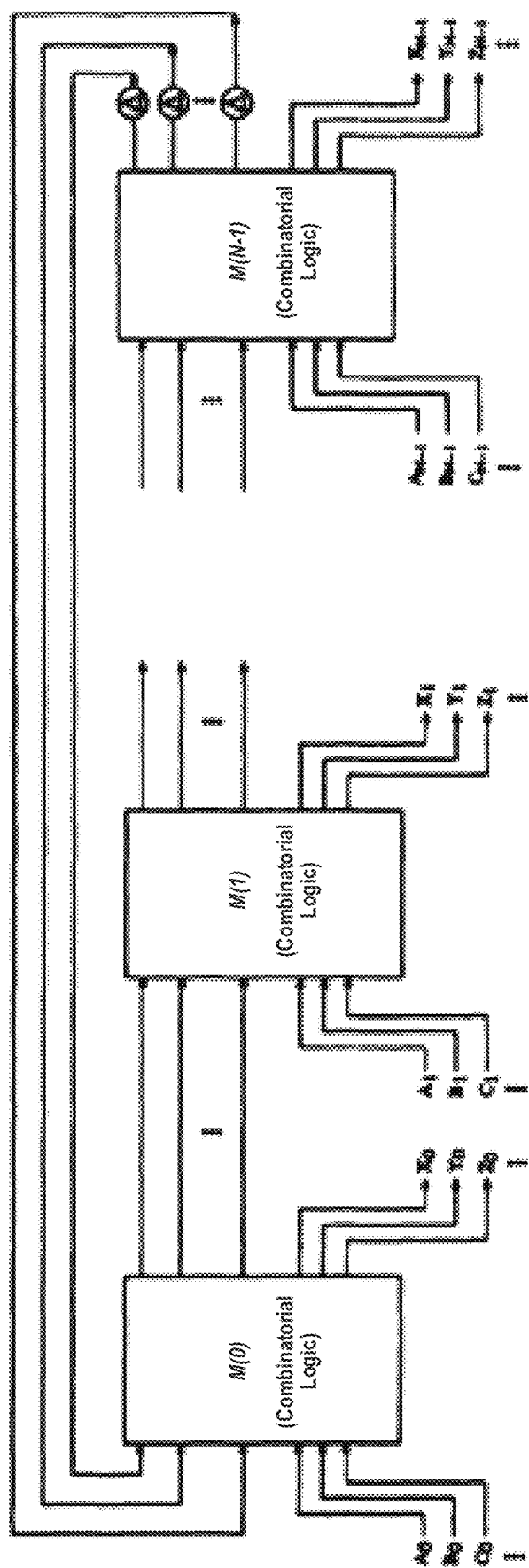
FIG. 16 illustrates an example scheme of a circuit obtained using a bit-level unfolding transformation.

According to the bit-level unfolding transformation, in order to obtain a digit-serial circuit with digit size N, the combinatorial part of the circuit M is replicated N times in order to obtain N units: M(0), M(1), . . . , M(N−1). Wires which were fed back in the original architecture, and which signals were delayed, are replaced by combinatorial connections between adjacent M blocks, as depicted in FIG. 16. A delay is implemented on the connection between M(N−1) and M(0).

Sequences of N values of the input and output signals which are, respectively, given as input and produced in N consecutive clock cycles in the original architecture, are presented and read in parallel in the new unit: values of the signal associated with a certain port and identified by the index number i are associated to the same port of the combinatorial circuit M(i). In general, in a given time instant t, the block M(i) receives the same inputs and produces the same outputs which are on input and output ports of the original unit in cycle Nt+i. With this mechanism, the single wire ports of the original unit become N bit ports in the new structure.

In the unfolding of two nodes connected by wires with more than one register, signals are delayed by i cycles. For the value of the signal on the node a in the $j^{th}$ clock cycle to arrive to node b in the $(j+i)^{th}$ cycle, more cases are taken into account:

i<N:
  j∈[0; N−i−1]→node a of the block $M_j$ is to be connected with node b of the unit $M_{j+1}$ with no delays in between;
  j∈[N−i; N−1]→node a of the block $M_1$ is to be connected with node b of the unit $M_{j+i-N}$ with one cycle delay;

i≥N→node a of the block $M_j$ is to be connected with node b of the unit $M_{(j+i)mod N}$ with $$\left\lfloor \frac{j+i}{N} \right\rfloor$$

delays.

In the expressions presented in the last case, (j+i)mod N is the remainder of the integer division between j+i and N and $$\left\lfloor \frac{j+i}{N} \right\rfloor$$

is the largest integer which is less or equal to the result of $$\frac{j+i}{N}.$$

2.3.2 Folding Transformation

This transformation is used in order to obtain a digit-serial architecture starting from a bit-parallel data-flow graph description of an algorithm. The result of the transformation is a hardware architecture in which units are re-used P times to execute P operations of the original data-flow graph; the mentioned tasks are said to be "folded" in a single unit. More in detail, the operation of a given unit, in the architecture obtained using the transformation, is a cycle divided in P phases, one for each task folded in the unit; execution phases are indexed with numbers between 0 and P−1. Inputs to the obtained hardware units will be switches, implemented using multiplexers, selecting in each phase the right input for the operation to be executed. The folding set used in the transformation specifies which hardware unit executes a certain task of the starting algorithm and in what phase of its operation this is done. Folding sets can be specified giving the sequence of the operations executed by each hardware unit: for example, H={OP(b), OP(z), . . . , OP(a)} means that operation OP(b) is executed in the first phase of the execution cycle of hardware unit H. In other words, the operation takes place in the first clock period, which can be identified with a time partition index 0, and in all cycles which can be identified by an index Pl, where l is an integer number. In the specified folding set, OP(a) is executed in the second phase of the execution cycle, that is in clock cycles identified by an index Pl+1, and so on. Folding sets can be also specified associating to each operation the hardware unit and the phase in which they are executed, i.e. OP(b)={H|0}, . . . , OP(a)={H|P}.

The transformation gives a systematic method to compute the number of delays ($D_F$) that are to be inserted between two nodes in the folded architecture. The case in which the result of the task U, executed by the hardware unit $H_U$ in phase u of its computation cycle, is to be used by the task V, which is executed by $H_V$ in phase v, is considered. Supposing that computation cycles of both hardware units are made of P phases and that i delays are interposed between the output of the task U and the input of the task V, in the starting data flow graph, then $D_F$ can be computed as reported in equation 3.5, where $S_U$ is the number of pipeline stages in unit $H_U$.

Equation 3.5:

$$D_F(U \to V) = Pi - S_U + v - u \qquad 3.5$$

Equation 3.5 can be explained considering that execution of the task U by unit $H_U$ is concluded in time instance Pl+u+$S_u$ and the result is ready on its output in the same cycle. The indicated result may be used in time instance P(l+i)+v by $H_V$, since i delays in the original algorithm correspond to Pi delays in the obtained architecture. Equation 3.5 can be derived subtracting the time instances when the mentioned result is employed by $H_V$ and when it's produced by $H_V$.

If all delays computed using Equation 3.5 are non-negative, they can be used in order to implement the folded architecture; if one or more values are negative, pipelining may be used in order to obtain the final architecture.

An example of how this transformation can be used to derive a digit-serial structure is presented below, where the presented method is used to derive the architecture of the multiplier used in the described MAC architecture.

2.3.3 Design Method for Bit Level Pipelinable Architectures

With this last method, digit-serial architectures are derived directly from bit-serial ones, keeping their structure at a system level and substituting functional units used in it with ones derived generalizing the bit-serial computation algorithm for a digit-size N>1. This method is remarkable because its use allows obtaining digit-serial architectures which can be pipelined at a bit-level; this enables these units to reach high clock rates or to trade speed with a reduction in power consumption. This is interesting since digit-serial structures obtained with other techniques cannot be pipelined at such a fine grain level because of the feedback loops contained in them.

2.4 Examples of Digit-Serial Units

2.4.1 Adder-Subtractor Unit

Figure 17:
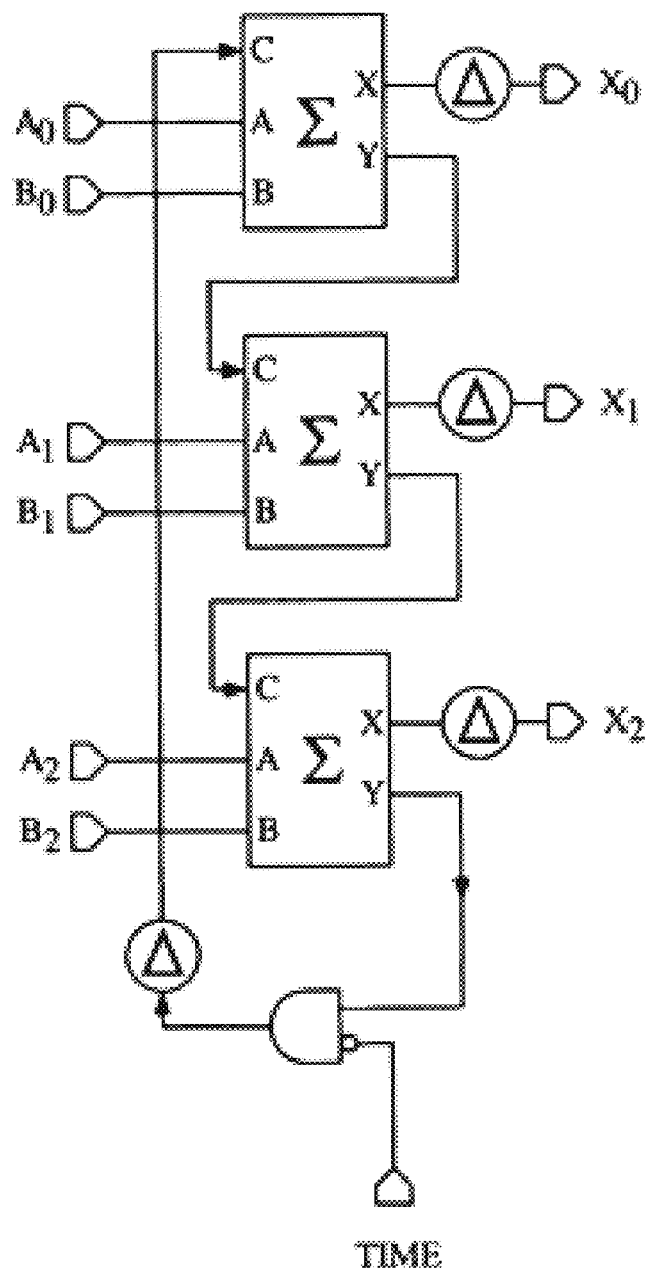
FIG. 17 illustrates an example digit-serial adder circuit with digit-size of 3 bits.

The simplest example of a digit-serial architecture is a digit-serial adder unit which can be obtained from the bit-serial adder shown in FIG. 17 through bit-level unfolding or from a bit-parallel adder using the presented folding transformation.

In FIG. 17 an example of a digit-serial adder with digit-size of 3 bits is depicted. The operation of this unit is a generalization of one of the bit-serial counterparts: in each clock cycle 3 bits of the addends are summed together, along with the carry out computed in the previous clock cycle. In the last computation phase of the addition a high value of the TIME signal causes the synchronous reset of the carry register on the feedback path and ensures a zero value of the carry input in the first phase of the following computation.

An adder-subtractor circuit may be obtained from the circuit depicted in FIG. 17 adding an XOR stage on one of the two inputs in order to invert the bits of one of the addends when a sub control signal is high; the same signal is summed as a carry input in the first phase of the subtraction in order to complete the 2's complement conversion of the mentioned input.

2.4.2 Comparison Unit

Comparison operators give a binary output result which states if a certain order relationship is verified between two input values (i.e. A>B, A<B, A≥B, A≤B etc.). These operators may be implemented in hardware using subtractor units and looking at the sign of the output to determine the result. The problem of implementing these operations using serial architectures is that the information required to produce the output is contained in the most significant digit of the result and, therefore, in an LSD-first computation context as the one considered, these implementations have a latency of an entire sample period.

Figure 18:
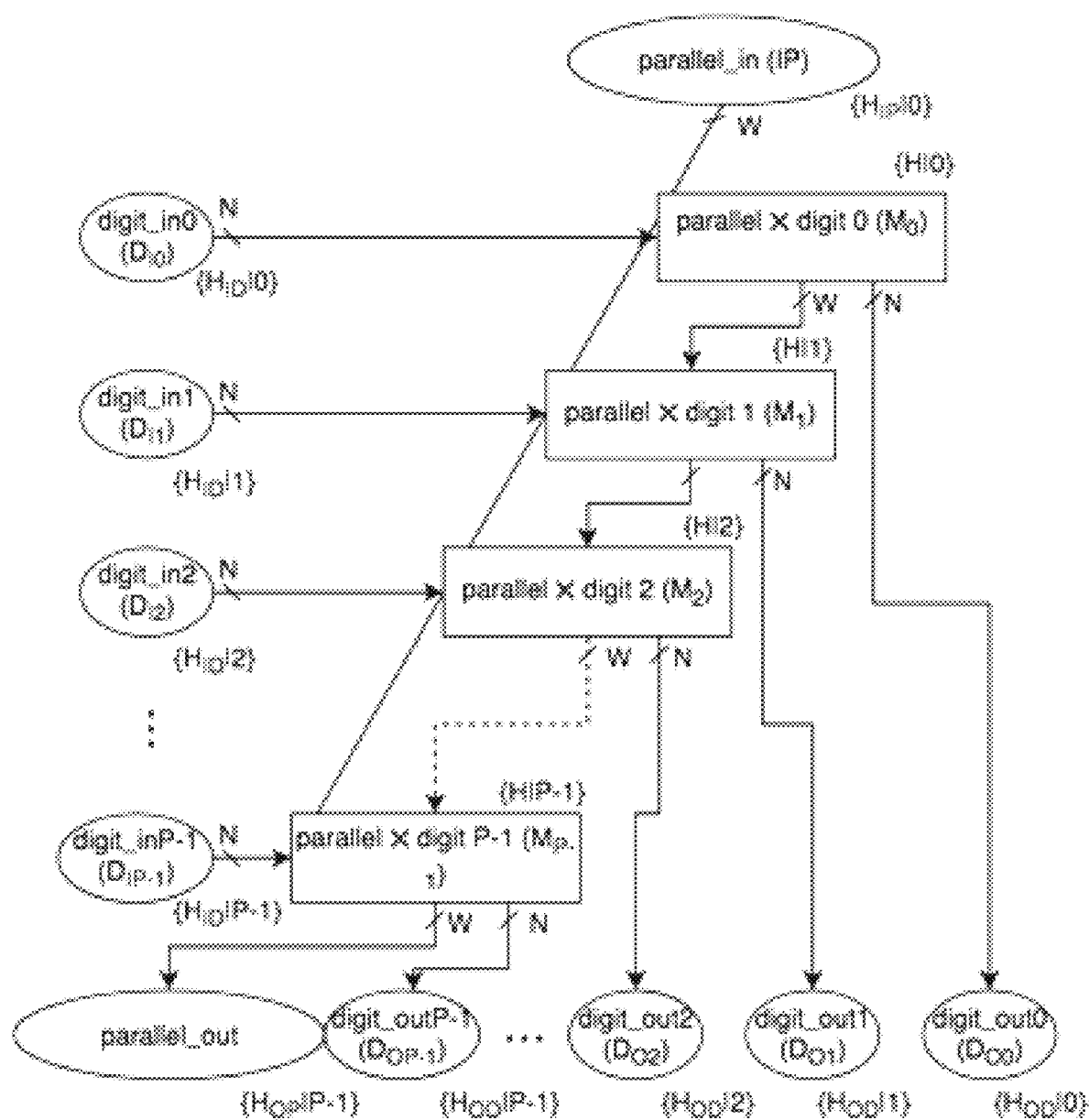
FIG. 18 is an example illustration of a data-flow of a parallel W-bits×W-bits multiplier unit.

2.4.3 Multiplier Unit Obtained by Folding Transformation
2.4.3.1 Unsigned Multiplier Unit The first digit-serial multiplier unit architecture is considered with respect to FIG. 18, which depicts a data-flow description of a parallel W-bits×W-bits multiplier unit as derived using the folding transformation. As is typical for serial multiplier architectures, this is a serial×parallel multiplication unit.

As depicted via FIG. 18, the starting point is a data-flow graph description of the parallel multiplication between two W-bits input operands: the 2 W-bits output word is obtained doing P times (P=W/N) the same task which computes a (W+N)-bits output partial sum adding a W-bits input partial sum to the result of a W-bits×N-bits multiplication, calculated by the same task. The less significant N bits of the output partial sum represents N bits of the final W-bit×W-bit multiplication. For the first P−1 functional units, the other W bits of the output is the input partial sum of the following task. In the case of the last operator, the W most significant bits of the output represents the most significant half-word of the multiplication result.

As already mentioned, one purpose of the folding transformation is to obtain an architecture data flow graph in which single hardware units can implement multiple operations of the starting algorithm, each in a different step of an execution cycle made of P-phases.

In this case, we want all the above-mentioned P tasks to be executed from the same hardware unit H. The ordered folding set used, which is the ordered sequence of the operations to be executed by the hardware unit H, is then $H=\{M_0, M_1, \ldots, M_{P-1}\}$. This means that the task $M_i$ is executed in the i-th phase of the execution cycle of unit H, which can be written as $M_i=\{H|i\}$.

The hardware unit H may be implemented, for example, with a W×N array multiplier.

Equation 3.5 allows to systematically compute the number of delays for use on each of the connections which implement the arcs of the algorithm graph in the data flow description of the folded hardware architecture.

In order to use this equation, inputs of the algorithm are modeled as algorithm tasks which have no input and have their output connected to other operators of the algorithm; outputs are modeled as operations which only take input data from the algorithm and have no output.

Consequently, in the data flow description of the folded hardware architecture, inputs and outputs are represented by units with a specific folding set: the N bit input tasks to the computational units can be modeled as a unit $H_{ID}$ with folding set $H_{ID}=\{D_{I0}, D_{I1}, D_{I2}, \ldots, D_{IP-1}\}$; this component gives the right digit input to the serial hardware unit in each execution phase.

The less significant N bit of the partial sum output are connected to the digit-serial output which in the hardware data-flow description is modeled as a unit $H_{OD}$ with folding set $H_{OD}=\{D_{O0}, D_{O1}, D_{O2}, \ldots, D_{OP-1}\}$.

Since the folded hardware unit has a latency of P cycles and, as a consequence, it can take a new parallel input once in P cycles, the W bits parallel operand input is supposed to be valid only in the first phase of the execution cycle and the corresponding operand $H_{IP}$, in the architecture data flow description, implements null operations in all other P−1 phases. The resulting folding set for $H_{IP}$ is then: $H_{IP}=\{IP, \phi, \ldots, \phi\}$. The parallel output, instead, is valid only in the last phase of the computation cycle and, therefore, the associated folding set is $H_{OP}=\{\phi, \phi, \ldots, OP\}$.

Figure 19:
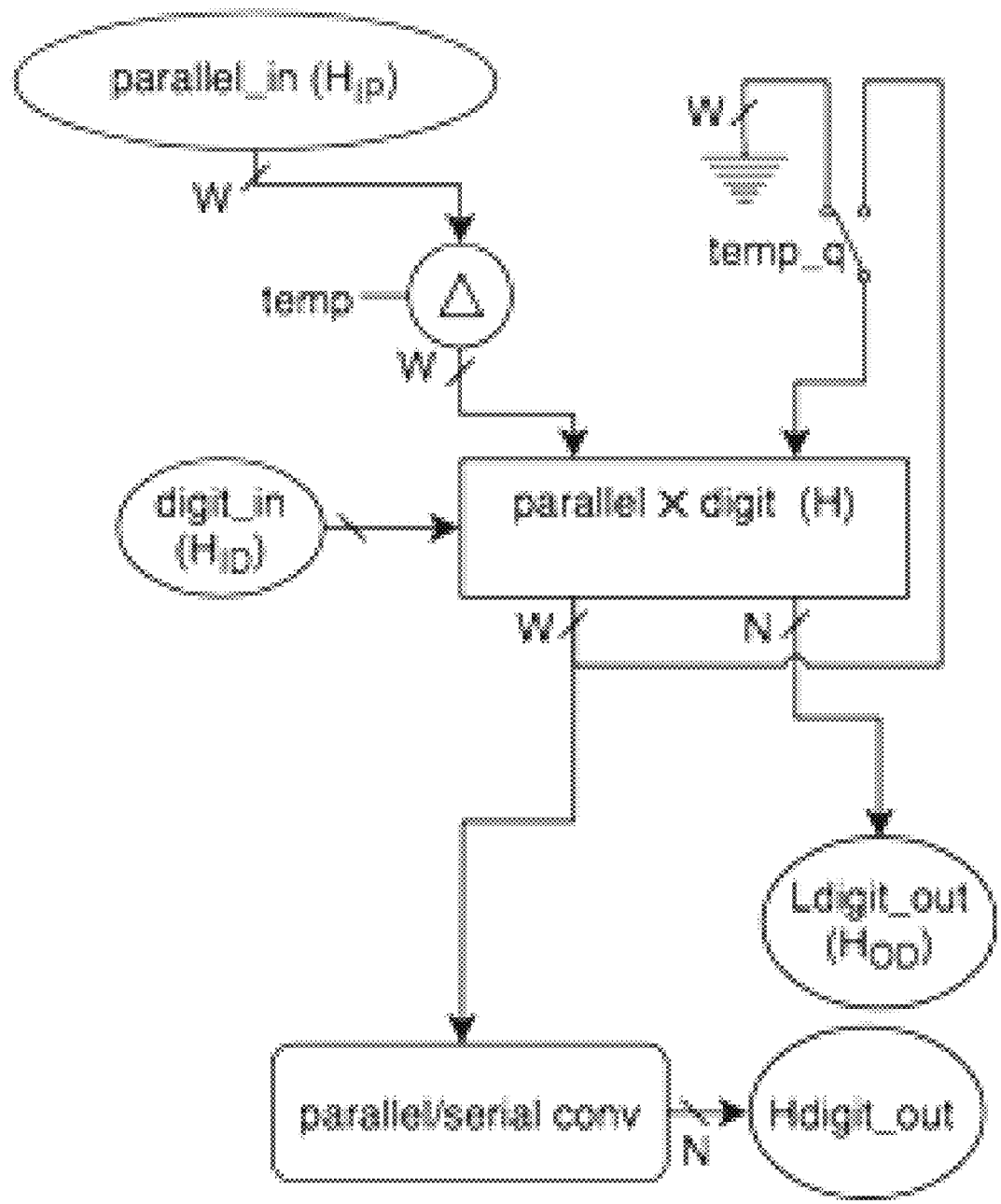
FIG. 19: is an example illustration of a data-flow of a digit-serial multiplier obtained using a folding transformation.

The hardware data flow-graph of the derived digit-serial multiplier architecture obtained using the folding transformation is depicted in FIG. 19: inputs to the hardware unit H are switches which select the correct connection in each phase of the execution cycle. In the first phase of the execution loop, the partial sum input of the unit H is zero, in the other phases it is connected to a delayed version of the most significant W bits of the output partial sum of the same unit. The latter connection corresponds to the links between the computation tasks in the starting algorithm. The digit input of the hardware unit is always connected to $H_{ID}$, while the parallel operand input is linked, in each execution phase, to a line which connects H to $H_{IP}$ with the correct number of delay cycles. The number of delays utilized on each connection may be computed using equation 3.5.

Delays between the parallel input and the multiplier unit do not have to be implemented necessarily with a pipeline of registers. In embodiments advantageous in terms of area occupation a register with enable signal is utilized, which holds the parallel factor and updates it at the beginning of each new computation.

The less significant half word of the result of the whole operation is produced in the digit-serial format on the N bit output, one digit in each phase of the execution cycle; the other half word is produced on the W most significant bits of the output in the last phase of the computation cycle.

In a full serial architecture design, high order half word of the product is converted to digit-serial format using a parallel to digit-serial converter and produced on a N bits output port in the following P clock cycles.

If the hardware unit H is implemented with a carry save architecture, the carry signals are also to be fed back. Furthermore, the parallel output in the last computation cycle is in a carry save redundant form, having a W bits partial sum and W carry signals; the two output words may be first converted to a digit-serial format, using two parallel to digit-serial converters, and then summed with a digit-serial vector merging adder to produce the most significant half word of the output (see FIG. 22).

As previously discussed, the unit utilizes P clock cycles in order to complete an entire computation: in each cycle, it gives one of the P least significant output digits on the dedicated port. The P most significant digits of the result are produced on a different output by a serial to parallel converter in the following P clock cycles; in the meanwhile, a new multiplication computation can begin. Therefore, this unit is able to produce a full precision output and begin a new computation every P clock cycles.

2.4.3.2 Signed Multiplier Unit

Figures 20, 21:
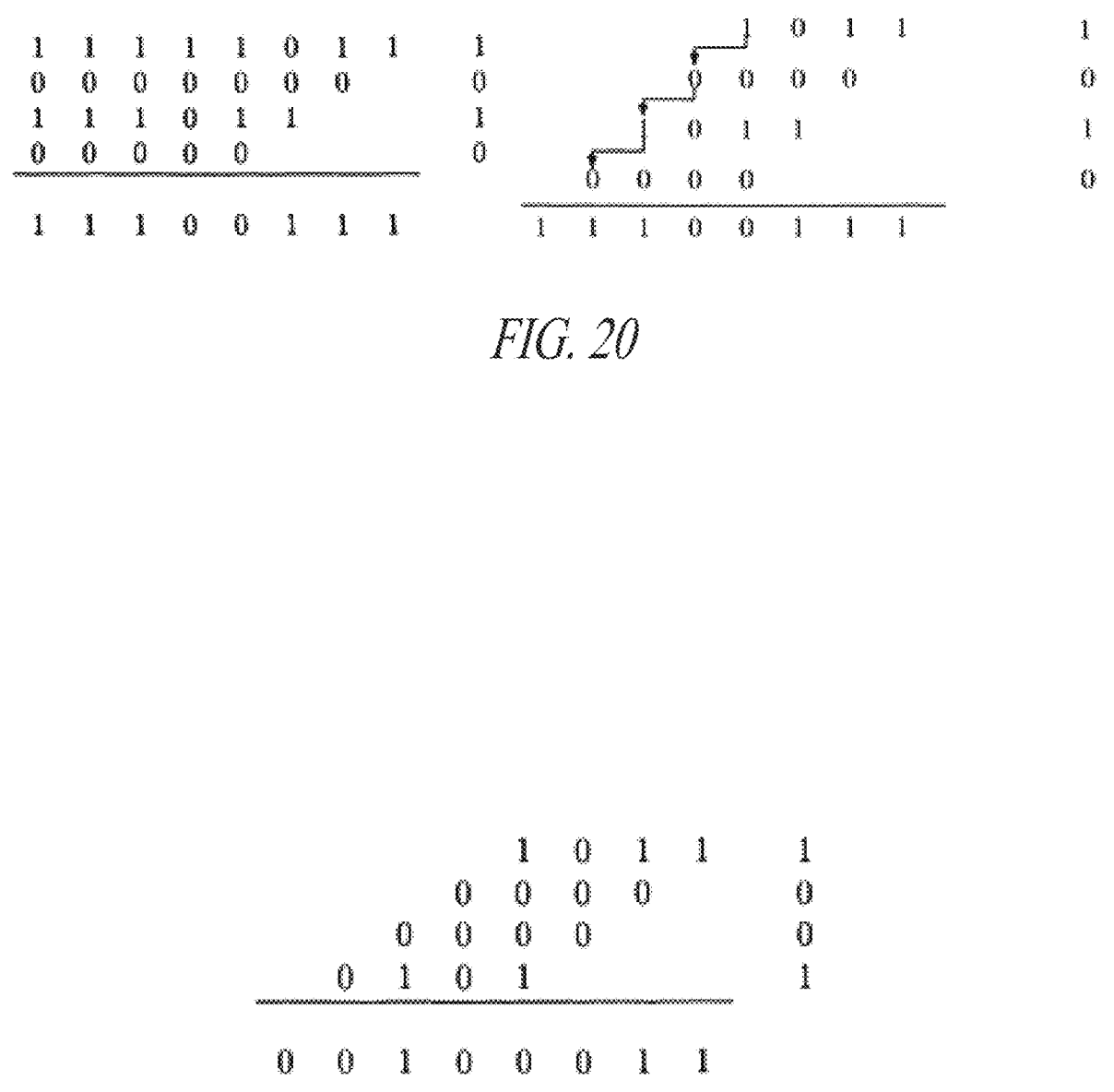

When signed inputs are considered, in order to obtain a correct multiplication result, two adjustments are carried out to the unsigned multiplication algorithm. First, the addition of all the partial products produced by each word×bit multiplication is to be carried out in 2's complement: this means that in certain embodiments, all addends are to be coded on the same number of bits and, therefore the sign bit is to be extended. This can be implemented in hardware based on the effect of the sign extension, as the sign bit of a given partial product is summed to the sign bits of all previous partial products. This is depicted in the example of FIG. 20, in which the correct result of a two's complement computation of −5×5 is found using an addition chain of the sign bits of all the partial products. Therefore, only an addition chain of the most significant bits of the partial sums is used (see FIG. 22).

In two's complement, the most significant bit of a word has a negative weight, therefore, in a 2's complement multiplier unit, when the most significant bit of the multiplicand is 1, the sign of the other factor is to be changed in order to obtain the correct value of the last partial product. Therefore, if A×B is to be computed, B is to be negated and '1' is to be added to its least significant bit in order to obtain the correct value of the last partial product. This is illustrated by FIG. 21, in which the last partial product of a two's computation of −5×−7 is inverted and a '1' is summed to its least significant bit.

Figure 22:
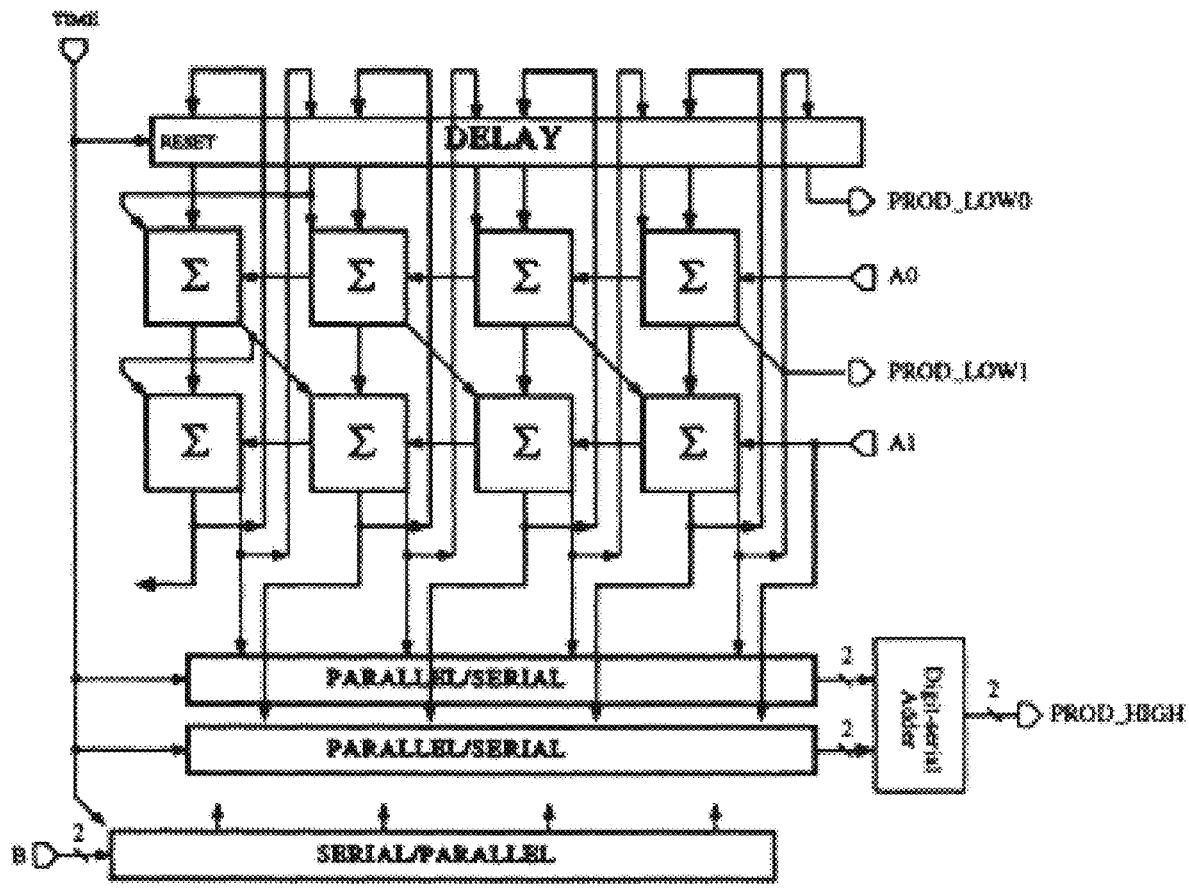
FIG. 22 illustrates an example embodiment of a signed digit-serial multiplier unit with digit-size 2 and word size 4, implemented using a carry-save array multiplier architecture.

This feature can be implemented in the digit-serial multiplier of FIG. 22: an example of a signed digit-serial multiplier unit with digit-size 2 and word size 4, implemented using a carry-save array multiplier architecture. A selection for the input of the last row of full adders is inserted. In this manner, in the last computation phase, a temporization signal can select the word obtained using XOR ports taking as inputs the bits of the parallel factor and the most significant bit of the digit-serial factor; in the same way, a carry input equal to the most significant bit of the digit-serial adder can be selected in the same computation phase.

2.4.4 Multiplier Units Suitable for Bit-Level Pipelining

In various embodiments, multiplier units in accordance with techniques described herein may be obtained by generalizing the operation of the unit computing one bit of a partial sum, along with the related carry, in a bit-serial multiplier; in this manner an equivalent digit-serial unit is obtained, which computes one digit of a partial sum, together with a carry-equivalent, digit-wide signal.

Considering the multiplication between two W bit factors A and B, with $A=a_{W-1}2^{W-1}+\ldots+a_i2^i+\ldots+a_0$ and $B=b_{W-1}2^{W-1}+\ldots+b_j2^j+\ldots+b_0$, given that $s_{i,j}$ and $c_{i,j}$ are the partial sum bit and the carry bit obtained in the computation in which bits $a_i$ and $b_j$ are involved, respectively, the operation carried out by a bit-serial computation unit, in each clock cycle, is formalized as in Equation 3.6:

$$2c_{i,j}+s_{i,j}=a_i*b_j+c_{i,j-1}+s_{i-1,j+1} \qquad 3.6$$

Figure 23:
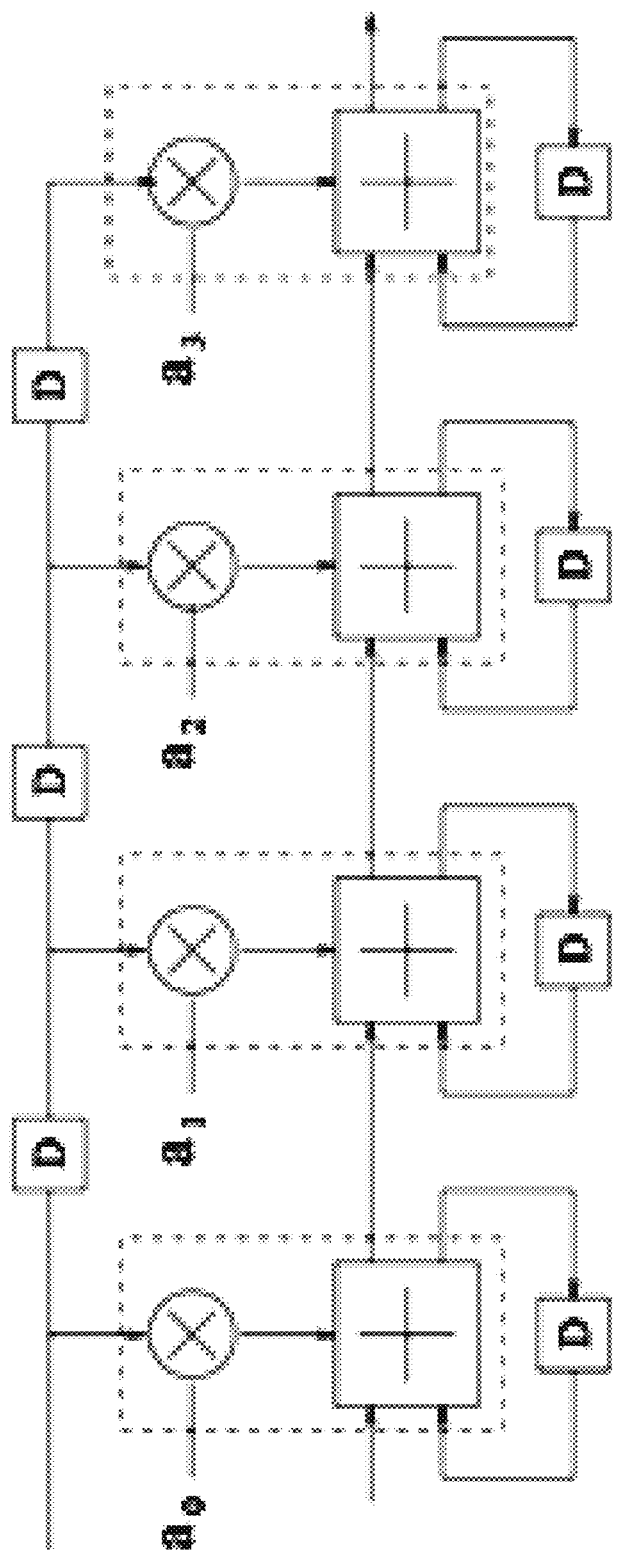
FIG. 23 illustrates an example embodiment of a bit-serial multiplier unit with factors have word size of 4 bits.

Units of an embodiment implementing equation 3.6 are depicted in FIG. 23, via the dashed line in the bit-serial multiplier unit with factors having 4-bit words.

A generalization of equation 3.6 for a digit-serial unit is possible and it is reported in equation 3.7, where capital letters stand for digits with generic digit-size N.

Equation 3.7:

$$2^N C_{i,j}+S_{i,j}=A_i*B_j+C_{i,j-1}+S_{i-1,j+1} \qquad 3.7$$

The result of the operation $A_i*B_j$, in equation 3.7, is coded on 2N bits and thus it can be split in two parts: $A_i*B_j=(A_i*B_j)_L+2^N(A_i*B_j)_H$. Bringing the higher order term to the first member of equation (3.7), using the definition in Equation 3.8:

$$C'_{i,j}=C_{i,j}-(A_i*B_j)_H \qquad 3.8$$

Equation 3.9 can be derived:

$$2^N C'_{i,j}+S_{i,j}=(A_i*B_j)_L+C_{i,j-1}+S_{i-1,j+1} \qquad 3.9$$

Adding and subtracting $(A_i*B_{j-1})_H$ at the second member, Equation 3.10 is obtained:

$$2^N C'_{i,j}+S_{i,j}=(A_i*B_j)_L+(A_i*B_{j-1})_H+C'_{i,j-1}+S_{i-1,j+1} \qquad 3.10$$

Figure 24:
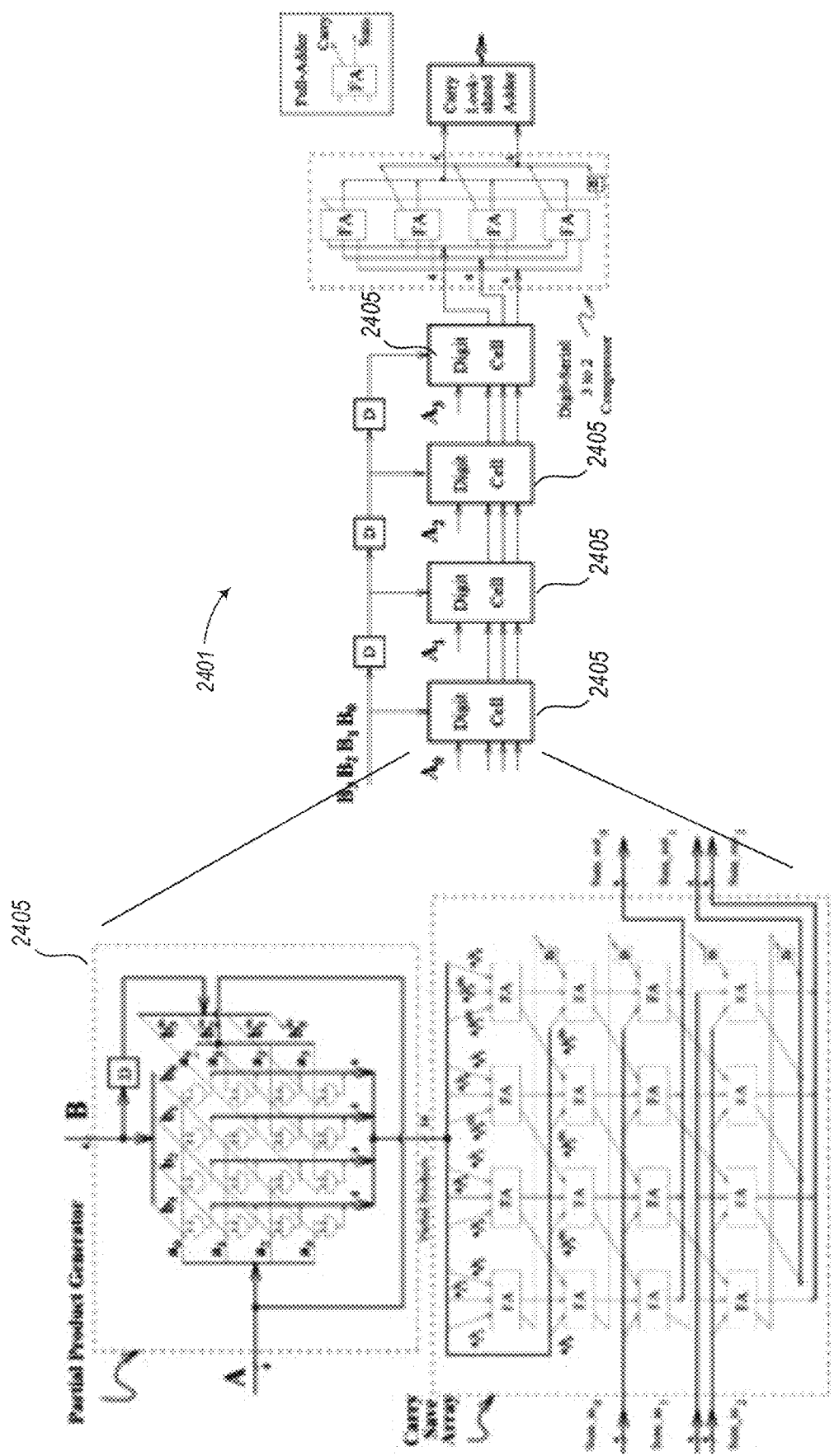
FIG. 24 illustrates an example embodiment of a multiplier unit or circuit.

Equation 3.10 can be implemented in hardware conveniently since it can be noticed that at the second member, all signals which are to be summed have the same size; this means that a regular adder array can be used. Furthermore, $C'_{i,j}$, produced by one computation unit, is taken as input $C'_{i,j-1}$ in the following cycle. The unit described to implement (3.10) in an embodiment is shown in FIG. 24, which depicts a multiplier unit implemented in accordance with one or more embodiments. In particular, FIG. 24 depicts architecture of the multiplier unit 2401 having multiple digit-cells 2405, as well as an expanded view of a single such digit-cell 2405a.

Figure 25:
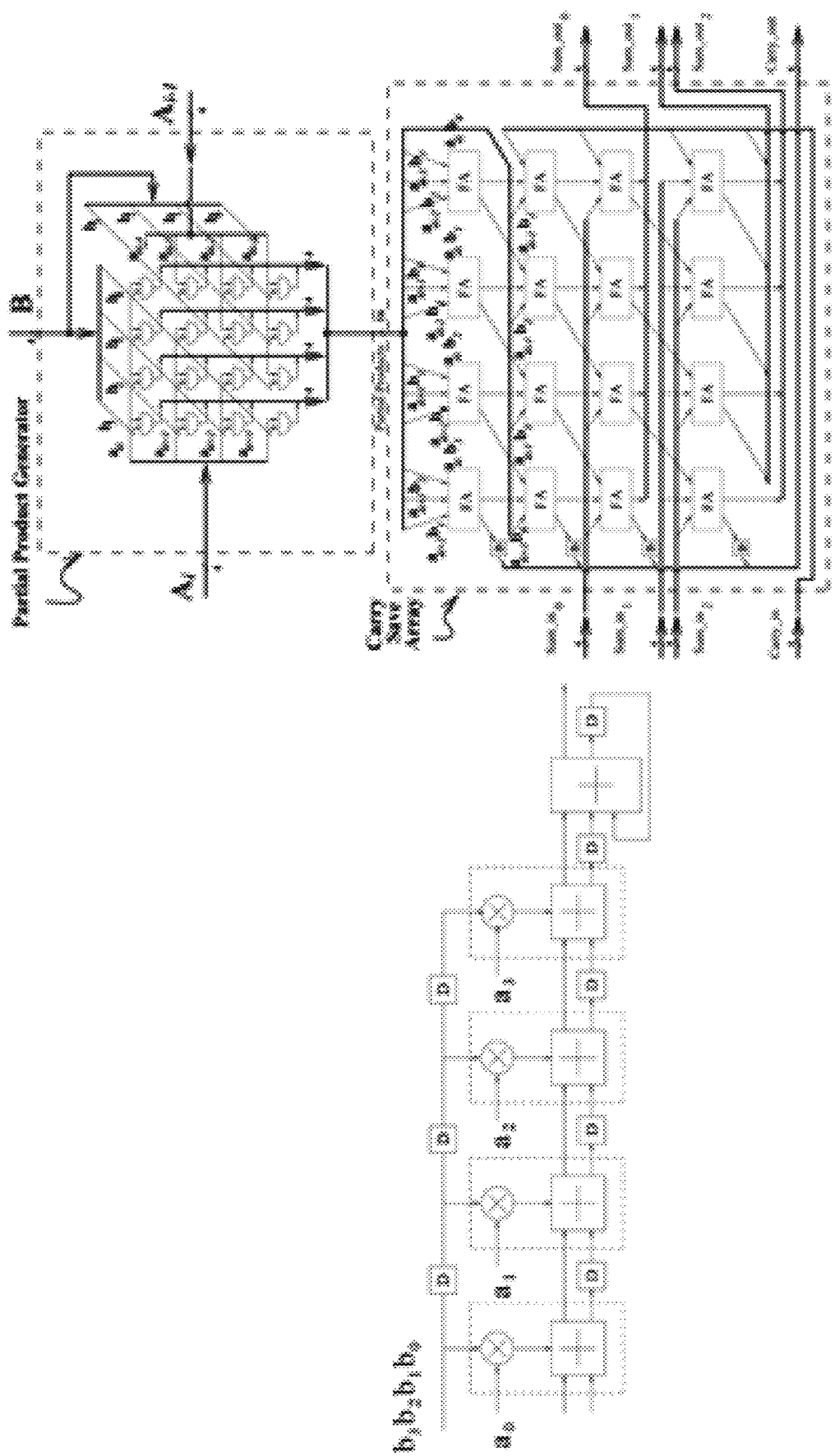
FIG. 25 illustrates an example embodiment of a bit-serial multiplier unit and digit cell.

Other examples of cells of multiplier units obtained with a similar procedure are depicted in FIG. 25 and FIG. 26, each of which depicts a distinct variation of a bit-serial multiplier unit having multiple digit-cells D along with an expanded view of that corresponding digit-cell.

It will be appreciated that with the presented architectures—or others obtained with booth recoding and redundant representations, also in accordance with embodiments and techniques described herein—and using fine grain pipelines, a consistent reduction of the power consumption can be reached relative to architectures obtained using the bit-level unfolding transformation on the same bit-serial multiplier units. Such architectures utilize an entire output sample period in order to compute the result in full precision; thus, a new multiplication operation can begin every 2P cycles, where P=W/N is the length of the input digit-serial signals. This can be demonstrated by considering the multiplier unit in FIG. 24: digit $B_3$ is given as an input in the 4$^{th}$ clock cycle after the beginning of the operation, which is the P$^{th}$ cycle since, in this example, P=4. In order to complete the computations in which $B_4$ is an input, 4 more clock cycles have to elapse, for a total of 8, which is 2P, cycles. During this last P cycles, even if the global multiplier uses no other inputs to complete the computation, inputs of the following multiplication cannot be given.

2.4.5 Accumulator Unit

Figure 27:
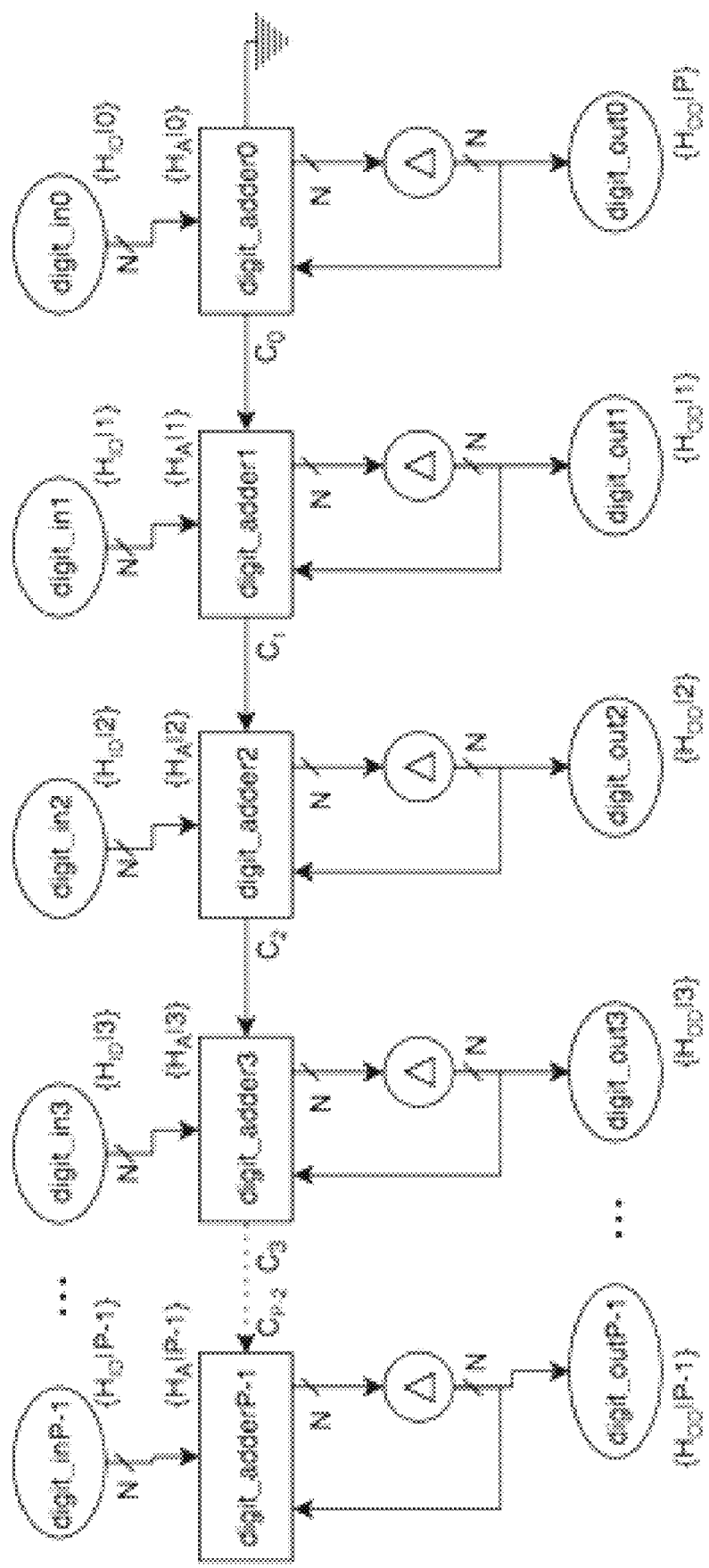
FIG. 27 illustrates an example embodiment of a data-flow of an embodiment of an accumulator unit or circuit.

A digit-serial accumulation unit can be derived using the folding method as described above with respect to a digit-serial multiplier unit. The starting data-flow algorithmic description of a corresponding accumulator unit is depicted in FIG. 27, in which the considered folding sets are also depicted.

The number of delays to be inserted between the nodes of the digit-serial architecture is computed using equation 3.5.

Figure 28:
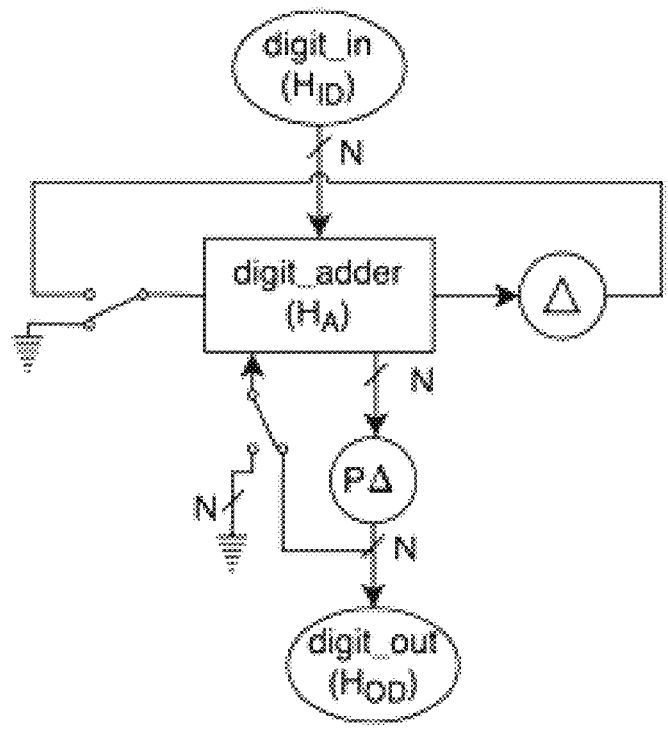
FIG. 28 illustrates an example embodiment of a data-flow of an embodiment of a digit-serial accumulation unit or circuit.

The data-flow description of the resulting digit-serial accumulation unit is presented in FIG. 28.

2.4.6 Conversion Between Serial and Parallel Format

In order to do conversions between bit-parallel and digit-serial formats, converter circuits are utilized. One manner by which to implement these converters is using a shift register with W/N stages, each made of N flip-flops. In a bit-parallel to digit-serial converter, during the first clock cycle of each sample period, which means once every W/N cycles, a parallel word is latched in the register and, in following periods, it is shifted out one digit at the time.

A digit-serial to bit-parallel converter does the reverse action: digits are latched and shifted in the register in each clock cycle until, in the last cycle of the sample period, the whole word will be available on the output of the register in a bit parallel-format.

In a shift register all register stages commute at each clock cycle, due to the shift operation which moves digits inside the converter. Other implementations can help to save power preventing registers of the converter from doing useless commutations. For example, a parallel to serial converter could be implemented with a W-bits register stage which latches one parallel word at the beginning of each sample period, as in the previously presented converter. In the consecutive cycles a W/N:1 multiplexer with N-bits inputs can be used in order to select, in each cycle, the digit of the parallel word to bring on the output.

A serial to parallel converter can be implemented with a W-bits register stage in which groups of N registers share the same enable signal. The digit-serial input of the converter is hard wired to all the W/N groups of registers in the converter, but in each clock cycle of the sample period, only the group in the correct position is enabled to latch the input digit. In this manner, in the last cycle of the sample period, the converted bit-parallel word will be available on the output of the converter.

In certain embodiments, solutions presented as alternatives to shift registers may employ additional control signals for selection and enables which are not utilized in the first converters. Very often, however, the same signals used for the temporization of the digit-serial circuit can be used, if properly delayed, resulting in negligible overhead.

2.5 Word-Level Unfolding

As previously discussed elsewhere herein, serial architectures allow higher clock rates compared to the ones of their bit-parallel counterparts; on the other side, computation rate, intended as the number of words computed per clock cycle, is reduced. Digit-serial architectures, for example, require one entire input sample period, which is P=W/N clock cycles, in order to complete one entire computation. In situations in which this decrease in computation rate cannot be tolerated—for example when the units have to work in a parallel framework, as in the case of our interest—word-level unfolding method can be used. According to this technique, in order to obtain a computation rate of one W bits word per clock cycle, the digit-serial unit is replicated P times and the obtained units carry out P computations concurrently; the P obtained results are to be merged. Using this strategy, the desired word-rate is obtained since P digits—which is P*N=W bits—are taken in input and produced on the output in each clock cycle.

Considering the case of a digit-serial computation which is to be carried out in a bit-parallel context, a bit-parallel, word-serial to digit-serial, word parallel converter is utilized at the input port of the cluster of P units obtained replicating the digit-serial architecture. This converter is made of P bit-parallel to digit-serial converters, each of which, when enabled, latches the value on the input port and streams it on its output one digit at the time in the following P clock cycles. Each parallel to digit-serial converter has its output connected to one of the P digit-serial streams of the cluster.

Just one of the P parallel to serial converters is enabled in each clock cycle, and, in P consecutive periods, they are enabled in a cyclic order; in such a manner, P subsequent computations are executed each from one of the P computation units. When the inputs of the $(P+1)^{th}$ computation arrive, one of the P units is ready to begin a new operation.

On the output of the cluster of P units, a digit-serial, word parallel to bit-parallel, word-serial converter is utilized. The latter is composed of P digit-serial to bit-parallel converters, each of which has its input connected to the output of a digit-serial computation stream. Since the P computations carried out by the digit-computation streams begin in P subsequent clock cycles, one operation is completed in each clock cycle and the output converters produce one parallel output in each period, as desired.

Figure 29:
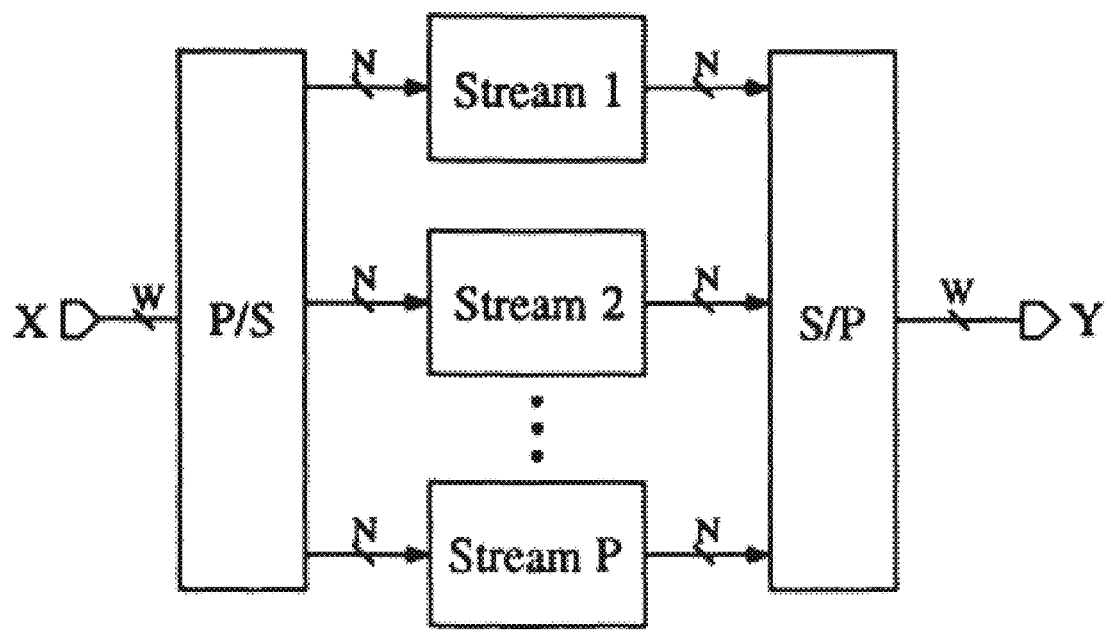
FIG. 29 is an example embodiment of an architecture obtained using an embodiment of word-level unfolding.

An example scheme of an architecture structure obtained using a word-level unfolding method is depicted in FIG. 29.

3 Described Digit-Serial MAC Architecture

As already mentioned, deep neural networks are computationally and power consumption demanding applications and, even when only the feed-forward step is carried out by consumer electronic devices, the use of standalone, general-purpose, programmable computation units would imply prohibitive costs and unsustainably high power consumption for state of the art CNN topologies often requiring up to billions of operations for a single inference. For these reasons, it has become common practice to use optimized, application specific hardware accelerators, along with traditional micro-controllers and CPUs, in order to increase the available computational power, complying with mobile application and consumer devices constraints. Having several application-specific optimized ALUs working in parallel gives rise to the problem of delivering control signals and data to these units, which is prohibitively expensive in a traditional bus-based system architecture. One significant component of power consumption in systems using hardware accelerators is due to memory accesses and the desire to read several inputs from memory to feed all the computation units in parallel could lead to a large area overhead due to storage units. One method to circumvent these problems is to use the high parallelism obtainable using hardware accelerators leveraging streaming or data-flow system architectures. In the latter, the scheduling algorithm and the accelerator units are arranged in order to maximize data-locality, meaning that in certain embodiments, operations which use correlated data may be carried out at the same time, or one after another, by units which are close to each other. Using this system organization, data can flow directly from one processing unit to the next and, thus, memory access reduction is achieved. Furthermore, hardware accelerators are connected by data-flow links, containing only data connections and essential control signals; therefore, overhead in the accelerators due to complex communication control logic is greatly reduced.

The design of mentioned system architectures is complex and often already developed frameworks for specific applications are available. Therefore, one purpose of the present disclosure is to design a MAC hardware accelerator, based on digit-serial architectures, which may be integrated within one of those before mentioned architectures, designed with a parallel stream processing approach. This means that the desired unit shouldn't require any modifications neither to its input/output data streams nor to the external control logic and system organization. More in detail, it is assumed that input connections to the MAC only consist of input data lines and two essential control lines, named first and last. The latter are used, respectively, to determine when a new accumulation operation is to begin and when the ongoing one is over. The number of multiplication results to be accumulated is identified as $n_{acc}$ in the following.

An architecture suited to work in a parallel context could be an advantage also because in order to accelerate some of the operations required in the forward processing step of a neural network, as max pooling and RELU activation functions, bit-parallel architectures are more convenient then serial ones. Indeed, these operations involve comparison operations which employ an entire sample period of latency in order to be accelerated using digit-serial architectures. The long latency required is not inherently a problem, but it is a drawback since it may involve adding the same delay on streams of data used together with the results of the comparison. For example, for the computation of a RELU activation function, the result of the comparison operation between the input and zero is used in order to select which of the two values is to be produced on the output. Therefore, the input signal is delayed of one sample period in order to be synchronized with the comparison result.

The design choices made to obtain the integration of a MAC unit based on digit-serial architectures in a full word-length stream processing context are presented below.

3.1 Accumulation Strategy

As discussed elsewhere herein, digit-serial multiplier units may be digit-serial×parallel multipliers; hence one of their inputs is to be provided in a digit-serial format and the other one in bit-parallel format.

Using a parallel to serial converter, such as described herein, on the digit-serial input port, all the digit-serial MAC units which can be obtained using multiplier architectures presented in 2.4 can take new parallel factors every aP clock cycles. Here, a is a constant which is for example equal to 1 or 2, depending on the multiplier architecture used, P=W/N is the length of the digit-serial signal obtained converting one of the input factors.

Since the inputs of the accelerator are to be linked to parallel stream-connections with a transfer rate of 1 W–bit word/clock cycle, the rate with which the considered MAC can take new inputs is to be adapted to the one of the stream in order to avoid input data loss. For this purpose, either a higher clock frequency in the serial part of the circuit, or the word-level unfolding method may be used.

Another possible solution to the problem could be inserting a buffer memory between the stream connection and the accelerator, in order to store input words that aren't computed due to the slower input rate of the unit. However, this approach is a solution in case of an occasional mismatch between the data-rate of the unit and the one of the input stream; since, in this case, they are consistently different, the buffer would be filled at a rate which can be calculated as shown in Equation 4.1:

$$\text{fill rate} = \frac{1\ W-\text{bit word}}{\text{clock cycle}} - \frac{1\ W-\text{bit word}}{aP\ \text{cycles}} = \frac{(aP-1)W-\text{bit words}}{aP\ \text{cycles}} \quad 4.1$$

In Equation 4.1, 1 W–bit word/clock cycle is the rate with which the stream would fill the input buffer, 1 W–bit word/aP cycles is the rate with which it would be emptied by the digit-serial MAC.

From equation 4.1, it is clear that for aP>1, which is usually the case, memory would fill at a constant, positive rate and after (memory size/fill rate) cycles it would be full.

The option of using a higher clock frequency for the serial architecture isn't explored herein, as it may require significant modifications in the clock generation subsystem and in the clock distribution three and would move the focus to problems which fall outside of current discussion.

The unfolding method will be considered since it is a common way to adapt data-rates with an architectural expedient.

First, the MAC unit obtained using one of the presented digit-serial multipliers and the digit-serial accumulator is considered.

To obtain a unit which takes new inputs with a rate matching the data rate of the input stream, according to the unfolding method, the digit-serial MAC unit is replicated a number of times equal to the ratio of Equation 4.2:

$$\text{unfolding ratio} = \frac{\text{stream data rate}}{\text{digit}-\text{serial }MAC\text{ input rate}} = aP \quad 4.2$$

Figure 30:
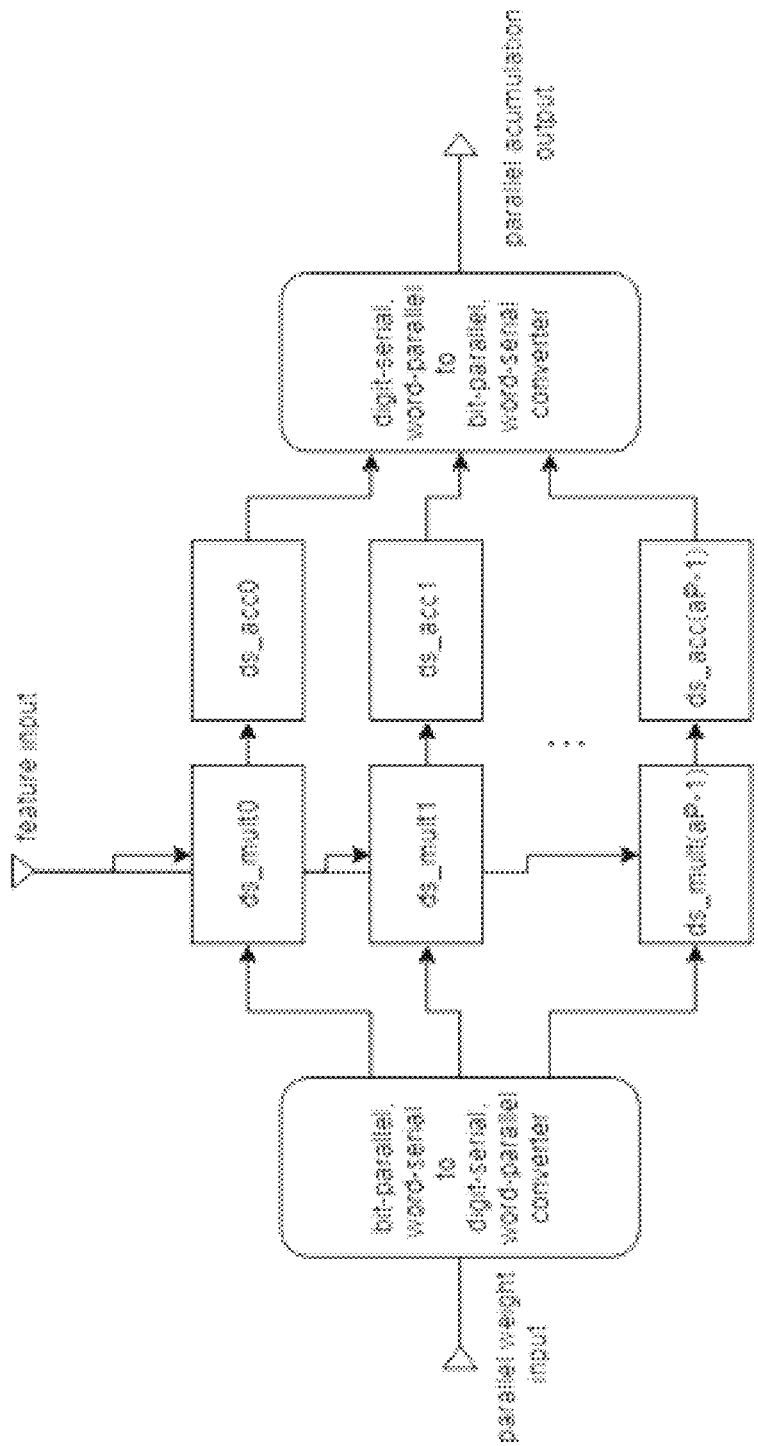
FIG. 30 illustrates an example embodiment of an architecture obtained using an embodiment of word level unfolding on an embodiment of a digit-serial accumulation unit or circuit.

An embodiment of a unit obtained in this word-level unfolding method includes aP independent digit-serial, multiply-accumulate computation streams, as depicted in FIG. 30.

In order to obtain the desired rate matching, the computation may be scheduled as follows: aP subsequent multiply-accumulate operations are computed in parallel, each from a different digit-serial MAC computation stream, and start in aP consecutive clock periods. This scheduling strategy allows the unit to take a new couple of factors for the multiply step, in each clock period. This is because, for the first aP periods, inputs are distributed among the available multipliers on the different MAC structures; after aP cycles the latency of the previously assigned serial multiplication operations is over and, in consecutive cycles, multipliers will be ready to take new inputs (see time diagram example in FIG. 50, which also may be referred to herein as Table 1).

Table 1 of FIG. 50 illustrates an example of the sequence of operations computed with by the architecture obtained using word level unfolding on a digit-serial MAC unit (see FIG. 30); in this example aP=4, number of accumulations $n_{acc}$=3; each acc operation includes one multiplication and the update of the accumulation value; since digit-serial units are used, each acc operation takes aP clock cycles; cells highlighted in black correspond to cycles in which an entire MAC operation is completed and the last digit of the accumulation output is produced; borders with double lines include operations belonging to the same MAC This scheduling can be implemented with the presented word-serial, bit-parallel to word-parallel, digit-serial converters in order to do the parallel to serial conversion and to assign samples to the digit-serial input of the correct multipliers in each period.

Even if the resulting unit, with the presented scheduling strategy, is able to take inputs with the same rate of the parallel stream, for the purpose of replacing a traditional parallel MAC in a way which is transparent, it has a drawback: the input data stream required for this architecture is different from the one of a conventional parallel MAC unit. Indeed, in the input stream of the latter, consecutive inputs are associated to the same MAC operation. This implies that the results of multiplications computed in consecutive clock periods are meant to be summed together. In the input stream required from the presented digit-serial unit cluster, aP consecutive inputs are related to aP different MAC operations, and inputs to the same MAC are separeted in time by aP clock periods. Reasoning about the convolution operations implemented by the MAC unit, this would mean that samples sent in the input stream during consecutive clock periods should be related to aP different convolution operations. The latter are all carried out in parallel, but with a slower computation rate compared to the one of a parallel MAC unit.

The output stream of the structure may also differ from the one of a parallel architecture, even in a steady-state operation condition. Looking at the example in the time diagram of FIG. 50, indeed, it may be noticed that there is a latency of $(n_{acc}-1) \times aP$ clock periods between groups of consecutive aP outputs. However, such result is consistent with what has been described about the word-level unfolding transformation, since in mean there is one output every $n_{acc}$ cycles; thus, as stated, the lowering of the throughput due to digit-serial computation is eliminated.

From the previous analysis, it is clear that, in order to integrate the considered accelerator in an existing framework, consistent changes should be made in the latter. With the aim of avoiding that, a serial unit which can take inputs associated with the same MAC operation, with the same rate of the parallel input stream and which can give one output every $n_{acc}$ cycles.

The starting point to understand how to obtain it is to consider one of the presented digit-serial multiplier architectures and apply the word-level unfolding method to it. As mentioned before, the presented digit-serial multiplier units can begin a new computation every aP cycles; therefore, according to the mentioned technique, the chosen architecture is replicated aP times. This allows obtaining a cluster of multipliers which, using the scheduling technique described, can take new inputs and, therefore, produce one valid output, in each clock period.

If consecutive inputs to the cluster of multiplier units are related to the same MAC operation, as it should be in the case of interest, computed multiplication results may be summed together in order to obtain the accumulation result. FIG. 51 shows a time diagram example of the multiplier cluster outputs. It is possible to observe that an accumulation strategy able to sum multiplication results given on different outputs and in a serial format may present one or more advantages.

To derive some suitable accumulation strategies and the related hardware architectures, we consider the timing diagram of FIG. 51 (which also may be referred to herein as Table 2). First, since a digit-serial computation is carried out, in a given clock period, only a single digit is available on the output of each multiplier unit, for a total of aP digits (four in the considered example) belonging to different multiplication results. This means that aP inputs of N-bits are taken from the accumulation hardware at each clock cycle, in order to avoid losing data.

Furthermore, it is possible to notice that, since one multiplication result is made of aP digits and aP consecutive multiplication operations start on different multipliers with one cycle delay, output digits with same weight and belonging to words which are to be summed together are ready in consecutive clock periods and on different output lines. For the same reason, in each given clock period, digits on the aP outputs have different weights and there is one digit for each of the digit weights.

Table 2 of FIG. 51 illustrates in the form of a table an example of the sequence of operations computed by the cluster obtained using word level unfolding on a digit-serial multiplier unit. In this example, aP=4, number of accumulations $n_{acc}$=3 which means that three consecutive multiplications belong to the same MAC. Cells highlighted in black correspond to cycles in which the last digit of the last multiplication belonging to a MAC is computed; borders with double lines include operations belonging to the same MAC.

Starting from the observations made, two accumulation strategies are described, both using aP adders with N-bits inputs in order to take, in each clock cycle, all output digits produced by the cluster of multipliers.

Figure 31:
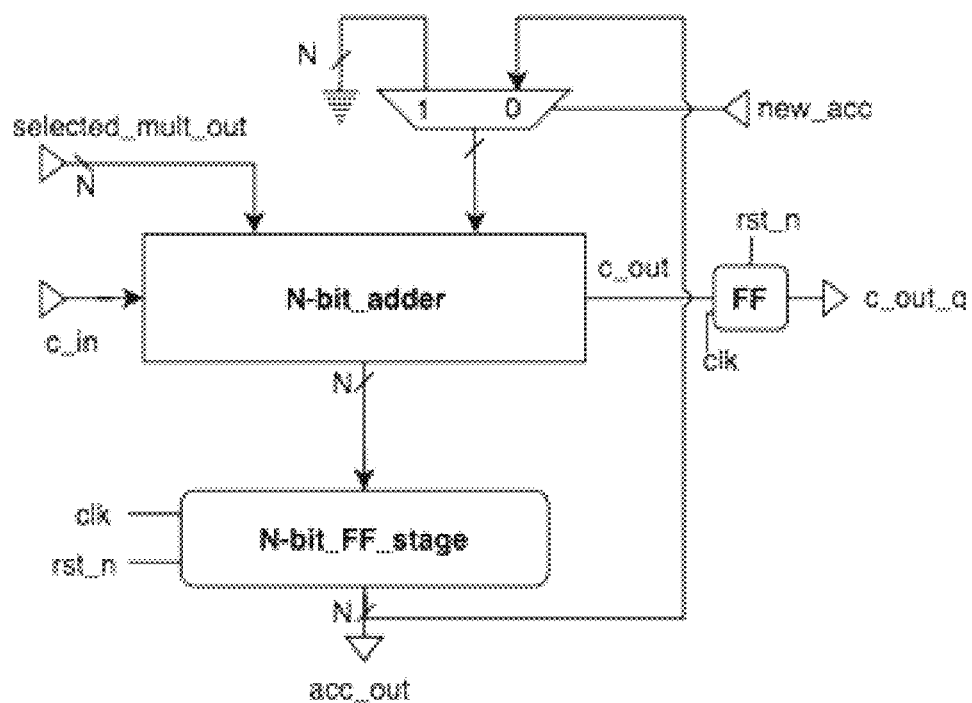
FIG. 31 illustrates an example embodiment of an accumulation digit-cell.

The first accumulation method uses the mentioned adders in digit accumulation structures, each assigned to a different digit weight of the multiplication result. In these structures, registers memorizing digits of the accumulation value have their input connected to the output of the adders and their output fed back to one of the inputs of the adders. An accumulation digit-cell in accordance with this first accumulation method is depicted in FIG. 31; one such digit-cell corresponds to each digit weight in the multiplication result.

This structure allows each unit to update one digit of the accumulation with the output digit of the multiplication cluster having the corresponding weight. Most significant carry out of each accumulator is delayed and given as carry input to the unit which computes the accumulation on the digit with greater weight. Carry out of the adder taking the most significant digit of the multiplication results is accumulated by an extra accumulator which only takes carry in as an input, and the size of which may be chosen according to the maximum number of accumulations to be done in accordance with the maximum output size predicted. In order to preserve the digit-serial architecture of the elaboration units, the carry accumulator can be obtained cascading a proper number of digit accumulation units, divided by registers on the carry propagation line. This extra accumulation structure is utilized since, in order to have a full precision accumulation result, no truncation is performed on the latter and, therefore, the rule of having a constant word length all over the unit is violated.

It will be appreciated that, according to the digit-serial format, the weight of the output digit produced from each of the multiplication units changes in consecutive clock cycles. This leads to a problem of the presented accumulation strategy: the outputs of the multiplier cluster are selected every clock cycle in order to send each of them to the digit accumulator computing the corresponding digit weight. Thus, aP multiplexers are utilized such that each such multiplexer has aP inputs, connected to the outputs of the multiplier units, and the output is connected to one digit-serial accumulators. Furthermore, after $n_{acc}$ cycles the least significant aP digits of the result are produced in consecutive clock cycles, each of them on a different accumulation output. This means that the outputs of the accumulation registers are selected again in order to give the correct accumulation results to the output serial to parallel converters. As a result, a consistent selection logic overhead is employed in order to use this accumulation method.

The other suitable accumulation strategy uses each one of the N-bits adders to sum the output digit of one fixed multiplication line to the digit of the accumulation having the same weight, in each clock cycle. In the following description of the architecture able to do the mentioned operation, it's convenient to identify each adder unit with an index number with a range between 0 and aP−1. Every single adder, with associated index i, has one input hard wired to the output of one multiplier unit and the other connected to a digit-size register containing one digit of the accumulation. Both the multiplier and the register connected to the input of adder unit i are identified with the same index number. The output of the adder unit i is connected to register i+1 and the $(aP-1)^{th}$ unit has its output connected to the register 0, read by the first unit. In such a way a loop is created in which the $i^{th}$ adder reads the accumulation digit updated by unit (i−1) in the previous clock period.

Figure 32:
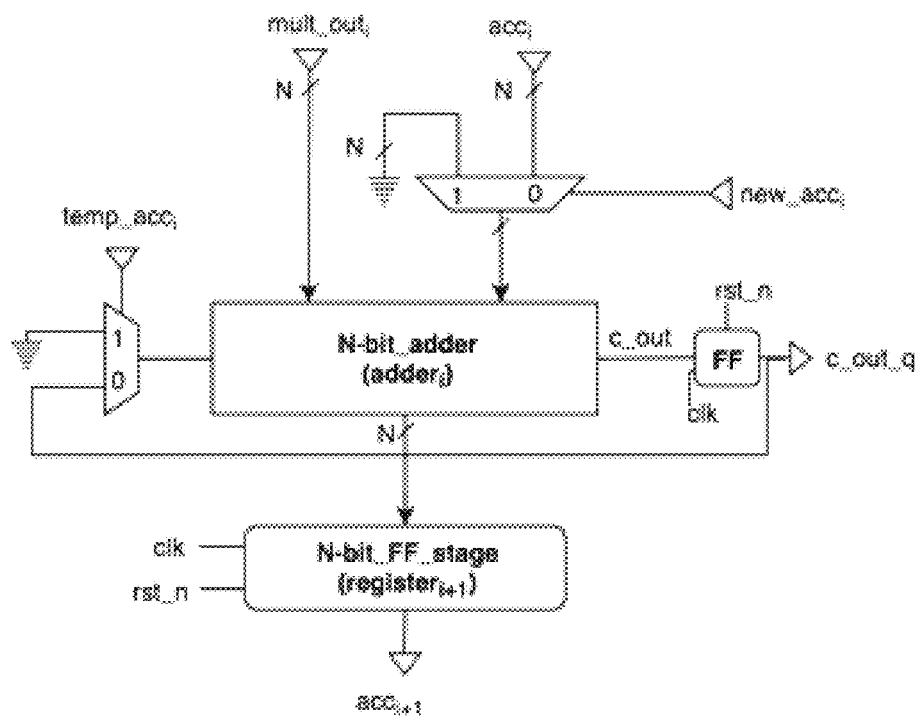
FIG. 32 illustrates an example embodiment of a digit-cell of an example digit-serial accumulation architecture.
Figure 33:
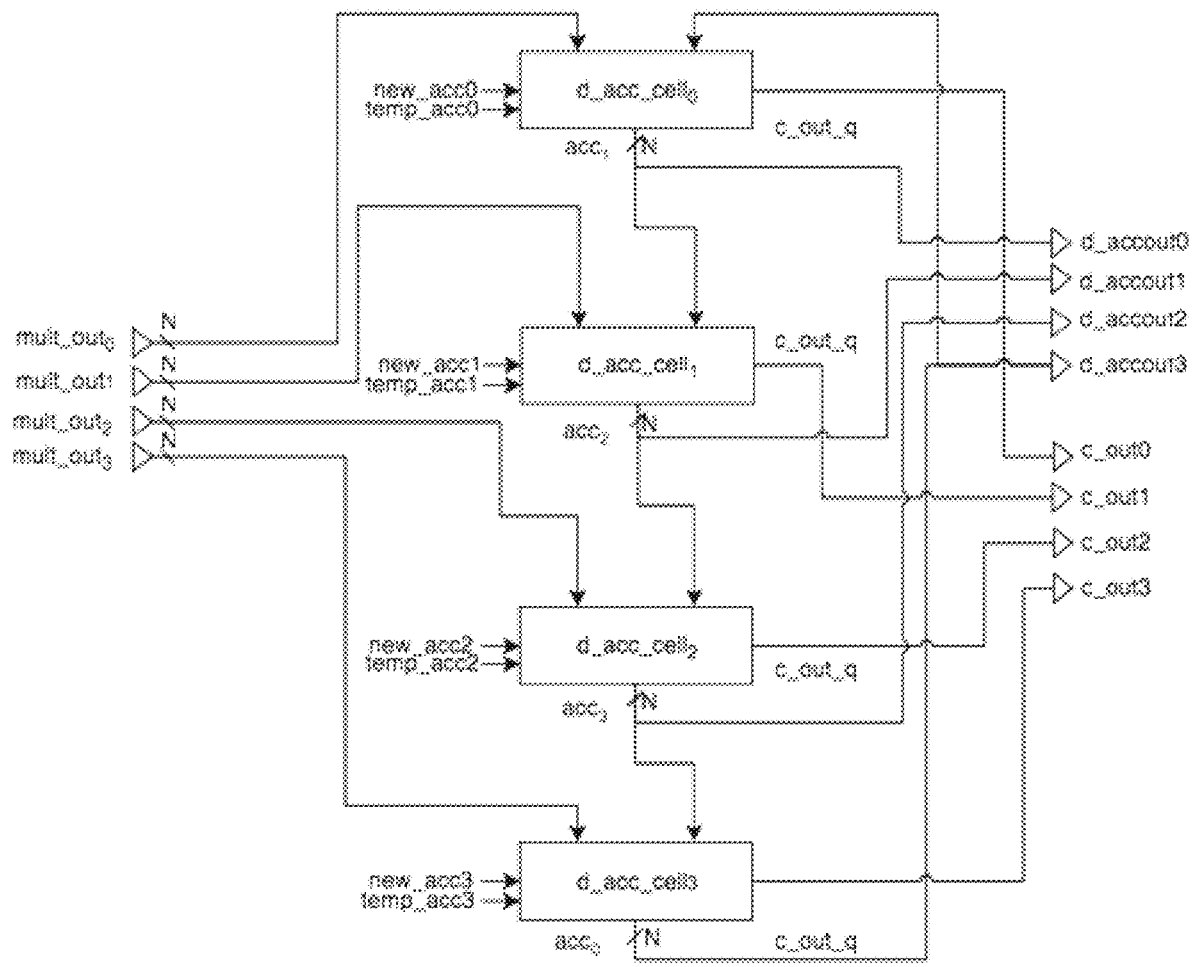
FIG. 33 illustrates an example embodiment of a digit-serial accumulation architecture.

Since in aP consecutive clock cycles each adder unit takes as input aP digits with growing weight carry output can be delayed and fed back to the carry input of the same unit aP times. As in the case of the first accumulation architecture described, carry out produced by the accumulation of the most significant digit of the multiplication outputs is accumulated by an extra accumulator, which size depends on the maximum number of accumulations required. The corresponding digit-cell and accumulation architecture, in which aP=4, are depicted in FIG. 32 and FIG. 33, respectively; each cell contains the adder unit i and register i+1.

The operation of the presented accumulation architecture can be understood with an example in which an accumulation starting on the adder unit 0 is considered. For convenience, the accumulation value after l updates, obtained adding l multiplication results together, is identified with $acc_l$; the $n^{th}$ digit of $acc_l$ is $acc_{l,n}$; the $n^{th}$ digit of the $l^{th}$ multiplication result is identified as $m_{l,n}$.

As it can be seen from the timing diagram of FIG. 51, in aP consecutive clock cycles, unit 0 will receive as input the output digit of multiplier unit 0. The starting accumulation value, $acc_0$, is zero. In the first clock cycle, adder 0 computes the sum between $m_{0,0}$, $acc_{0,0}$ and a zero carry in. The digit output of this operation, $acc_{1,0}$, is given as an input to register 1 and, during the following clock period, will be visible on its output.

In the second clock period, adder 0 computes the sum between $m_{0,1}$, $acc_{0,1}$ and the carry out computed in the last cycle, which in this case is zero. At the same time, adder unit 1 can compute $acc_{2,0}$, which is the sum between $m_{1,0}$, the output of multiplier 1, and $acc_{1,0}$, stored in register 1; $acc_{2,0}$ is stored in register 2.

During the third clock period, adder unit 0 computes $acc_{1,2}$ as the sum between $m_{0,2}$, $acc_{0,2}$ and a zero carry in; in the same cycle adder 1 and 2 compute, respectively, $acc_{2,1}=m_{1,1}+acc_{1,1}+c_{in1}$ and $acc_{3,0}=m_{3,0}+acc_{2,0}+c_{in3}$, where $c_{in3}$ is zero since $acc_{3,0}$ is the first digit of the third accumulation step.

The processing proceeds on as described in this example: each adder unit is used to compute the result of a different accumulation step $acc_k$, computations of different steps start with one cycle delay and they all last aP clock cycles. In each clock period, a different adder unit begins new accumulation step until, after $n_{acc}$ cycles, the least significant aP digits of the accumulation result are produced in serial format on the output of the register with associated index $(n_{acc})$mod aP. This can be explained considering that the $n_{acc}$ sums to be computed are distributed among aP units: this means that the $l^{th}$ sum of the accumulation, with $l=n \times aP+j$, where n and j are a natural numbers and $j \in [1; aP]$, will be computed by the adder unit with index equal to j−1, and stored, in digit-serial format, in its output register, identified with index j.

Results of consecutive accumulations carried out with this accumulation strategy are produced on the output of different registers; in general, from what was observed earlier, it is possible to say that if we consider the result of the $m^{th}$ accumulation carried out by one unit, it will be produced on the output of the register identified with the $$i_{out,m}{}^{th}=[m \times (n_{acc})] \mathrm{mod}(aP) \qquad 4.3$$

index number given by Equation 4.3, above.

Starting from the clock cycle after the digit aP−1 of the accumulation is produced, the most significant digits of the accumulation are available on the output of the most significant carry output accumulation units.

Control signals temp_acc and new_acc (see FIG. 32 and FIG. 33) are temporization signals and are used in order to give indication to the adder unit that, respectively, a new update of the accumulation value is to begin, so carry input is to be zero, and a new accumulation is to begin, so the last accumulation digit input of the adder is to be zero.

This second accumulation strategy presented has the advantage that no selection on the multiplication output is needed and, even if results are produced on different output lines for consecutive accumulation operations, the selection of the correct output line to connect to the output serial to parallel converter is to be done only once every $n_{acc}$ clock cycle, not in every clock cycle, as for one or more other accumulation strategies presented herein. Furthermore, for this second accumulation strategy, if the N-bits×W-bits multiplier is implemented with a carry save array multiplier, there is no need to use external adder units. In fact, the carry input ports of the first line of the array multiplier could be used to implement a fused multiply accumulate structure.

It will also be appreciated that both the alternative accumulation architectures presented allow using fewer registers then the ones used in a digit-serial accumulator unit as described above. Indeed, for these units, aP register stages of N flip-flops are employed for the computation of the least significant aP digits of the result, while the same amount of registers is employed just in one single serial accumulation unit, which is to be replicated aP times in order to obtain data rate matching, according to the word level unfolding algorithm.

Also, the output word-parallel, digit-serial to word-serial, bit-parallel converter can be reduced with the last presented serial MAC architectures. Indeed, in the unit obtained using the unfolding method on the first presented digit-serial MAC unit, as described with respect to at least one serial accumulator discussed above, an entire word-parallel, digit-serial to word-serial, bit-parallel converter may be used. This is because groups of aP subsequent accumulation results will be ready in aP consecutive clock cycles, overlapping in time.

This can be pointed out in the timing diagram of FIG. 50: during the last accumulation operations (acc3) of MAC1, MAC2, MAC3 and MAC4 the digits of the accumulation results are produced, one in each clock cycle. It can be observed that the results of the four MAC operations overlap during the $10^{th}$, $11^{th}$ and $12^{th}$ clock cycles. Moreover, during the $12^{th}$ cycle, each of the mentioned operations produces one output digit. In order to convert all the results to bit parallel format and to bring them on the output of the MAC unit in consecutive clock cycles, aP serial to parallel converters are used.

In the other two MAC units presented, instead, consecutive accumulation results will be separated in time from $n_{acc}$ delay cycles, just like in a parallel MAC unit.

In FIG. 51, for example, it can be noticed that the last multiplication operations of two consecutive accumulation units are divided by $n_{acc}=3$ clock cycles.

This means that, depending on the length ($D_{out}$) of the accumulation digit-serial signal, and on the number of accumulations to be carried out, two conditions may arise:
1) $n_{acc} \geq D_{out} \rightarrow$ there is not any overlap between consecutive accumulation results and so only one (instead of aP) serial to parallel converter may be employed.
2) $n_{acc} < D_{out} \rightarrow$ there is an overlap in time between the results. The number of results overlapping in time, which is the number of serial to parallel converters $n_{conv}$, can be computed as the number of accumulation words that are ready during $$n_{conv} = \left\lceil \frac{D_{out}}{n_{acc}} \right\rceil \qquad 4.4$$

one output sample period rounded to the nearest higher integer (Equation 4.4).

This evaluation may be done fixing the maximum number of digits in the accumulation result and considering the smallest number of accumulations of interest. As the smallest number of steps in accumulation is two, in the worst case the number of serial to parallel converters for the presented architectures is one half of the number used for the digit-serial MAC cluster unit, as shown in Equation 4.4.

3.2 Multiplier Choice

As mentioned in the introduction, an embodiment uses pre-processing logic in order to detect input digits that allow multiplier units to be gated in the clock periods in which they should be executed. More details on an example method and the logic used are provided elsewhere herein. The described multiplier unit derived using the folding technique is advantageously suited for this purpose; indeed, this multiplier unit computes, in each clock cycle, one parallel×digit multiplication—which is a W-bits×N-bits multiplication—and adds it to the most significant W bits of the current value of the partial sum. The least significant N bits of the result represents the digit output computed in the considered cycle, the other bits are the part of the partial sum which is to be fed back in order to be updated in the following cycle. An example architecture implementing this operation in depicted in FIG. 34.

From this description, we can obtain the data dependent gating: in cycles in which a zero digit input arrives, the multiplier unit can be gated since the W most significant bits of the partial sum value are already the result.

For some other multiplier units presented, it may be more difficult to apply the same idea due to several reasons briefly discussed below. First, the same digit of the serial input is processed by these units during several consecutive clock cycles, each time in a different area of the circuit. In an embodiment, a pipeline may be implemented with a gating logic able to deactivate the correct areas of the multiplier unit in each period. Furthermore, since partial sum generator units and carry save adder units take delayed versions of the digit-serial input and of the carry signals, respectively, conditions under which these subunits can be gated are more difficult to be identified. As all considered multiply units employ similar hardware (e.g. the same number of full adders and registers), the multiplier unit obtained with the folding algorithm can take new parallel inputs at a higher rate (every P cycles instead of every 2P cycles), which makes the procedure of unfolding described before less expensive in terms of area occupation, and this unit more suitable for the purposes of the present disclosure.

Some modifications may be made on the selected multiplier unit in order to optimize it for the purposes of the present disclosure. First, in a full digit-serial processing framework, the presented multiplier unit has two digit-serial outputs: one produces the least significant half-word of the result, the other, the most significant part. As already explained, the considered multiplier unit computes the most significant half word in parallel format in the last clock cycle of the input sample period and a parallel to serial converter is employed to transform it in serial format. Since, for the interests of the present disclosure, the accumulation results are produced in bit-parallel format, the inventors have observed that doing the accumulation on the most significant half words of the multiplication directly in bit-parallel format allows circuit simplifications. More in detail, it is possible to eliminate from the circuit both the mentioned parallel to serial converter and one half of the digit-serial to parallel converters employed to obtain the output in bit parallel format. In such a way, only a traditional parallel accumulator unit may be employed for the accumulation of the most significant half-word of the multiplication results and the size of this unit depends on the maximum number of accumulations to be made. For this reason, there is no need to use any extra accumulation units in order to do the most significant carry out accumulation.

As noted elsewhere herein, in each clock cycle, only one of the multiplication units processes the most significant digit of the serial input (see FIG. 51). Therefore, only one most significant half word of the multiplication result is produced by the cluster of multiplier units in each clock cycle. Similarly, only one of the adders computes the accumulation on the most significant digit of the lower half word of the multiplication result. Consequently, in order to give the right inputs to the parallel accumulation unit in every clock cycle, two multiplexers are employed to select the right parallel output of the multiplication units and the right carry out, produced by the digit-serial adder units. The control signals employed for the selection can be obtained delaying the ones used for the temporization of the digit-serial unit, so their generation does not add overhead circuitry.

3.3 Kernel Memory Reorganization

Another application specific consideration can be pointed out in order to further optimize the described MAC unit. As already mentioned, generally, in a bit-parallel context, a bit-parallel, word-serial to digit-serial, word-parallel converter may be employed in order to supply the digit-serial inputs to the cluster of multiplier units. It may seem like it is even more so due to the purposes of the present disclosure, since more than once it was stated that little or no modifications at a system level would be advantageous. In this case, however, samples which should be given in digit-serial format to the multipliers are weight values. This is because it was pointed out that there is a high probability to have at least one zero digit in their magnitudes and, consequently, to gate at least one multiplier unit in each clock cycle, as explained in greater detail elsewhere herein.

It was already remarked that one purpose of the present disclosure is to design a MAC unit for the acceleration of the convolution operations to be used in the forward step of a Convolutional Neural Network. For purposes of the present disclosure, the training step of the network is made offline and the learned values of the weights are loaded in a memory read by DMA engines in order to generate the weight values data stream. From the discussion above regarding Convolutional Neural Networks, the operation employing the values of the weights in the forward step is the convolution, which is implemented in hardware using MAC units. This means that the only units which need to read the data streams containing weight values are MAC units employed to accelerate the convolution operation; therefore, if modifications in the format used for weight memorization are made, consequences at a system level may be avoided, and a modification of the upload routine implemented.

A bit-parallel, word-serial to digit-serial, word-parallel converter is employed since, with the traditional memorization format of the weight values, a new weight sample arrives in each clock cycle, but only one of its digits is to be used immediately by one of the multiplication units; the others are delayed in order to be used in the consecutive clock cycles. However, the unfolding method used to obtain the matching between the data rate of the parallel stream and the processing rate of the multiplier works because, with the scheduling strategy adopted and after an initial latency, the cluster of multiplier units takes as an input P (which is W/N) digits belonging to different weight samples in each clock period. In this way, the processing rate matches the rate with which new data arrive (W bits/clock cycle).

In the following, an example of how the weight memory could be reorganized in order to eliminate the input converter is presented. For the sake of simplicity, it is assumed that the width, which is the bit-width of one location—of the memory used for weight values is equal to W, which is the word length of one memory sample. Consequently, in a bit-parallel processing context, the simplest way to memorize weights would be saving weight values to be used in subsequent clock cycles in adjacent memory locations (see FIG. 52, which also may be referred to herein as Table 3). In this way the DMA engines read subsequent memory locations in order to generate the data stream containing weight values for the convolution.

Figure 35:
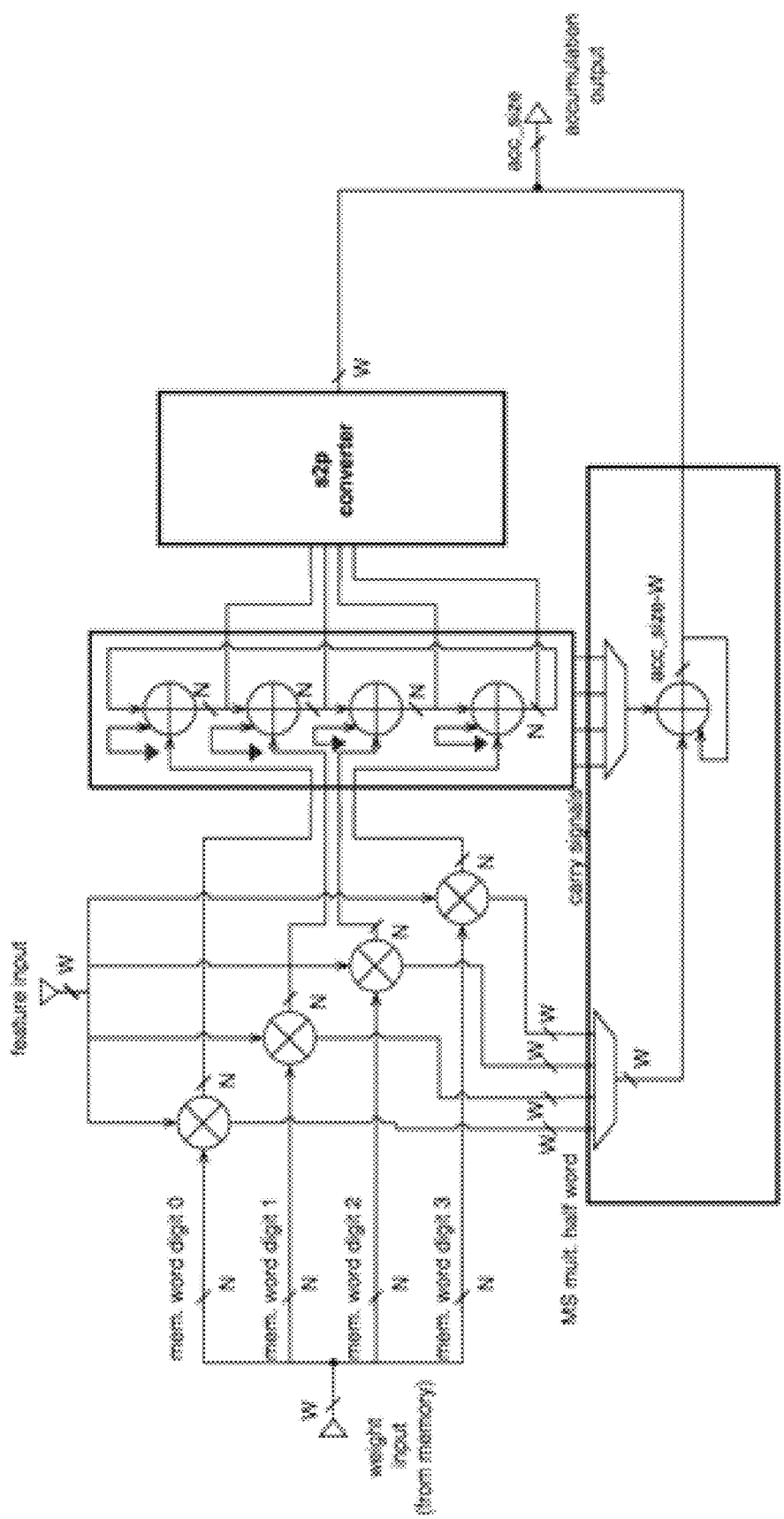
FIG. 35 illustrates an example embodiment of a digit-serial architecture based MAC hardware accelerator.

Table 3 of FIG. 52 illustrates in the form of a table an example of a standard memorization of the weights. Here, a case in which P=4 is considered. Rows of the table represent memory locations. In the columns are values assumed by digit-sized bit nibbles. The digits of each weight are identified as i)$w_n$, where i is the weight of the digit and $w_n$ is the belonging word Following the same principle for the case of the computation carried out by the presented digit-serial MAC architecture, each memory word can be employed to memorize the P digits which are used in a given clock cycle (see FIG. 53, which may also be referred to herein as Table 4) and then no serial to parallel converter is needed. The connections between the memory output port and the multiplier units are depicted in FIG. 35.

Table 4 of FIG. 53 illustrates in the form of a table a strategy for the memorization of the weights. In this case P=4. In each location, the digits of the weights to be used in a given clock cycle are memorized. The digit locations on the top left of the table can be used to memorize the most significant digits of the last weights in memory

3.4 Timing and Control Logic for the Described MAC Architecture

Since the described MAC accelerator is based on digit-serial architectures, timing and control signals may be generated in order to allow the correct operation of the sub-units building the design. In this section, a description of control signals employed for various embodiments are presented, the control logic developed and an embodiment of the output converter is described. An embodiment of a digit-serial architecture-based MAC hardware accelerator is represented in FIG. 35 for a case in which P=W/N=4.

In order to obtain a clearer description of the control signals used by each unit, units in the MAC architecture are identified with an index i, according to the convention defined.

Figure 36:
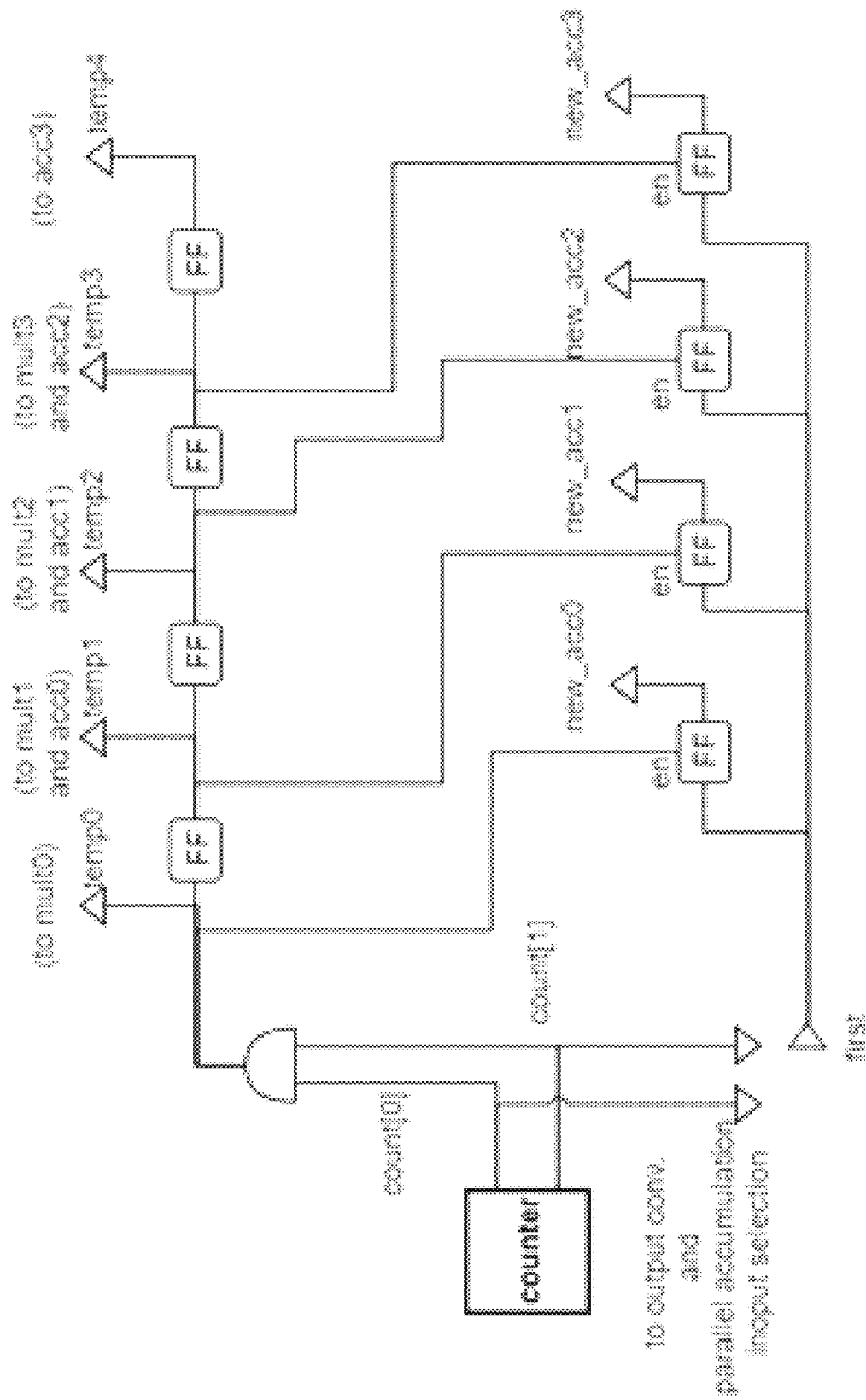
FIG. 36 illustrates an example embodiment of control logic used to generate control signals in an embodiment.

The control logic used to generate the control signals in an embodiment is depicted in FIG. 36. In particular, in the depicted embodiment input digit-serial signals with length P=4 are considered; new_$acc_p$ and temp_q signals are missing since they can be generated by delaying first and temp signals, respectively.

3.4.1 Multiplier Unit Control Logic

The chosen multiplier unit, as mentioned, employs two control signals named temp and temp_q, in the presented implementation; both signals are periodic and have a period of one entire input sample period or, in other words, their period has the same duration of an entire serial multiplication operation. The first mentioned signal is high only in the last clock cycle of the multiplication computation. This is because the new value of the parallel input, coming from the parallel input port of the MAC unit, arrives one cycle before the beginning of its computation and is to be latched in the parallel input register of the multiplication unit (see FIG. 34). In order to do so, temp signal enables the propagation of the new parallel input value in the master latches of the input register stage; the latched value will be seen as the output of the register in the following clock cycle and the low logic value of temp signal, during the rest of the sample period, ensures that the value of the parallel factor remains unchanged until the current computation is completed.

To generate temp control signal, a modulus P counter—where P=W/N is the length of the input digit-serial signal—connected to a logic circuit can be used. The latter implements a logic function having its single-bit output set when the current count has one specific value. In the implemented unit P=4 and, thus, a two-bit counter is used together with a two input AND gate, which has its output set when the counting value is "11".

As mentioned, P multiplier units are employed in the implemented structure. P is the number of clock cycles in an input sample period. Since the computation carried out from each of them starts in P consecutive sample periods, the temp signal generated for the multiplier unit with i=0 is delayed P−1 times in order to produce $temp_i$ signals for the other multiplication units. As shown in FIG. 35, data arriving to the parallel input port of the MAC unit is presented to the parallel factor input of all the multiplier units. Therefore $temp_i$ signals are used, not only to enable the parallel factor register of the single multiplier to change the stored value only when a new computation is to begin, but also to ensure a correct scheduling of the input data among the P multiplier units.

The second signal, temp_q, is used in order to select a zero value for the current partial sum in the first cycle of a multiplication computation. This signal, therefore, is be set only during the first phase of the multiplication operation and, consequently, it is one cycle delayed version of temp. An option allowing to use just temp to control the whole multiplication unit, without delaying it to generate temp_q, is using it as a synchronous reset signal for the partial sum register. In this manner the high logic value of temp signal, during the last cycle of a multiplication computation, causes the reset of the mentioned register in the following period, allowing to feed back the desired zero partial sum in the first cycle of the following multiplication computation. However, a synchronous reset may utilize a multiplexer identical to the one employed to select the zero partial sum value during the first cycle of the computation. Due to that, little or no advantage is derived from this modification in terms of area saving. Furthermore, in such an embodiment, the output of the partial sum register is not used as parallel output of the multiplier unit because, if the most significant half word of the result is to be read on the output of the partial sum register, its value is produced one cycle after the last phase of the related serial multiplication, which is exactly in the cycle when the mentioned synchronous reset of the partial sum register has its effect. Another input word size register would then be employed in order to implement a pipeline stage between the multiplier units and the parallel accumulation unit and this would be a much greater overhead compared to adding a single register per multiplication unit in order to obtain temp_q from temp.

The mentioned delayed versions of temp, used in multiplication units to enable new parallel factor memorization, are not suitable to be reused in place of temp_q signals. Indeed, as depicted in more detail elsewhere herein, multiplier units are subject to input data dependent gating and, in cycles in which one of the multipliers is to be gated, all registers connected to its input have to retain their memorized value. Therefore temp_q signals are generated using independent registers and the already presented signals are not reused.

3.4.2 Accumulation Control Logic

In some embodiments described elsewhere herein, a serial accumulation architecture may utilize two control signals: temp_acc and new_acc. The first signal is used to select a zero carry input in cycles when the least significant digit of the accumulation is updated; this happens in the same clock cycle when the first phase of the multiplication is being computed by the multiplier connected to the considered adder, since there are no registers between multiplier units and digit-serial adders. Considering that when the multiplier unit is gated, the serial accumulation structure is to continue working, temp_q signals used for input partial sum selection in the multipliers cannot be used for this purpose. Therefore, for the adder unit identified by index i, $temp_{i+1}$ signal, of the multiplier unit i+1, is reused. The processing of the multiplier unit i+1, indeed, is delayed of one clock period compared to the one of multiplier i and, therefore, the timing signal $temp_{i+1}$ is high when the least significant bit of the accumulation is being processed by the adder unit i.

The control signal new_acc is used when a new accumulation is to begin and, therefore, the adder unit computing the first addition of the accumulation is to take zero as current accumulation value. Since each adder unit in the described accumulation architecture updates the least significant P digits of the accumulation in a serial manner, the mentioned control signal is to influence the entire serial computation and, therefore, when its value is set, it remains unchanged for P clock cycles.

The beginning of a new accumulation is signaled from outside the unit, setting a logic one on the first line of the data stream connection. This is done during the clock cycle when the first parallel factor and the least significant digit of the first digit-serial factor are sent to the MAC unit. As already pointed out, inputs arrive to the MAC units one cycle before their computation, due to the registers between the accelerator inputs and the multiplier units inputs. Consequently, new_acc signal can be generated instantiating a control register for each adder unit and using the control signals $temp_i$ of the multipliers to enable the register stage of adder unit i to latch the current value of the first signal. In this manner, only the unit which starts computing the first addition of the new accumulation in the cycle following the one when first signal is high has its $new\_acc_i$ signal set. Since $temp_i$ is high once in P clock periods, the value of $new\_acc_i$ signals is updated once every P cycles.

A similar control signal is employed for the parallel accumulation unit. Since the latter is the only accumulation unit used for the most significant half-word of the multiplication results, the control signal indicating the beginning of a new accumulation, named $new\_acc_p$, is only a delayed version of the first signal. Indeed, the delay due to the input registers and the P cycles of latency for the multiplier units to produce the most significant half-word of their output is taken into account in order to have a correct synchronization.

Since in P consecutive clock cycles the parallel accumulation unit receives its addend and carry inputs from the P different multiplier and serial adder units, respectively, multiplexers are utilized to implement the selection. As discussed above, in a given clock period, only one of the multiplier units has its parallel output ready on the output of the partial sum register and, in the same cycle, only the adder unit connected to the mentioned multiplier has the most significant carry output stored in the carry feedback register. Moreover, in order to keep track of the position of the valid data, the same counter used for the generation of the temp control signal can be used. Therefore, two P:1 multiplexers may be utilized to select the correct input for the parallel accumulation unit.

3.4.3 Output Converter

As discussed above, using the described digit-serial MAC architecture, the number of digit-serial to bit-parallel converters employed on the output depends on the length of the output digit-serial signal and on the minimum number of accumulations of interest, according to equation (4.4). Considering that only the least significant P bits of the accumulation are computed in digit-serial format, the length of the output digit-serial signal to be converted is P, which is 4 in the considered examples. The minimum number of accumulations of interest has been set to three, thinking of the case in which the MAC unit is used to compute operations related to one line of a kernel with typical dimension of 3×3 and batch size one is used; this is an extremely low number of accumulations for a MAC unit used for convolution acceleration of deep neural networks. In this case, according to equation (4.4), two converter units are employed, since two subsequent accumulation results are overlapped in time and, more precisely, the most significant digit of the first accumulation and the least significant one of the second accumulation will be given as output in the same clock cycle (see example of Table 2 of FIG. 51).

In this worst-case scenario, according to equation (4.3), digits of P=4 consecutive accumulation results will be produced on accumulation registers identified by decreasing associated indexes—the first accumulation result is on the output of register 3, the second on the output of register 2 etc—and the sequence is repeated over time. This means that overlapping accumulation results are given on the output of registers with subsequent index numbers; therefore, one of the two serial to parallel converters is used for digits produced on the output of registers having even associated index, while the other converts results given on the output of accumulation registers with odd associated index.

Only digits of the final accumulation results need to be converted to parallel format and, therefore, we determine when to begin a new conversion and on what port valid output digits are produced. As already mentioned, input stream connections include a last line; the value of the latter is set to 1 only in the clock cycles in which current inputs are related to the last multiplication that is summed to the ongoing accumulation. Therefore, a properly delayed version of this control signal, named last_q, can be used to synchronize the output converter and, together with the output of the counter used for temp control signal generation and parallel accumulator input selection, to keep track of the output port on which valid data is produced. More in detail, in a given clock period, the output of the counter can be used to determine on which of the accumulation registers the least significant digit of a new accumulation partial result will be produced in the following clock cycle. If the last_q is high, the mentioned digit belongs to the final accumulation result and is latched by one of the output converters. Assuming that that counter output values are related to the P output ports of the accumulation registers according to the rule depicted in Table 5 of FIG. 54, it can be observed that the value of the least significant digit of the counter output in the cycle in which last_q is high, can be used to determine which of the output converters is to be enabled to begin the conversion in the following cycle. Which of the two lines connected to the enabled converter is to be latched in it is determined by the most significant bit of the counter output (see Table 5 of FIG. 54). More specifically, for each converter unit, a 2:1 multiplexer is employed; the selection signals of these multiplexers are connected to the output of control registers which latch the most significant bit of the counter output and are enabled by the AND between last_q and the least significant bit of the counter output. With this enable mechanism, the value of the selection signal remains unchanged during all the P cycles in which the digits to be converted are produced and the switching activity of the multiplexer is minimized. In Table 5 of FIG. 54, the relation between counter outputs and serial ports on which output is produced is illustrated in the form of a Table. In the rightmost column the converter used for each output port is specified.

In the implemented embodiment, various implementations of digit-serial to parallel converters may be used, and the enable signal to select the correct nibble stage in each clock cycle obtained with a pipeline of the value given by the AND between last_q and the least significant digit of the counter (or its negated version).

Figure 37:
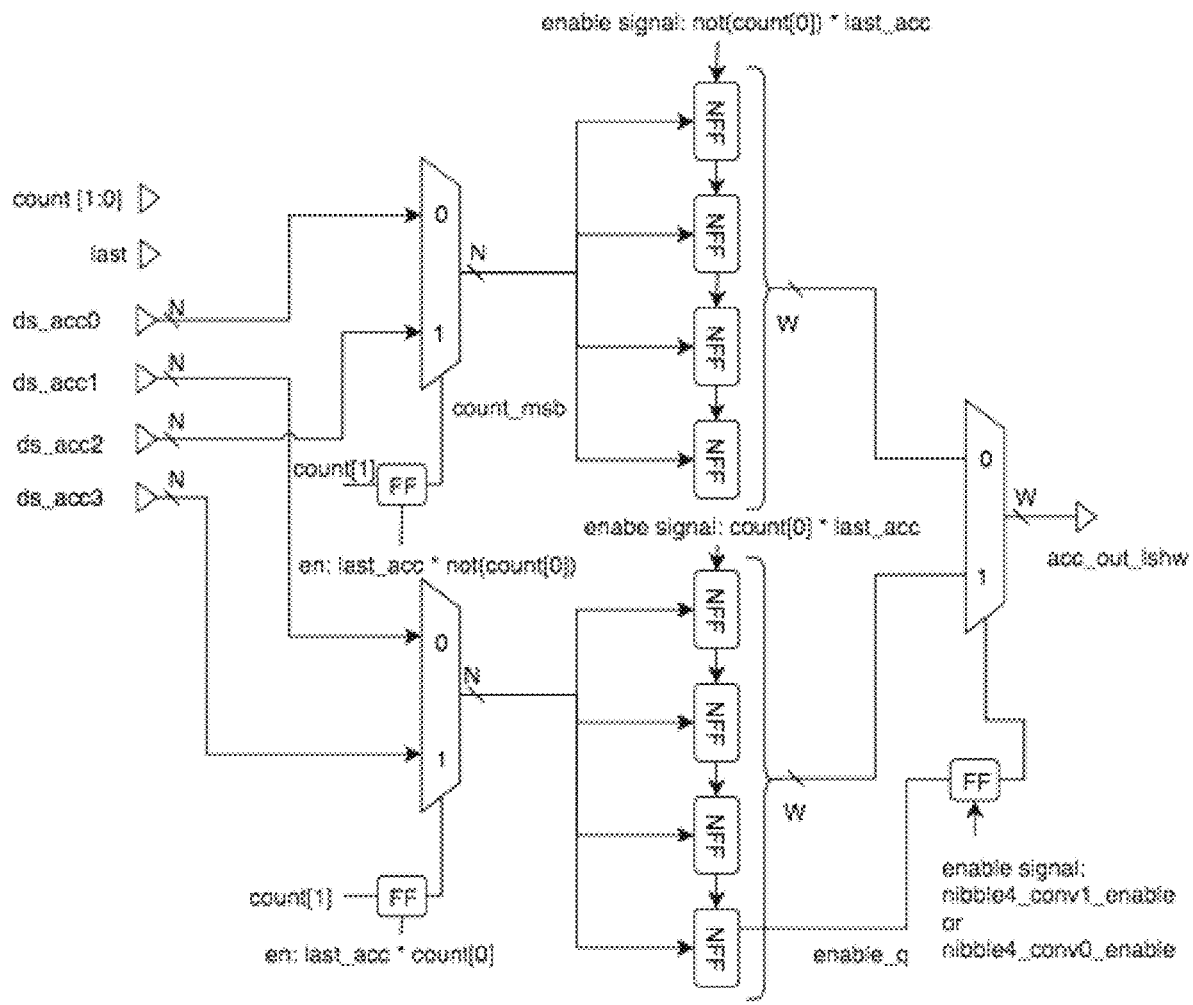
FIG. 37 illustrates an example embodiment of an output converter.

Finally, the output of the two converters are selected in order to bring the valid parallel output on the output port of the MAC accelerator. This is done using a control register latching the enable signal of the most significant nibble register of converter 2. The mentioned control register is enabled by the OR between the enables of the most significant digit registers of the two converters. This allows updating the selection signal only when one of the two most significant nibble registers have their enable signal set, thus, when a new conversion was completed. The resulting output converter, in which $D_{out}=4$ and $n_{acc\ min}=3$, is illustrated in FIG. 37.

4 Data-Nibble Dependent Gating

Figure 38:
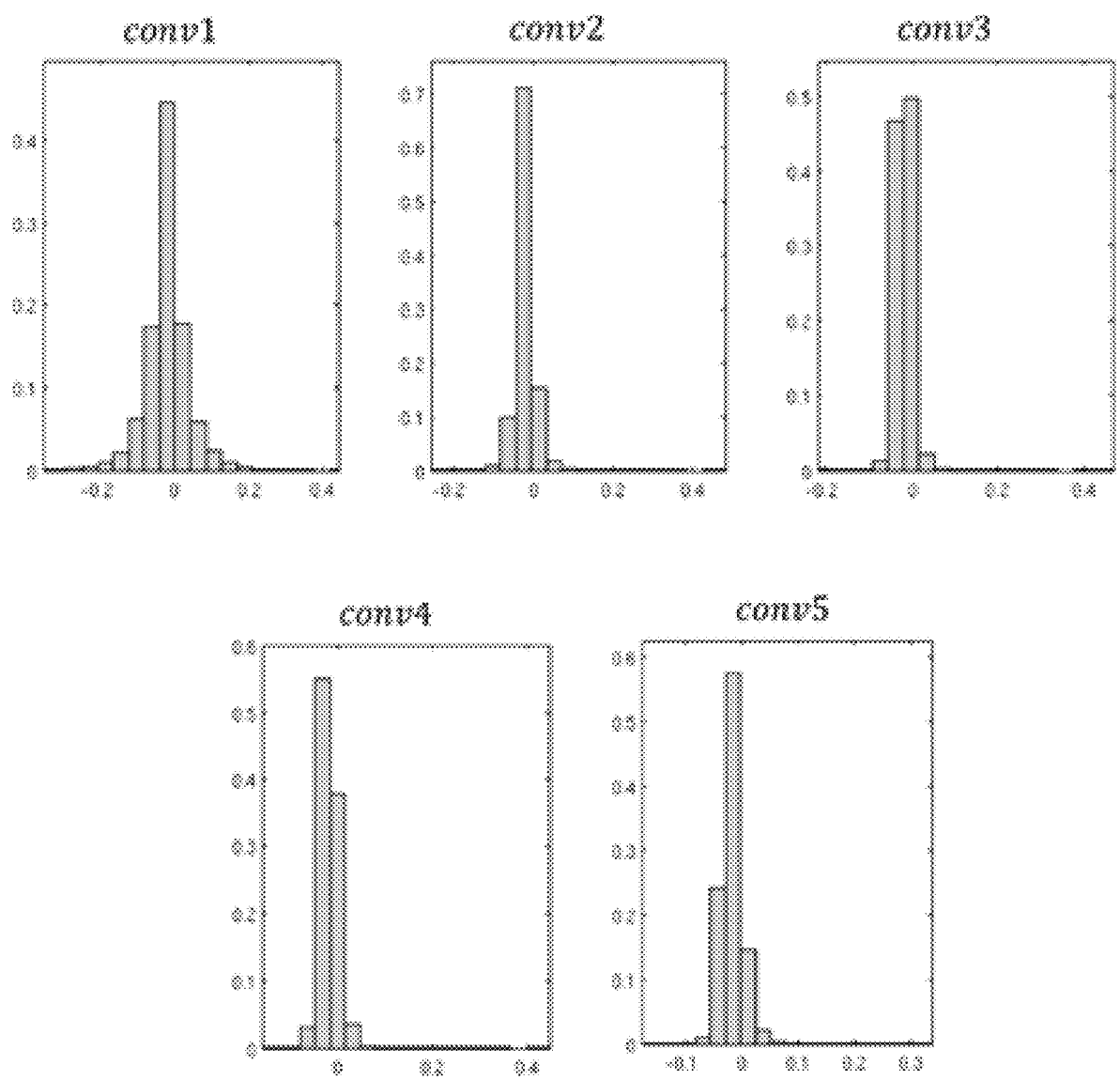
FIG. 38 illustrates example histograms of trained weights of convolutional layers.

As discussed elsewhere herein, histograms reporting occurrences of trained weights values for the convolutional layers of AlexNet have been derived. These histograms, depicted in FIG. 38, show a trend which is quite common in layers of artificial neural networks: most of the weights have values belonging to an interval around zero which is very narrow, compared to the entire range of the distribution. This means that, given the hypothesis that a uniform quantization is used in the whole range of weight values, many of them will have magnitudes represented by bit-words having nibbles of zeros in the most significant bit positions.

A raw example of this can be obtained considering Table 6 of FIG. 55, in which, for each convolutional layer of AlexNet, an example of the entire range of trained weight values and the boundaries of intervals containing 95% of them are reported.

In the hypothesis that a uniform quantization having full scale equal to the maximum weight magnitude is used, the resolution is set by the mentioned maximum value and by the number of bits used; in the reported example a W=16 bits quantization is considered. If, for each convolutional layer, the boundary of the interval with 95% of weight occurrences having biggest magnitude is considered, it is possible to state that its absolute value is bigger than the 95% of the weight magnitudes (even more if the mentioned interval is not perfectly symmetric around zero). In the rightmost column of Table 6 of FIG. 55, the words corresponding to the mentioned boundaries are reported for each layer. It can be observed that, for all convolutional layers, the word corresponding to the magnitude of the mentioned boundary has a number of zeros in the most significant positions. This means that if, for example, a digit size of N=4 is used (a reasonable value, as explained elsewhere herein), the 95% of the weights will have at least one zero digit in their words, for almost all the convolutional layers. In Table 6 of FIG. 55, occurrences of the trained weights of AlexNet convolutional layers are illustrated. In the rightmost column, the binary word corresponding to the largest boundary of the interval containing 95% of occurrences is reported. A uniform quantization with full scale equal to the greatest weight magnitude is considered As explained above, the convolution operation involved in the forward computation of a convolutional neural network can be implemented through multiply accumulate operations, in which activations of the previous layer and weights are taken as inputs. Therefore, a MAC hardware unit used to accelerate CNNs will compute, in the multiply step, multiplications between weights and activations. In most of cases, the computation of the product between the input activation and the weight may be avoided when obtaining the result. This means that partial products generated by multiplications involving null input nibbles need neither to be computed nor to be added to the partial sum. For example, a multiplication between two factors A and B can be considered. If $A=A_{P-1}2^{(P-1)N}+ \ldots +A_1 2^N+A_0$, where $A_i$ is an N-bits nibble, normally the computation $$\sum_{i=0}^{P-1} B \times A_i 2^{Ni} \qquad 5.1$$

would be carried out as described by Equation 5.1, above.

However, if for some values of i the corresponding $A_i$ is zero, the related product is zero and there is no need for the hardware to compute it or to add it to the partial sum.

In this regard, it will be appreciated that the digit-serial multiplier unit used in the described MAC architecture carries out a digit×parallel word multiplication and adds it to the current partial sum value, in each phase of its computation cycle. Therefore, in the presented context, an interesting way to reduce power consumption due to the multiply step is using weight values as digit-serial input to the multiplier unit and setting up a gating strategy which allows avoiding switching activity in clock cycles when there is a zero digit input. A more detailed description of the clock gating technique is provided elsewhere herein.

However, in order to enable this feature, in addition to the development of a gating logic, some modifications to the multiplier unit discussed in previous sections of this disclosure are made.

Further optimizations can be obtained with this approach, such as if multiplication is carried out using sign-magnitude coding. Indeed, it can be observed from graphs in FIG. 38 and values in Table 6 of FIG. 55, that the distributions of the weights in the mentioned zero-centered intervals are almost symmetric around zero. Carrying out the multiplication in sign and magnitude, therefore, almost doubles the occurrences of zero nibbles in the most significant digit positions and, therefore, the possibilities to have gated cycles. This happens because with inputs coded in sign magnitude, the multiplication is computed between the magnitudes of the factors and the output sign is determined with an XOR between the signs of the factors. This implies that zero nibbles are present in multiplication inputs both for positive and negative values of the weights close to zero. If inputs are coded in two's complement, instead, negative numbers close to zero have nibbles of ones in the most significant bits positions and, therefore, all phases of the multiplication computation are carried out.

Two different solutions are described in order to obtain weight and activation inputs, respectively, in sign and magnitude coding. As already noted elsewhere herein, weight values are only used by MAC accelerators, therefore they can be stored directly in sign and magnitude coding, as explained in more detail elsewhere herein. For activation values in the input feature map, instead, a conversion to sign and magnitude coding is utilized, since they come from the input or from other layers of the network and are usually coded in two's complement.

It will be appreciated that multiplication results coded in sign and magnitude should be converted back to two's complement before the accumulation step, since the latter can be computed in a simpler and efficient way with this coding. A more detailed discussion on where these coding conversion stages can be implemented efficiently in embodiments of the disclosed structure is carried out.

4.1 Clock Gating Technique

Clock gating is a widely used power reduction technique whose purpose is enabling the clock signal to toggle registers in a certain region of the circuit only when new incoming data actually needs to be processed from it. In cycles in which registers are not clocked, they maintain the memorized value and, consequently, the combinatorial logic connected to it retains its previous state.

The main power savings derived from this technique are due to reduced switching activity in the combinatorial logic fed by the gated registers. Indeed, from circuit theory, it is known that power consumption is due to two components: dynamic consumption and static consumption. Most of the dynamic power consumption can be attributed to switching consumption, which is due to charging and discharging of the internal and load capacitances of the circuit. Clock gating technique, therefore, can greatly help saving power preventing registers and the connected logic from doing useless commutations.

Very often this technique is only implemented by synthesis tools at a gate level; however, the RTL step of the design flow is not too early to start implementing it. This is because, at this level, the focus is more on the functional operation of the whole architecture, so it is easier for RTL designers to use their knowledge on the circuit operation to find regions in which implementing clock gating can be convenient. Explicitly introducing gating from the RTL design, therefore, can avoid multiple iterations of the design flow in order to match power consumption requirements.

Figure 39:
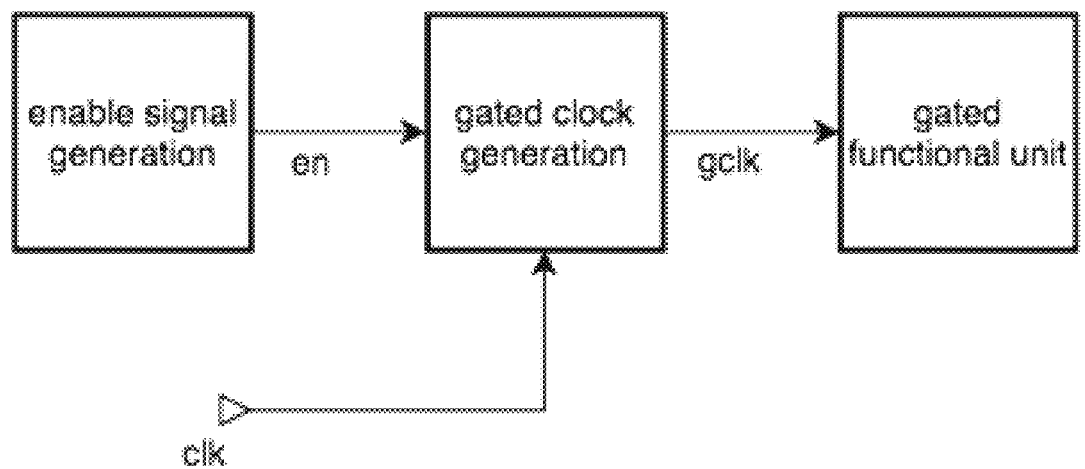
FIG. 39 illustrates an example embodiment of gating logic.

In the RTL design step, gating is usually implemented using enable signals, computed by clock-gating circuits, which check if the conditions allowing the circuit to be gated are verified. A gated clock signal is generated by the gating logic and is connected to the clock inputs of registers used in the area where gating is to be implemented. A schematic representation of the structure of clock gating logic is depicted in FIG. 39. In the depicted representation, en is an enable signal, clk is the clock signal, gclk is the gated clock signal.

One manner in which clock gating can be implemented is using a combinatorial implementation; in the latter, AND or OR gates, respectively if the edge toggling the registers is the rising or the falling one, are used in order to affect the value of the gated clock with one of the enable signals. The drawback of this approach is that the enable signal is not synchronized with the clock and, therefore, changes in the enable signal can directly cause undesired commutations in the clock signal and severe synchronization problems.

Figure 40:
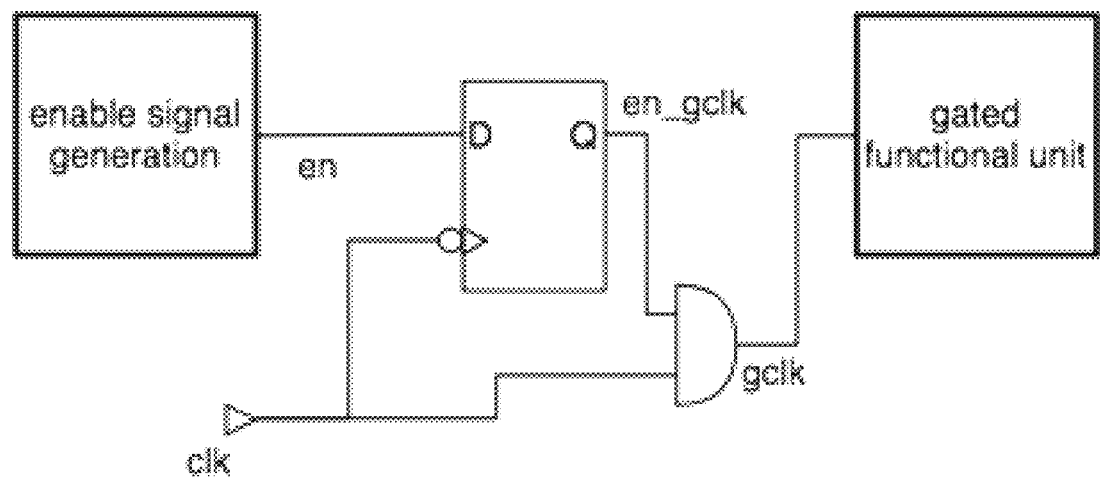
FIG. 40 illustrates an example embodiment of a flip-flop based gating logic.

To avoid these problems, in the developed architecture a flip-flop based design is used. In the latter, the control signal generated by the gating logic is latched in a flip-flop triggered by the opposite clock edge, compared to the one which toggles other registers in the unit. This allows using as enable signal en gclk, affecting the gated clock value, the output of the mentioned flip-flop. This has the advantage that the mentioned output signal is ready and stable since half period before the clock edge triggering gated registers, until one half-period after the mentioned edge. In this manner, spurious computations of the gated clock signal are avoided. A schematic representation of a flip-flop based gating logic is depicted in FIG. 40.

4.2 Implemented Gating Logic

In the case of interest, a pre-processing logic operating on the input digits of the multiplier units is employed to obtain the desired gated clock signal. The latter is connected to the clock inputs of all the registers connected to the inputs of a digit-serial multiplier unit. In the following, the implemented gating logic interposed between each of the digit input ports of the MAC accelerator and the digit input register of the corresponding multiplier units is described.

The digits of the weight inputs, coming from one of the digit input ports of the MAC unit, are pre-processed by the gating logic in the clock cycle prior to their computation. This is done with the aim of checking if at least one of their bits is different from '0'. If this condition is verified, the computation of the product in which the pre-processed digit is involved is to be carried out and, therefore, the commutation of the gated clock signal, toggling the input registers of the multiplier unit, is enabled. If the mentioned condition is not verified, the gated clock signal is prevented from switching so that the input registers of the multiplier units are not triggered and their outputs are not updated, leading to a gated cycle.

Figure 41A:
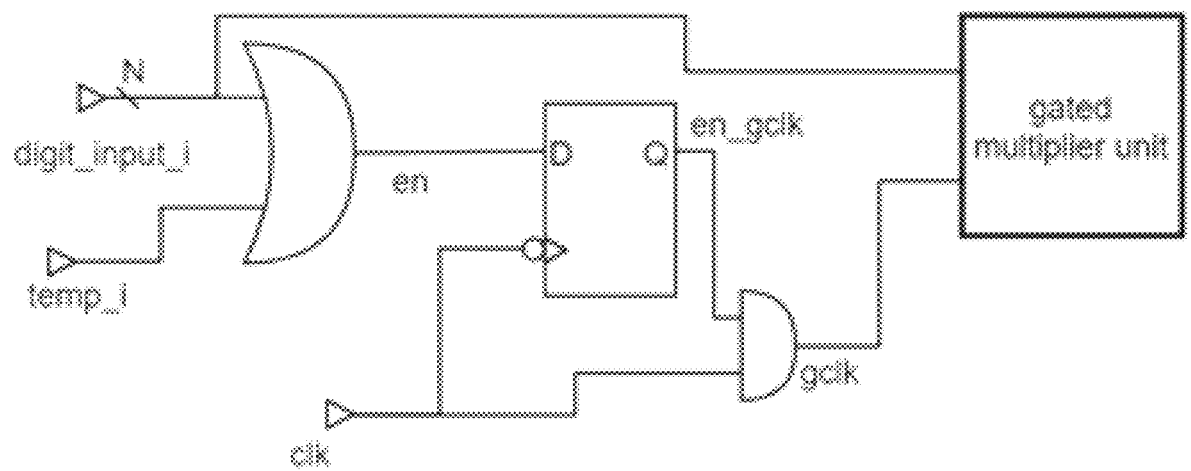
FIG. 41A illustrates an example embodiment of gating logic.
Figure 41B:
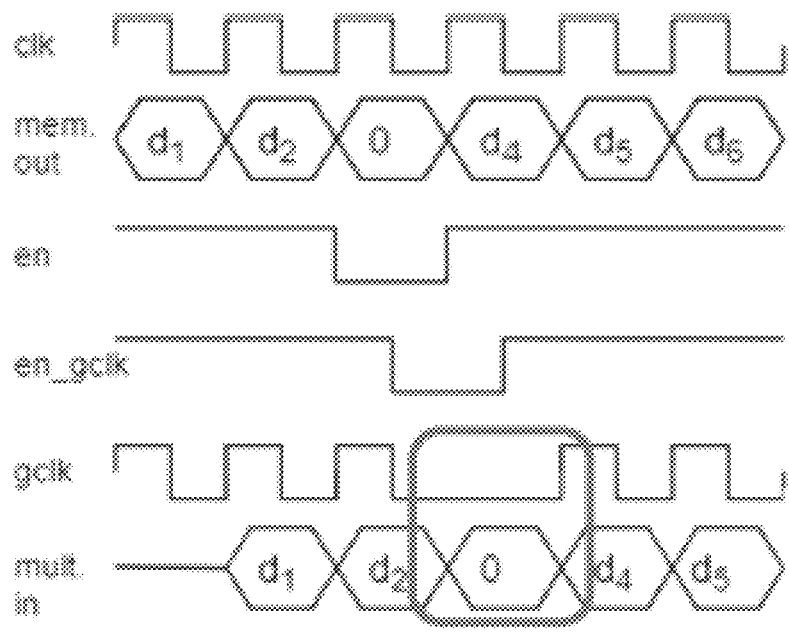
FIG. 41B illustrates example schematic timing information corresponding to the gating logic of FIG. 41A.

The described operation can be obtained using the gating logic depicted in FIG. 41A. The value of the en signal is the result of the verification of the mentioned condition on the current input digit. Therefore, this signal is used as input of the negative triggered flip-flop to generate the en gclock signal, which goes in AND with the clock signal to generate the gated clock signal gclk. A schematic signal diagram illustrating timing information corresponding to the gating logic of FIG. 41A is provided in FIG. 41B.

As is explained in more detail elsewhere herein, gating is not allowed in the first phase of the digit-serial multiplication operation. For this reason, the en signal is obtained as the OR between the bits of the current digit input together with the $temp_i$ signal of the multiplier unit on which the considered gating logic operates. In such a way, the computation of the next phase of the multiplication is enabled when the input digit is different from zero or when the mentioned phase is the first of the processing cycle and therefore $temp_i$ is '1'.

4.3 Multiplier Unit with Gating Support

To understand the modifications made to the chosen multiplier unit in an embodiment in order to support clock gating, we analyze the differences between its normal operation and what should happen in cycles in which gating is to be done.

As already explained, during its normal operation, the chosen multiplier unit computes an entire multiplication in P following clock cycles: in each cycle, the parallel factor, memorized in the register connected to the parallel input, is multiplied for the current input digit. After that, the computed partial product is added to the most significant W bits of the current partial sum value, memorized in the partial sum register. This happens in all computation phases except the first, in which temp_q signal indicates the beginning of a new multiplication and selects a zero input partial sum. The output of each phase is coded on W+N bits: the least significant N bits are given as output on the digit-serial output port of the multiplier unit, the most significant W bits are memorized in the partial sum register and constitute the input partial sum value for the next cycle. For the following considerations the parallel factor remains the same for all the P phases of a computation. Only in the last cycle of the sample period, temp signal enables a new value to be latched in the register connected to the parallel input. The new parallel factor value will be on the output of the mentioned register in the following clock cycle, when its processing begins.

Multiplier units are gated in cycles in which the value of the current input digit is zero and, therefore, the current value of the partial sum doesn't need to be updated, as already observed. In cycles in which gating is performed, values stored in the registers connected to the unit do not change, together with logic values in all its internal nodes. Therefore, the W most significant bits of the result computed in the previous cycle are not stored in the partial sum register and fed back, but remain unchanged on the input of the mentioned register until a new toggling clock edge arrives. Remembering that, in gated cycles, the current partial sum value is also the result, its N least significant bits are brought to the digit-serial output while the other W−N bits are shifted by N positions to the right. The W bits so obtained remain on the input of the partial sum register, since they represent the current partial sum value of the following cycle. This means that additional selection and control logic is utilized in order to choose the correct output digit and to do the proper shifting of the current partial sum value in gated clock periods. The employed control signals can be obtained from the clock enable signal generated by the pre-processing logic used to implement the gating mechanism. More in detail, the operations to be carried out in gated cycles are implemented by a multiplexer-based N-bits shifter which has its input connected to the output of the multiplier logic. The selection inputs of the multiplexers in the shifter may be obtained using three control registers having their inputs connected to a negated version of the en enable signal, which is generated by the gating logic.

An example can be made considering a case in which P=4. The first control register introduces a delay between its input and its output signal, called sh1_q. When this signal has high logic value, which is in gated cycles, a N-bits shift of the multiplication result is performed. The second control register is enabled by sh1_q, meaning that its output, named sh2_q, is set when in the previous cycle gating has already been performed. When sh2_q is high, which is in the second of two gated cycles in a row, a second N-bits shift on the already shifted value is performed. The last control register is enabled by sh2_q, therefore its output, named sh3_q, is set during the third consecutive gated cycle. The control signal sh3_q causes an ulterior N-bits shift of the gated multiplier output.

The first of the P cycles to compute an entire multiplication may be unsuitable for gating with the presented implementation of the multiplier unit. Indeed, the value of the parallel factor changes in this clock cycle because the parallel input register stores the new feature data sample which, otherwise, would be lost. This means that the logic values in the nodes of the combinatorial part of the circuit would change, nullifying the effects of the gating, even if all other register used by the multiplier unit were gated. Even if the presented restriction reduces the probability of gating, it should be noted that, as already discussed, the majority of weight values are close to zero and, as a consequence, the least significant digit is the one which has the lowest probability of being zero. As a consequence, the first phase of the multiplication computation is the least subject to gating.

A solution which would allow gating the digit-serial unit also in the first cycle of the computation would be duplicating the register connected to the parallel factor input. This would allow the memorization of the new value of the parallel factor in the second register when the structure is to be gated, but would employ additional logic to select which of the two registers is to be connected to the multiplier unit. Moreover, in this case, the output digit and the value of the partial sum for the following cycle should be zero and so other additional circuitry would be employed also for this selection.

Due to the considerations carried out on the distribution of the weights, the presented changes to the multiplier unit were not implemented in an embodiment, due to overhead considerations. Gating in the first cycle of the multiplication is therefore inhibited using methods already discussed elsewhere herein.

4.4 Computation in Sign and Magnitude Coding

As already explained, for the purposes of the present disclosure it is convenient to carry out the multiplication step of the MAC operation in sign and magnitude coding. The solutions adopted in order to convert the activations of the input feature map in sign and magnitude and to store the weight values using the same coding are presented in the following sections. For the storage of the weight values, memory organization techniques already presented elsewhere herein may be used.

The digit-serial multiplication in sign and magnitude is implemented doing two operations. The magnitude of the output is computed doing the digit-serial multiplication between the magnitudes of the input activation sample and of the weight sample. This operation can be implemented by the unsigned version of the multiplier unit chosen for the described MAC accelerator implementation, already discussed elsewhere herein. Instead, the sign of the output is computed doing an XOR between the signs of the input samples. The output sign signal is to be defined for the whole duration of the multiplication operation. Indeed, this signal is utilized for the correct interpretation of the output digits which are produced since the first phase of the multiplication.

For this reason, when the first inputs of a new multiplication computation arrive, their sign is to be specified, both for the parallel and the digit-serial input. In this way, the output sign can be computed and its value is latched in a register with enable signal which holds the stored value for the entire duration of the multiplication computation. The enable port of the mentioned register is connected to the temp$_i$ signal of the related multiplication unit, ensuring that the stored sign is updated only when a new computation cycle is about to begin.

The result obtained in such a way is to be converted back to two's complement, using methods discussed elsewhere herein.

4.4.1 Memorization of Sign and Magnitude Coded Weight Values

In order to avoid format and coding conversions, weight samples comprising words made of the P digits are stored for processing by the presented MAC unit in each cycle, and sign and magnitude coding is to be used. Thus, in certain embodiments, weight samples are coded on W bits, meaning that W−1 bits are used for their magnitude and 1 bit is dedicated to the sign coding. In a classic sign and magnitude implementation, the leftmost bit of a sample word would be used for the sign; however, this would not be the right choice for the considered implementation. Indeed, as already pointed out, the sign of the digit-serial input is to be specified since the arrival of the least significant digit of the magnitude. In the described MAC architecture, instead, a least significant digit first format is used, which means that the sign would be given as an input together with the most significant digit of the weight sample, when only the last phase of the multiplication computation is left.

Considering the format of memory words, a word of the weight memory may in certain implementations contain P digits of P different samples, each having a different weight (intended as significance in the belonging sample word). This means that P−1 magnitude digits will be composed by N bits, and the one having most significant weight, which is $2^{(P-1)N}$, will be composed of N−1 bits. The remaining bit, which is not used for the magnitude of the most significant digit, can be employed to specify the sign of the digit in the word having least significant weight, which is $2^0$. It will be appreciated that, using the described strategy, the position of the sign bit is fixed if related to the one of the digit with least significant weight. Indeed, the format of a weight memory word is due to the one cycle delay that occurs between the concurrent digit-serial multiplications carried out by the multiplier units in the presented architecture. Therefore, as depicted in the example of Table 4 of FIG. 53, the digit with most significant weight, containing the mentioned sign bit on the leftmost bit position, is always stored in the N-bits nibble located to the left of the least significant digit, to which the sign is referred. When the digit with least significant weight is in the rightmost N bits nibble, instead, the sign bit is on the leftmost bit of the memory word.

Figure 42:
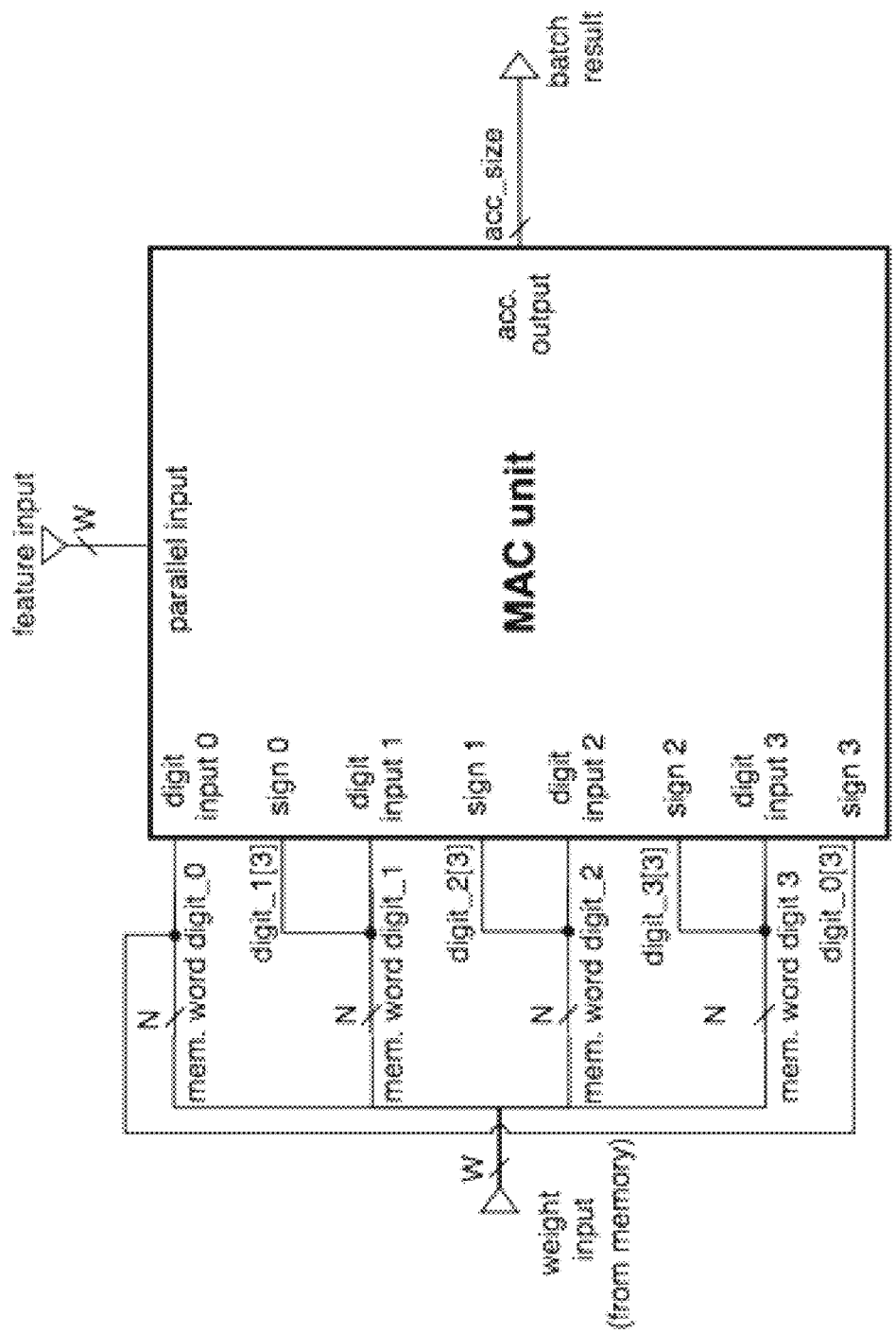
FIG. 42 illustrates example connections between memory output and MAC unit inputs of an embodiment.

The P digit input ports of the MAC unit, identified with index $i \in [0; P-1]$, may be hardwired to the W bits of the memory output port. From what was explained above, therefore, the weight sign input of the multiplier unit identified by the index i can be hardwired to the most significant bit of the digit input port identified by the index i+1. For the multiplier unit P−1, the weight sign input is connected to the most significant bit of the digit input port 0, as shown in FIG. 42 via connections between memory output and MAC unit inputs for the described memorization strategy of weights in sign and magnitude coding. In this example, P=4.

With the described strategy, the weight sign input of the multipliers is valid only in the clock cycle when the less significant digit is the current input. However, the sign of the multiplication result, computed using the correct input sign, is latched in the output sign register and it is held for the whole duration of the computation thanks to the enable signal $temp_i$, as mentioned before.

4.4.2 Conversion of Input Activation Values

As already mentioned, input activation values, arriving from the stream connection linked to the parallel factor input port of the MAC unit, are usually coded in two's complement. This means that, for negative input values, a conversion is employed in order to have them in sign and magnitude coding. The magnitude of a negative number coded in two's complement can be derived complementing all the bits of the input sample and adding a '1' to the obtained word. The sign bit is equal to the most significant bit of the two's complement word.

Since only one parallel factor input is arriving at the presented MAC unit in each clock cycle, these operations can be implemented by a single conversion stage directly connected to its parallel factor input port. A negation of the input word conditioned to its most significant bit value can be obtained using W XOR ports, each having one input connected to one bit of the input word and the other connected to the most significant bit of the same word. An adder stage is used in order to sum the bit in the most significant position in the input sample to the word obtained from the output of the XOR ports. In this manner, the '1' addition is done only for negative input numbers.

What was described above is the classical hardware implementation of a coding converter between two's complement and sign and magnitude. In the specific case of the presented architecture, some considerations can be carried out in order to try reusing hardware units already present in it and reduce the overhead due to the conversion stage. More in detail, the instantiation of an extra adder unit can sometimes be avoided. Indeed, considering the case of a negative two's complement input activation, named A, the operation utilized to compute the multiplication in sign and magnitude coding is depicted $$M_{out}=(\overline{A}+1)\times W \qquad 5.2$$

in Equation 5.2, above.

In Equation 5.2, W and $M_{out}$ are the magnitudes of the weight sample and of the multiplication result, respectively. The complementation operation is performed only for negative activation values thanks to the previously described stage of XOR ports. Equation 5.2 can be re-written to obtain Equation 5.3:

$$M_{out}=\overline{A}\times W+W \qquad 5.3$$

Therefore, to obtain the correct magnitude of the multiplication result, instead of adding '1' to the complemented version of A using an extra adder, the weight sample can be added to the result of the multiplication $\overline{A}\times W$. This can be done without adding extra hardware if enough unutilised inputs are available in the adder used in the multiplier unit. For example, if an array multiplier is used to implement the W×N bits multiplication, the carry inputs of the rightmost full-adder cells belonging to each of the N rows are unused. These inputs, therefore, can be used to perform the addition of the current weight input digit, in order to implement the extra W addition for Equation 5.3. Since this addition is performed when the activation input is negative, we condition the operation on the value of the most significant bit of its two's complement version. This can be done using AND ports or using 2:1 multiplexers selecting between the current input digit and a zero digit.

Figure 43:
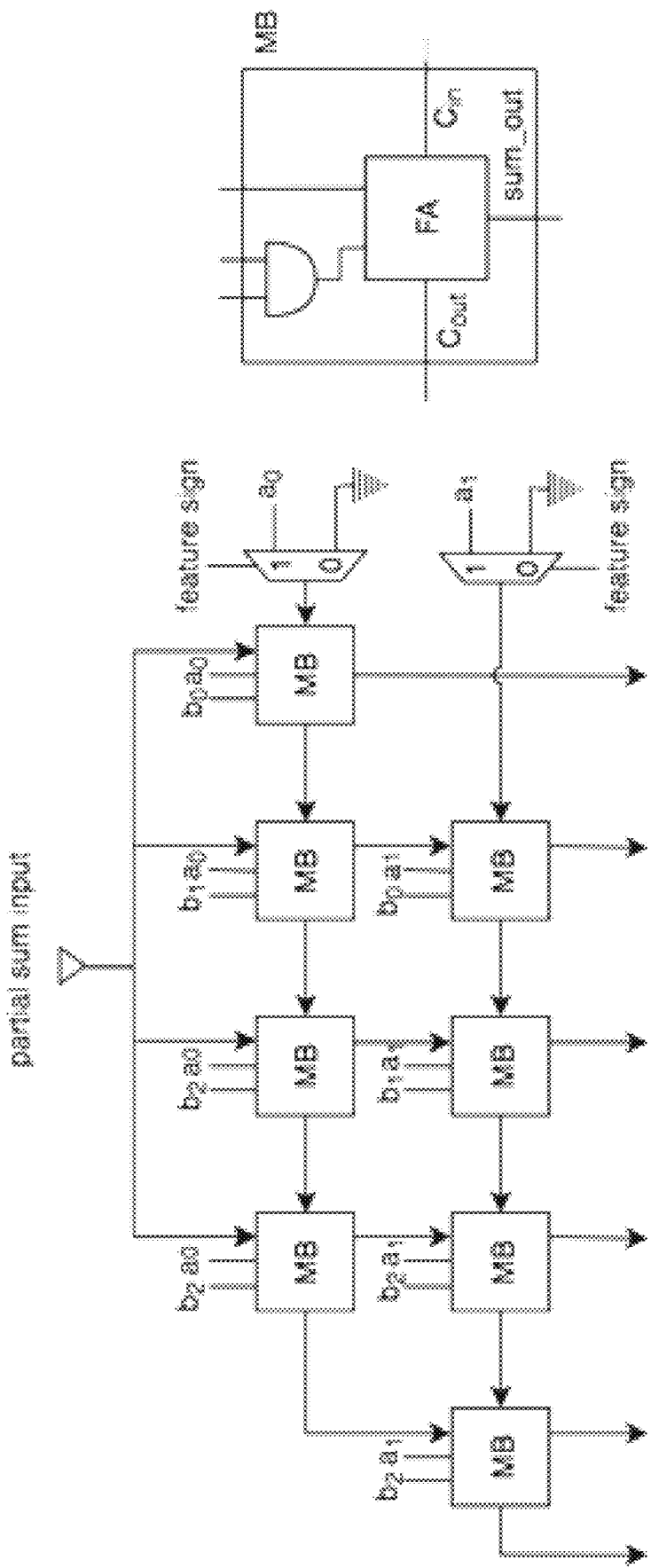
FIG. 43 illustrates an example embodiment of an array multiplier structure.
Figure 44:
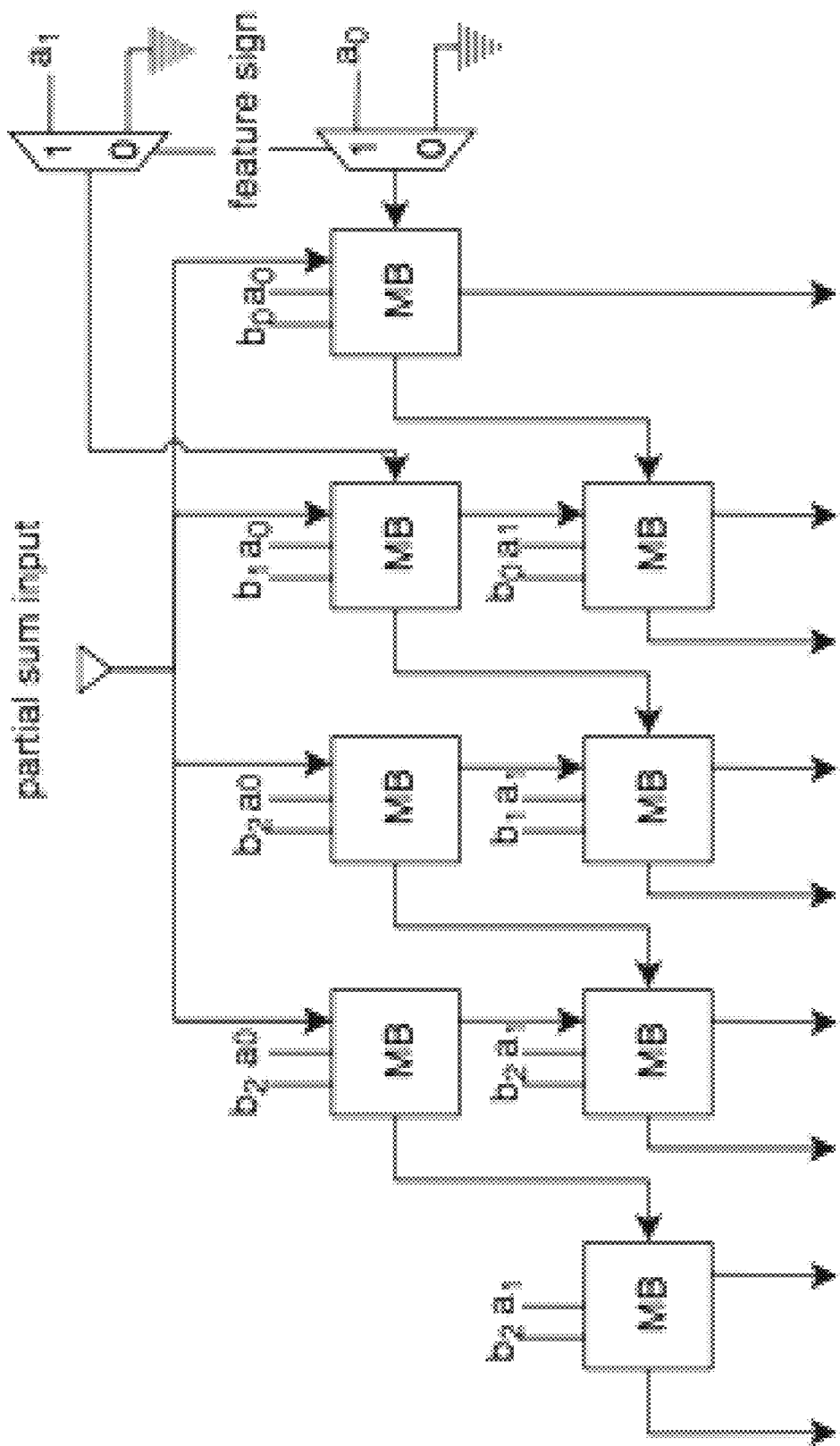
FIG. 44 illustrates an example embodiment of a modified carry save array multiplier structure.

In FIG. 43 an example of one presented strategy is depicted for a modified array multiplier structure, which can be used to implement the operation described by Equation 5.3, with W=4, N=2. In FIG. 44, a similar approach is provided for a modified carry-save array multiplier structure, which can be used to implement the operation described by Equation 5.3; again, W=4, N=2.

Therefore, if the presented coding conversion strategy is adopted, a register may be utilized in order to store the sign of the input activation sample for a whole digit-serial multiplication duration. Indeed, its value is employed in each phase of the digit-serial multiplication computation in order to determine whether the input weight digit is to be summed to the multiplication result or not. Recalling that all the parallel inputs of the P multiplier units are connected to the same port of the presented MAC architecture, it should be clear that the activation input sign register may be enabled by the $temp_i$ signal of the related multiplier unit, as previously discussed elsewhere herein. In this manner, the sign of the parallel activation input is sampled only when it is valid.

4.4.3 Conversion of the Multiplication Result

As already mentioned, the sign and magnitude coded multiplication result is to be converted back to two's complement coding before the accumulation operation is computed. Also in this case, the two's complement version of the sign and magnitude result can be obtained complementing the magnitude word and adding the sign bit to the result of the first operation. As for the feature input samples, the complementation operation can be obtained using XOR ports, taking as input one magnitude bit and the related sign bit, respectively. To determine the number of XOR ports employed for the complementation operation, it will be appreciated that, in the described MAC architecture, P digit-serial multiplication operations are carried out in parallel. More in detail, P valid output digits are produced in each clock period, together with one parallel most significant half word of W-bits. The valid most significant half word produced in each cycle is selected in order to give the right input to the parallel accumulation unit, as previously discussed elsewhere herein. This means that P×N+W=2 W XOR ports are employed for the complementation operation. W of them are employed for the conversion of the P output digits and directly connected to the digit output ports of the multiplier units, the other W are connected to the output of the multiplexer used for the selection of the valid most significant half word.

The addition of the sign bit utilized to complete the conversion can be done using the least significant carry inputs of the digit-serial adders in the accumulator architecture, as previously discussed elsewhere herein. Indeed, in the first phase of the computation cycle of each adder unit, the mentioned input bit is not used and, therefore, it can be employed to sum the sign bit. In order to do so, a 2:1 multiplexer is used to select whether the sign bit of the multiplication result or the fed back carry output of the previous cycle is to be connected to the carry input port of the adder.

In an embodiment, the MAC architecture may be designed starting from a digit-serial multiplier unit, obtained using the previously described folding transformation. Design considerations may include: 1) maximizing the probability of having cycles in which clock can be gated and, consequently, the corresponding phase of the multiplication operation can be skipped; 2) Adapting the unit's data rate to the one of the input stream-links (1 word per clock cycle); and 3) reducing the logic needed to convert data from bit-parallel to digit serial and vice versa.

Considering the AlexNet weight distribution we can state that, for almost all its layers, weights are distributed approximately in the range [−1; 1], but most of them have values near to zero. As it has been already shown, this means that, for many layers, approximately 90% of weights magnitudes present zero nibbles on the most significant part of the word. It is possible to conclude that using the serial input of the digit-serial multiplier for the weight inputs can enhance the probability of having gated clock cycles in the phases in which the most significative part of the result has to be computed.

Other improvements can be achieved computing the multiplication using sign-magnitude coding: in a sign and magnitude multiplier, the sign of the result is computed doing the XOR between the signs of the two operands; the magnitude of the result is the product of the magnitudes of the factors.

From a computational point of view, the most expensive operation is the product, but, since weights are often very close to zero, zero nibbles are more likely to be present in the most significant bits.

On the other hand, if factors are coded in two's complement, only positive numbers close to zero present zero nibbles on the most significant bits while negative numbers have ones on the most significant bits and, even if they are close to zero, all phases of the multiplication operation have to be computed (all the partial products have to be computed and added together) in order to get the correct result.

5 Results

Figure 47:
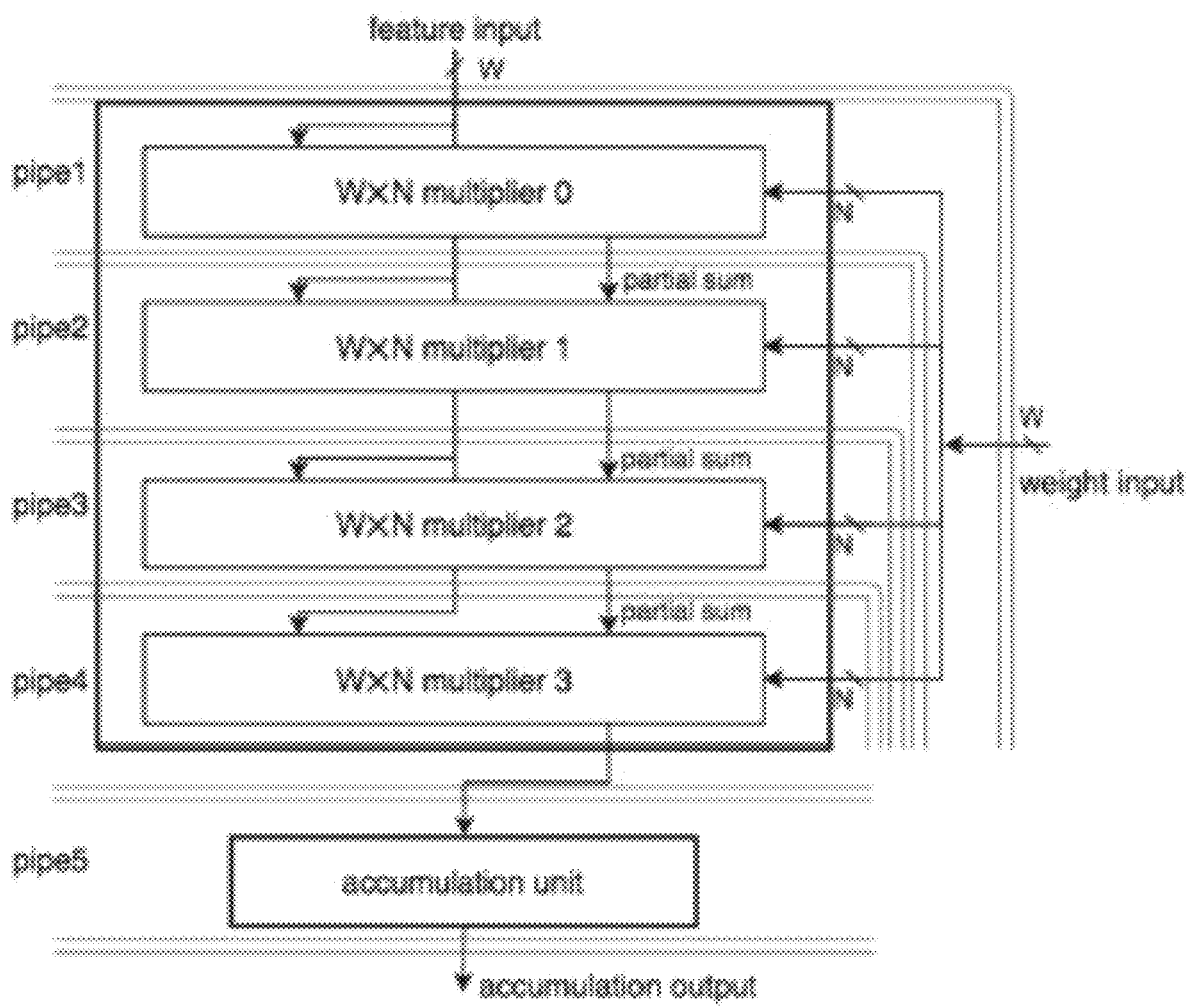
FIG. 47 depicts a reference architecture used as a point of comparison with an exemplary architecture created in accordance with embodiments of techniques described herein.

In order to have a quantitative evaluation of the advantages and drawbacks of the various described architectures, a Verilog RTL description of the latter and of a pipelined parallel MAC was made. The parallel unit used as reference architecture utilizes five pipeline stages as a fixed-point bit-parallel MAC, and is depicted in FIG. 47. After a behavioural verification step of both RTL descriptions, they were synthetized using Synopsys Design Compiler, in order to obtain gate-level netlists and estimations on area occupation. The switching activity registered during post synthesis simulations carried out on the obtained netlists were annotated and they were utilized to perform power analysis using Synopsys PrimeTime. To obtain a first estimation of the power consumption of the structures in the considered application context, the weight input values used during post synthesis simulations were generated starting from a histogram of real trained weights. These were obtained dumping the weight values of a convolutional layer of a trained SqueezeNet.

5.1 Architecture Sizing and Reference Architecture Choice

The implementation of the described architecture used for the described test phase is dimensioned considering W=16 bits inputs. This is the biggest word-size usually considered in the literature for fixed-point hardware units used to accelerate CNNs. The digit-size considered is set to N=4 bits, which in some embodiments may be the smallest divisor of W close to a theoretical optimum. The length of input digit-serial signals, therefore, is W/N=4; thus, examples presented herein can be used to have an insight of the implemented architecture structure.

Since a maximum number of 256 accumulations is considered, taking into account that the width of the multiplication output is 32 bits, the accumulation output size is 32 bits+log(256) bits=40 bits. In the described architecture, the least significant 16 bits of the accumulation output are produced by embodiments of the serial accumulation architecture described in greater detail elsewhere herein; the parallel accumulation unit, therefore, is dimensioned for a 24 bits accumulation result.

As mentioned before, the considered reference model is a bit-parallel MAC unit with five pipeline stages. The reference unit is dimensioned for the same input size and the same maximum number of accumulations considered in the above description of the described architecture implementation.

The use of a pipelined parallel MAC unit as reference model should lead to a fair comparison between embodiments of the described architecture and a traditional bit-parallel unit. As discussed at various points throughout the present disclosure, digit-serial architectures, compared to parallel ones, can reach higher speeds thanks to their smaller combinatorial critical paths. However, at least some of those embodiments may incur increased overhead due to the introduction of register stages and additional control logic. Something quite similar may occur with respect to a pipelined parallel unit, which therefore should be comparable in terms of area occupation and speed.

More in detail, each of the P=4 W×N multiplier units used in various embodiments of the described architecture is P times smaller than a W×W parallel multiplier implementation. Therefore, in order to obtain a fair comparison, the multiplier unit of the reference architecture is divided in P=4 pipeline stages; another stage is employed for the accumulation step.

The reference pipelined MAC architecture was obtained adding a 40 bits bit-parallel accumulator unit to a library pipelined two's complement multiplier unit.

5.2 Synthesis of the RTL Modules

After a behavioural validation step of the RTL designs, they were synthesized using Synopsys Design Compiler. A 1 GHz constraint was set for clock frequency and 28 nm libraries considering typical fabrication conditions, a supply voltage of 0.9 V and the operation at 25° C. were used for both the designs.

As a result of the synthesis step, Verilog files containing the gate level netlists corresponding to the RTL descriptions were obtained, together with reports regarding their timing and their area occupation. SPEF (Standard Parasitic Exchange Format) files containing data regarding parasitic parameters of the netlists were also generated.

In Table 7 of FIG. 56, obtained values of area occupation are reported in terms of gate count, which is the number of two input NAND gates having the same area of the considered designs. As it can be noticed, the area occupation of the described architecture is greater than the one of the reference structure of about the 6%. This is probably due to the additional logic employed in order to generate timing and enable signals, to shift the multiplication partial sum in gated cycles, to select inputs for the parallel accumulation and to implement the output converter. This hypothesis is supported by the fact that reports show that the growth in area occupation is mainly due to non-combinatorial circuitry.

5.3 Gate Level Simulation and Generation of Switching Activity Annotation Files

The netlists of the described architecture and of the reference one, obtained from the synthesis, were used to perform post synthesis, gate-level simulations and produce the Value Change Dump (VCD) files containing the annotations of the switching activity employed for the power analysis.

The power analysis carried out estimates the power consumption of the described architecture when it is used to accelerate the forward step of a convolutional neural network. More specifically, a quantitative estimation of the power savings that can be achieved by the described architecture in the specific application context is provided by the analysis. The extent of the savings depends from the distribution of the weight values. In order to approximate the operation of the architecture during computations for convolutional neural network inference, the switching activity annotation files may be generated using a set of weight inputs having the same range and distribution of the weights belonging to a convolutional layer of a trained network.

A subset of the weights of a convolutional layer is not necessarily distributed according to the statistic of the global set. Therefore, the inputs used for the gate-level simulation were generated using the inverse transform sampling method, briefly described in the following.

According to the inverse transform sampling method, values of a random variable X, distributed according to a given Cumulative Distribution Function (CDF) F(x), can be generated through the following steps:
1) Generate values of a random variable U uniformly distributed in the range [0; 1];
2) Compute the inverse of the mentioned CDF $F^{-1}(u)$;
3) Values of $F^{-1}(u)$ corresponding to the ones generated in the step 1, are distributed according to F(x).

Figure 45:
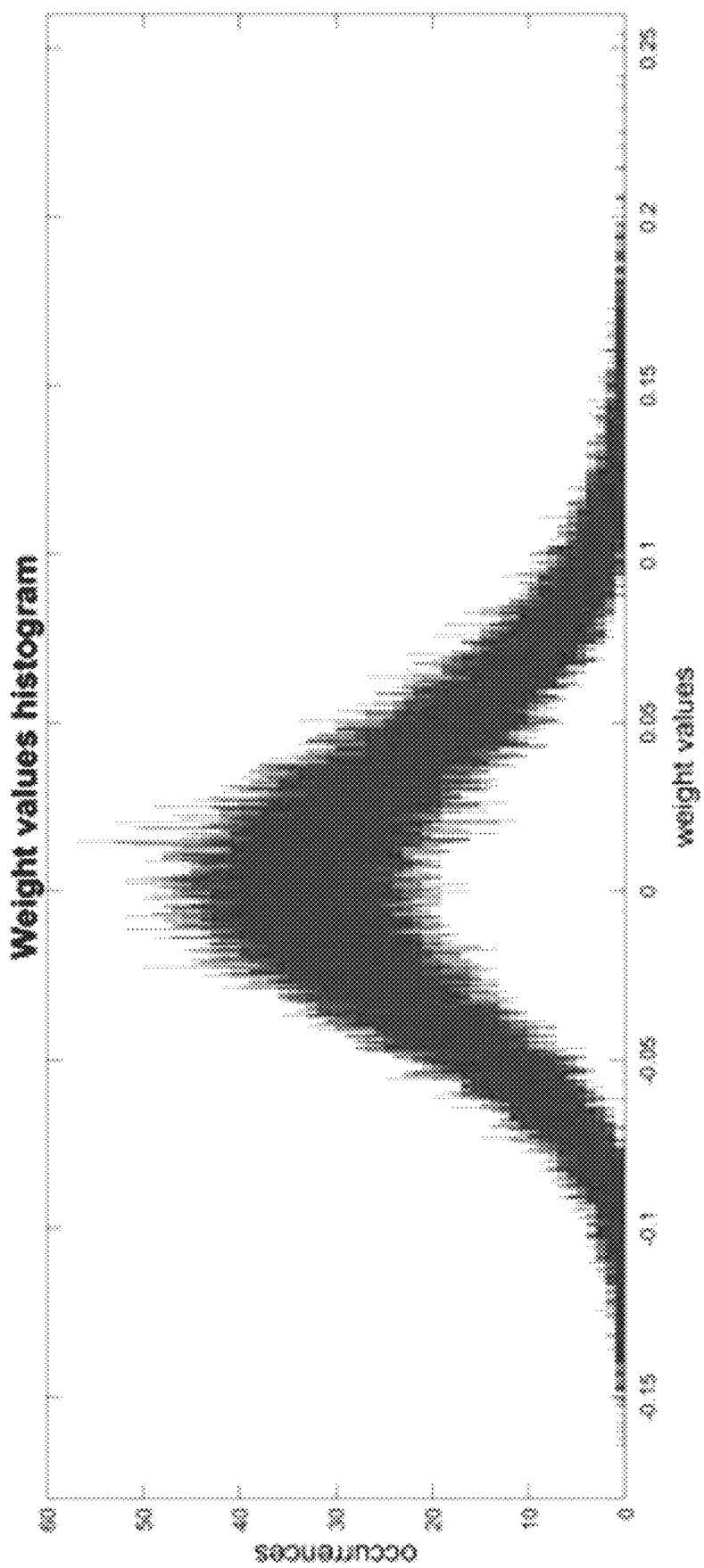
FIG. 45 illustrates an example histogram of the weights of a trained convolutional layer.
Figure 46:
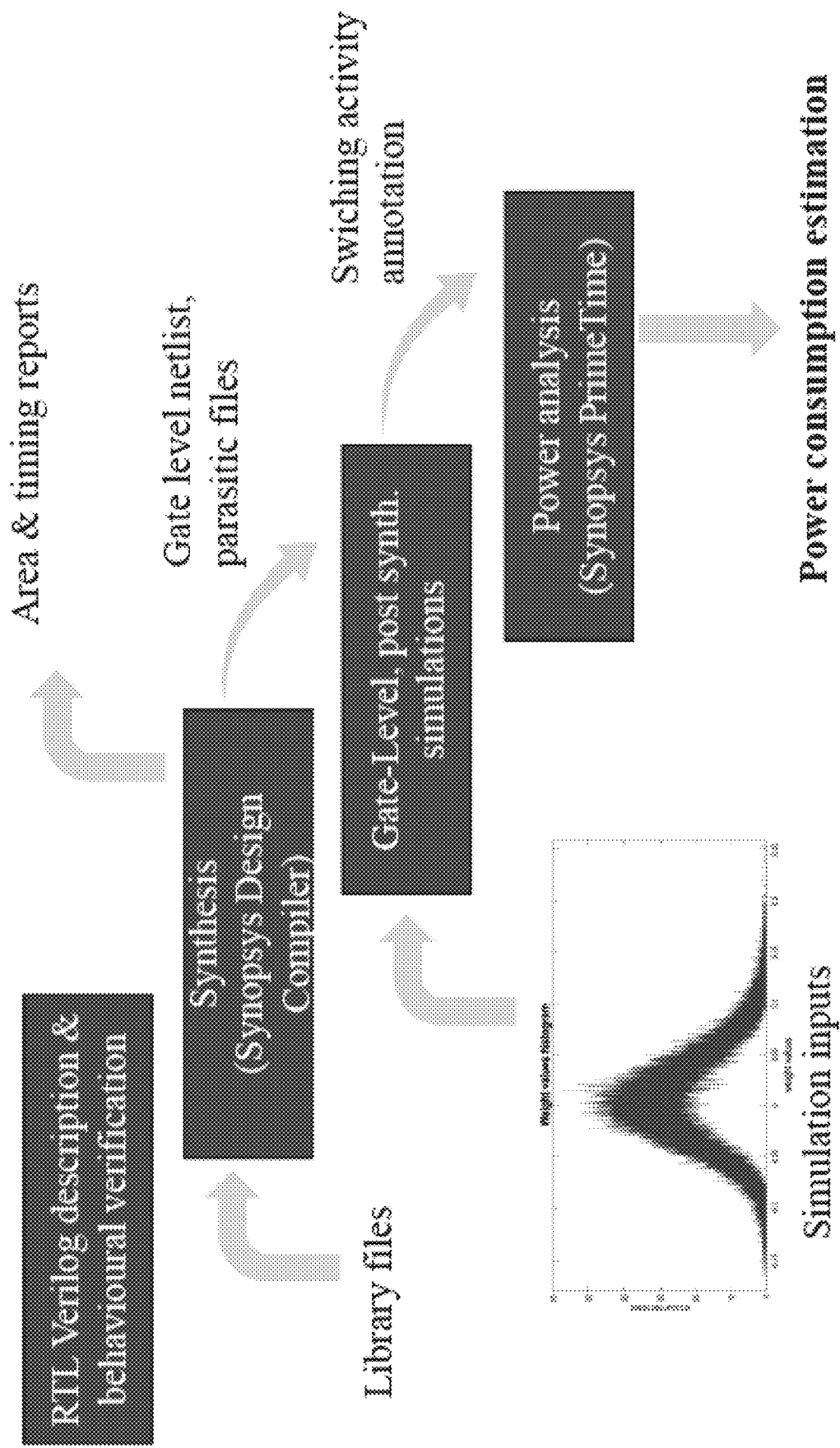
FIG. 46 is a schematic presentation of the use of the histogram of FIG. 45 within a greater design flow context, in accordance with techniques presented herein.

FIG. 45 depicts a histogram containing the weight values occurrences of a trained SqueezeNet CNN convolutional layer, as was used as an approximation of the weight values probability mass function. In order to generate inputs for the gate-level simulation and switching activity annotation, therefore, the corresponding CDF was derived. The input weight samples were then derived according to the procedure described above. In addition to the histogram itself, a schematic presentation of the use of the histogram within a greater design flow context is provided in FIG. 46.

5.4 Power Analysis

Power analysis was performed using Synopsys Prime-Time. The tool was provided with several input files: the gate-level netlists of the designs, their parasitic files, the technology libraries and the VCD files. As already mentioned, the latter contain annotations of the switching activity during the gate-level simulations in which data generated as described herein were used as inputs. The first results obtained show a power consumption reduction of about the 38% for embodiments of the described architecture, compared to the reference one. This result is extremely positive and shows that the approach used to develop the described architecture is promising. However, further simulations and analyses may be carried out considering different convolutional layers and more extended input datasets in order to obtain a more precise and general estimation of the power consumption which can be achieved by the described structure when it is used for the acceleration of the inference step of CNNs.

6 Conclusions and Future Works

In the present disclosure, a MAC hardware unit based on digit-serial architectures was designed to accelerate the convolution operations utilized in the forward step of Convolutional Neural Networks. More in detail, one purpose of achieving a reduction in the power consumption associated with the mentioned convolution operations was pursued.

The first part of the work consisted of an introductory study of Convolutional Neural Networks, starting from the understanding of their possible applications and of the reasons for which both industries and academic institutions have such a widespread interest for them. It was evidenced that, currently, the main obstacle for an extensive use of neural networks in consumer and mobile applications is due to their high demand of computational power; the latter, indeed, makes their execution expensive in terms of costs and power consumption, if general purpose computation units are used. Therefore, using application specific hardware accelerators may be advantageous, and appropriate system architectures allowing their convenient use may be adopted.

As mentioned, a focus of the present disclosure regards the acceleration of the forward step of Convolutional Neural Networks.

The operation of serial architectures was also described and their features and the differences between bit-parallel, bit-serial and digit-serial architectures were detailed. This analysis showed the advantages of digit-serial architectures over bit-serial ones and motivated a deeper research of design techniques and examples of arithmetic units for the first class of architectures. The following phases of the work referred to these units and techniques in order to develop designs achieving the pursued goals.

To achieve the mentioned power consumption reduction, the gating technique along with the serial computation scheme are used to take advantage of a common pattern in the distribution of convolutional weights. As a result of the latter it was shown that, if a uniform quantization is used, most of the weight sample words present zero bits nibbles. Since in a serial computation scheme an operation is carried out in several consequent computation cycles, each processing a portion of the input sample words, serial multipliers can be gated in cycles when zero nibbles should be processed. Therefore, if the trained weight distributions of convolutional layers follow the mentioned pattern, this technique is expected to allow consistent power saving due to the large number of zero nibbles.

It was also shown that, in order to obtain further improvements from this approach, the multiplication step of the MAC operation may be implemented in sign and magnitude; therefore, some observations on how to implement coding conversion stages with least possible overhead were carried out. To implement the presented ideas, the major overhead is due to the timing and selection logic associated with serial architectures and to the modifications associated with multiplication unit in order to support shift operations in the gated cycles.

In embodiments based on serial architectures, one consideration was ease of integration in a bit-parallel stream computation architecture. This system level organization, indeed, is convenient and common in applications in which hardware accelerators are extensively used. Therefore, a MAC unit was developed which is based on digit-serial architectures but is suitable to replace a classic bit-parallel MAC unit requiring neither additional external control logic nor modifications of the input streams. To achieve this goal, the multiplier unit employed for the MAC operation was replicated according to the word-level unfolding method and a non-conventional accumulation architecture was developed. Efforts were made in order to reduce as much as possible the overhead due to the serial organization of the unit. Significant savings derived from a described reorganization of the memory containing trained weight values to be used by the digit-serial unit.

As a result, the obtained architecture loses a typical feature of digit-serial units which usually allow to trade speed with reduction of area occupation. On the other hand, in a steady-state operation condition, the developed MAC has same processing rate of a bit-parallel unit (1 word/clock cycle), but can work at higher clock frequencies due to its the smaller critical paths, similarly to a pipelined bit parallel implementation.

Furthermore, an embodiment of the developed unit has an advantage of being embeddable in already existing hardware accelerator framework IPs, without requiring modifications at a system level.

Finally, it can be pointed out that the developed architecture allows to amortise the timing logic overhead, allowing to share it between the several digit-serial units used in a single MAC architecture.

Results of embodiments created in accordance with techniques presented herein were compared with those obtained for a P+1 stages pipelined bit-parallel MAC architecture with the same input and output dimensions, used as reference model. Both units were implemented using the same technology libraries and timing constraints as specified herein. The obtained area reports show that the area occupation of the described structure is 6% bigger than the one of the reference model. This increase in area occupation may be explained with the overhead of logic already described above.

Obtained results show that the described architecture is a valid solution to obtain power consumption reduction in situations in which the considered distribution of the convolutional weighs is observed and a slight increase in area occupation can be tolerated. However, further simulations on more extended datasets and on several convolutional layers of different networks may be carried out in order to increase precision when estimating the power consumption which can be achieved by the described architecture in real applications.

Figure 48:
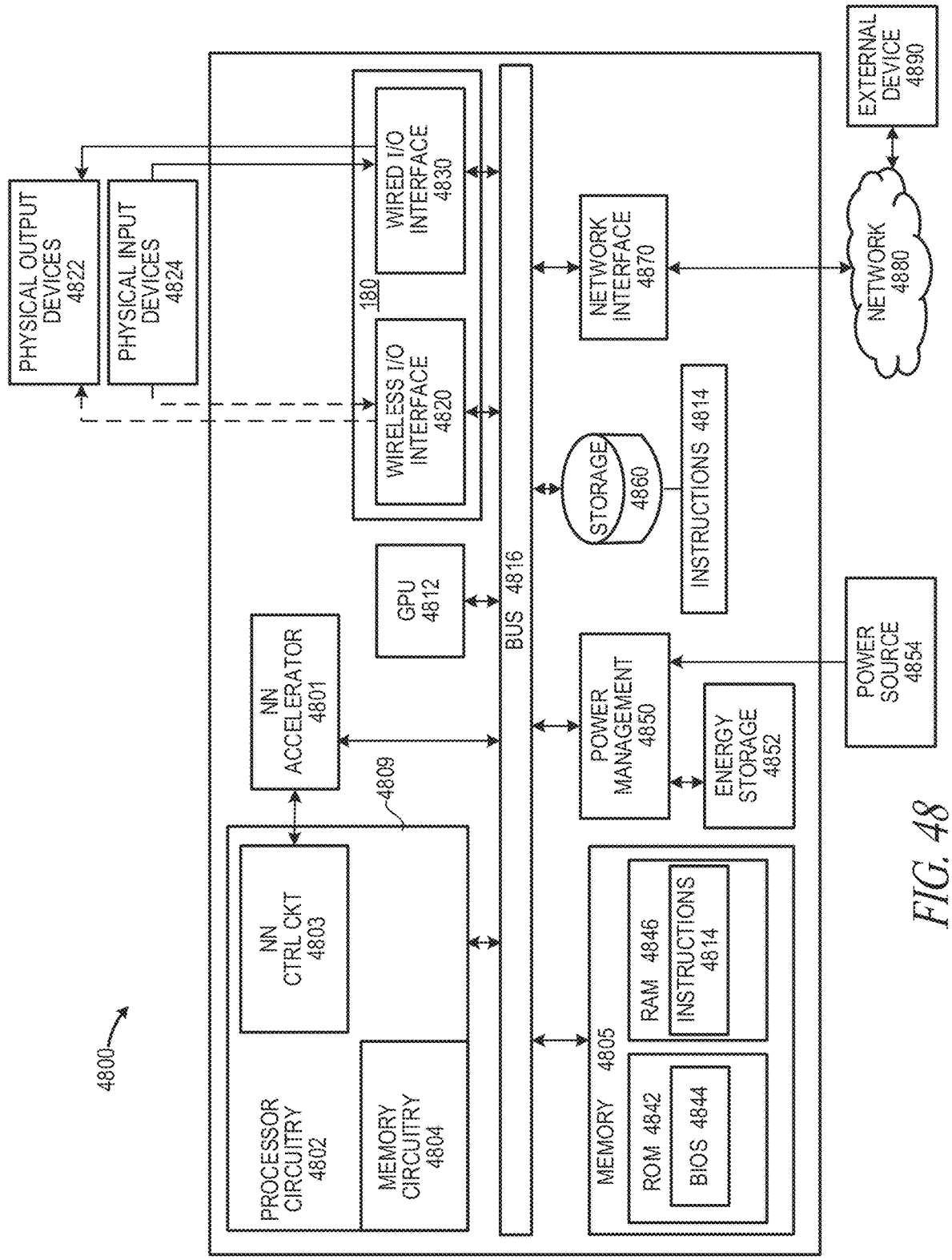
FIG. 48 is a schematic diagram of an exemplary electronic processor-based device that includes a neural network accelerator subsystem in accordance with techniques described herein.

FIG. 48 is a schematic diagram of an exemplary electronic processor-based device 4800 that includes a neural network accelerator subsystem 4801 in accordance with techniques described herein. In the depicted embodiment, a semiconductor package 4809 includes processor circuitry 4802 and on-chip processor memory circuitry 4804 (e.g., SRAM memory such as cache memory circuitry or LLC memory circuitry) configurable to provide neural network control circuitry 4803 capable of performing operations to provide a neural network (such as a CNN, DCNN, ANN, or other neural network) in conjunction with the neural network accelerator 4801. In the depicted embodiment, the processor-based device 4800 additionally includes the following: a graphical processing unit 4812, a wireless input/output (I/O) interface 4820, a wired I/O interface 4830, system memory 4805, power management circuitry 4850, a non-transitory storage device 4860, and a network interface 4870. The following discussion provides a brief, general description of the components forming the illustrative processor-based device 4800. As a non-limiting example, the processor-based device 4800 may comprise: a smartphone or other mobile computing device, wearable computer, portable computing device, handheld computing device, desktop computing device, server, blade server device, workstation, etc.

In at least the depicted embodiment, the processor-based device 4800 includes graphics processor circuitry 4812 capable of executing machine-readable instruction sets and generating an output signal capable of providing a display output to a system user. Those skilled in the relevant art will appreciate that the illustrated embodiments as well as other embodiments may be practiced with other processor-based device configurations, including portable electronic or handheld electronic devices such as smartphones, portable computers, wearable computers, consumer electronics, personal computers ("PCs"), network PCs, minicomputers, server blades, mainframe computers, and the like. The processor circuitry 4802 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 4800 includes a bus or similar communications link 4816 that communicatively couples and facilitates the exchange of information and/or data between various system components including the processor circuitry 120, the graphics processor circuitry 4812, one or more wireless I/O interfaces 4820, one or more wired I/O interfaces 4830, the system memory 4805, one or more storage devices 4860, and/or one or more network interfaces 4870. It will be appreciated that although the processor-based device 4800 may be referred to herein as a singular device, this is not intended to limit the embodiments to a single processor-based device 4800; in certain embodiments, there may be more than one processor-based device 4800 that incorporates, includes, or contains any number of communicatively coupled, collocated, or remote networked circuits or devices.

The processor circuitry 4802 may include any number, type, or combination of currently available or future developed devices capable of executing machine-readable instruction sets. The processor circuitry 4802 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 48 will be readily apprehended by those skilled in the relevant art, and need not be described in further detail herein. The bus 4816 that interconnects at least some of the components of the processor-based device 4800 may employ any currently available or future developed serial or parallel bus structures or architectures.

In embodiments, the processor circuitry 4802 and the on-chip processor memory circuitry 4804 are disposed in a semiconductor package 4809. The semiconductor package 4809 may additionally include the neural network control circuitry 4803. In some implementations, the processor circuitry 4802 may provide all or a portion of either or both the neural network control circuitry 4803.

The system memory 4805 may include read-only memory ("ROM") 4842 and random access memory ("RAM") 4846. A portion of the ROM 4842 may be used to store or otherwise retain a basic input/output system ("BIOS") 4844. The BIOS 4844 provides basic functionality to the processor-based device 4800, for example by causing the processor circuitry 4802 to load and/or execute one or more machine-readable instruction sets 4814. In embodiments, at least some of the one or more machine-readable instruction sets may cause at least a portion of the processor circuitry 4802 to provide, create, produce, transition, and/or function as a dedicated, specific, and particular machine including, as non-limiting examples: a word processing machine, a digital image acquisition machine, a media playing machine, a gaming system, a communications device, a smartphone, or other dedicated machines.

The processor-based device 4800 may include at least one wireless input/output (I/O) interface 4820. The at least one wireless I/O interface 4820 may be communicatively coupled to one or more physical output devices 4822 (tactile devices, video displays, audio output devices, hardcopy output devices, etc.). The at least one wireless I/O interface 4820 may communicatively couple to one or more physical input devices 4824 (pointing devices, touchscreens, keyboards, tactile devices, etc.). The wireless I/O interface 4820 may include one or more of any currently available or future developed wireless I/O interface, examples of which include but are not limited to a Bluetooth® interface, near field communication (NFC) interface, and the like.

The processor-based device 4800 may include one or more wired input/output (I/O) interfaces 4830. The at least one wired I/O interface 4830 may be communicatively coupled to one or more physical output devices 4822 (tactile devices, video displays, audio output devices, hardcopy output devices, etc.). The at least one wired I/O interface 4830 may be communicatively coupled to one or more physical input devices 224 (pointing devices, touchscreens, keyboards, tactile devices, etc.). The wired I/O interface 4830 may include any currently available or future developed I/O interface. Exemplary wired I/O interfaces include but are not limited to: universal serial bus (USB), IEEE 1394 ("FireWire"), and similar.

The processor-based device 4800 may include one or more communicatively coupled, non-transitory, data storage devices 4860. The data storage devices 4860 may include one or more hard disk drives (HDDs) and/or one or more solid-state storage devices (SSDs). The one or more data storage devices 4860 may include any current or future developed storage appliances, network storage devices, and/or systems. Non-limiting examples of such data storage devices 4860 may include any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 4860 may include one or more removable storage devices, such as one or more flash drives, flash memories, flash storage units, or similar appliances or devices capable of communicable coupling to and decoupling from the processor-based device 4800.

The one or more data storage devices 4860 may include interfaces or controllers (not shown) communicatively coupling the respective storage device or system to the bus 4816. The one or more data storage devices 4860 may store, retain, or otherwise contain machine-readable instruction sets, data structures, program modules, data stores, databases, logical structures, and/or other data useful to the processor circuitry 4802 and/or graphics processor circuitry 4812, and/or one or more applications executed on or by the processor circuitry 4802 and/or graphics processor circuitry 4812. In some instances, one or more data storage devices 4860 may be communicatively coupled to the processor circuitry 4802, for example via the bus 4816 or via one or more wired communications interfaces 4830 (e.g., Universal Serial Bus or USB); one or more wireless communications interfaces 4820 (e.g., Bluetooth®, Near Field Communication or NFC); and/or one or more network interfaces 4870 (IEEE 802.3 or Ethernet, IEEE 802.11, or WiFi®, etc.).

The processor-based device 4800 may include power management circuitry 4850 that controls one or more operational aspects of the energy storage device 4852. In embodiments, the energy storage device 4852 may include one or more primary (i.e., non-rechargeable) or secondary (i.e., rechargeable) batteries or similar energy storage devices. In embodiments, the energy storage device 4852 may include one or more supercapacitors or ultracapacitors. In embodiments, the power management circuitry 4850 may alter, adjust, or control the flow of energy from an external power source 4854 to the energy storage device 4852 and/or to the processor-based device 4800. The power source 4854 may include, but is not limited to, a solar power system, a commercial electric grid, a portable generator, an external energy storage device, or any combination thereof.

For convenience, the processor circuitry 4802, the storage device 4860, the system memory 170, the graphics processor circuitry 4812, the wireless I/O interface 4820, the wired I/O interface 4830, the power management circuitry 4850, and the network interface 4870 are illustrated as communicatively coupled to each other via the bus 4816, thereby providing connectivity between the above-described components. In alternative embodiments, the above-described components may be communicatively coupled in a different manner than illustrated in FIG. 48. For example, one or more of the above-described components may be directly coupled to other components, or may be coupled to each other, via one or more intermediary components (not shown). In another example, one or more of the above-described components may be integrated into the semiconductor package 4809 and/or the graphics processor circuitry 4812. In some embodiments, all or a portion of the bus 4816 may be omitted and the components are coupled directly to each other using suitable wired or wireless connections.

Figure 49:
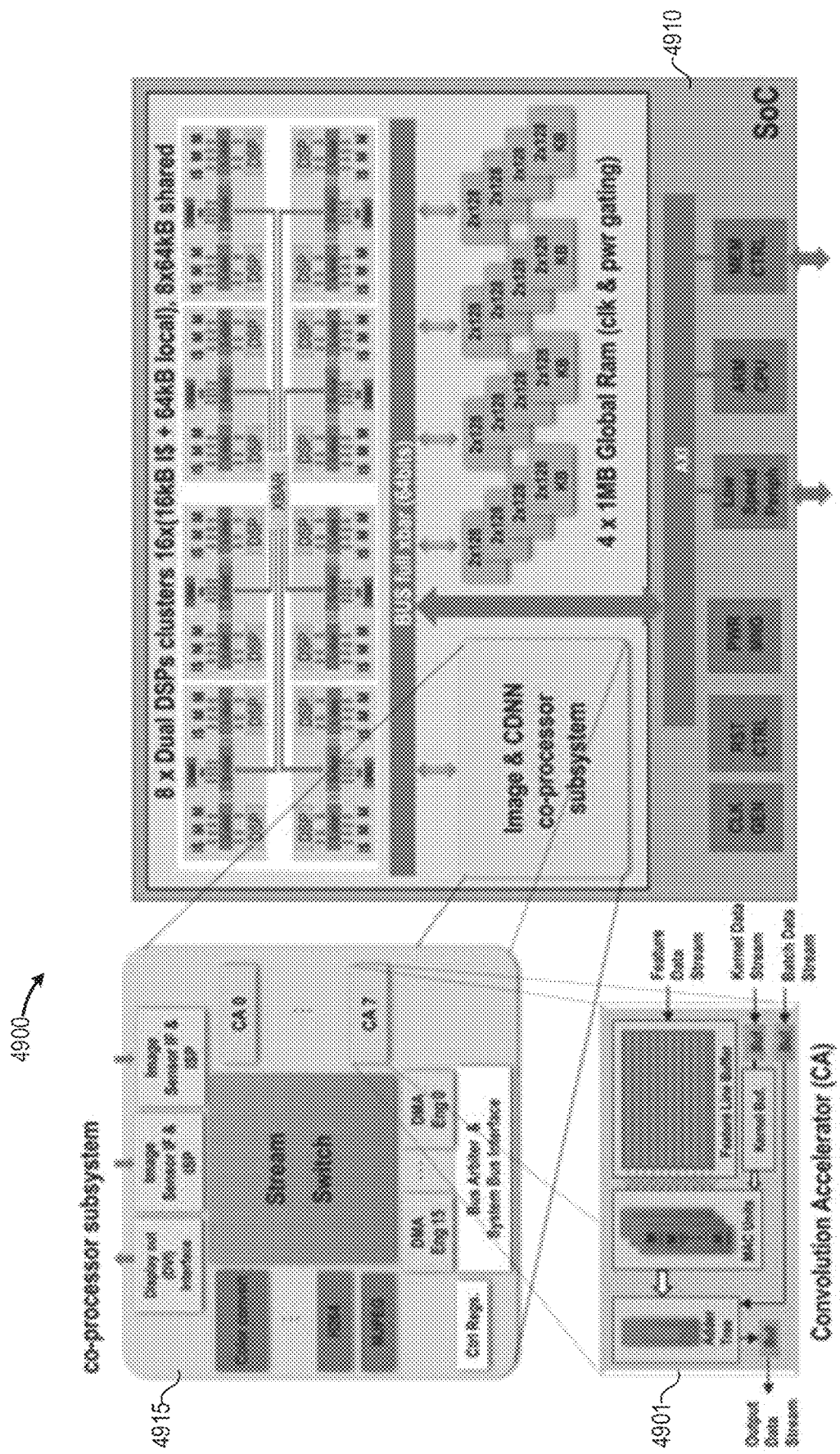
FIG. 49 depicts an embodiment of a processor-based device in which a convolution accelerator operates in conjunction with a system-on-chip and a coupled co-processor subsystem to provide an accelerated neural network in accordance with one or more techniques presented herein.

FIG. 49 depicts an embodiment of a processor-based device 4900, in which a hardware-based convolution accelerator 4901 operates in conjunction with a system-on-chip (SOC) 4910 and a co-processor subsystem 4915 to provide and accelerate a neural network in accordance with one or more techniques presented herein.

The various embodiments described above and in the Appendixes can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
an addressable memory array;
one or more processing cores; and
an accelerator framework including a plurality of Multiply ACcumulate (MAC) hardware accelerators, wherein a MAC hardware accelerator of the plurality of MAC hardware accelerators, in operation, multiplies an input weight having a plurality of digits by an input feature by sequentially multiplying individual digits of the plurality of digits of the input weight by the input feature, wherein the system comprises pre-processing logic, which, in operation, controls gating of multipliers of the MAC hardware accelerators.

2. The system of claim 1, comprising pre-processing logic that, in operation, controls gating of multipliers of the MAC hardware accelerators.

3. The system of claim 1, wherein the pre-processing logic includes passive selection logic within one or more gating circuits.

4. The system of claim 3, wherein a gating circuit of the one or more gating circuits includes an OR gate, a flip-flop, and an AND gate that are serially coupled to control a clock of a digit-serial multiplier unit within one of the MAC hardware accelerators.

5. The system of claim 1, wherein the controlling the gating of a multiplier of a MAC hardware accelerator of the plurality of MAC hardware accelerators comprises:
detecting zero-value digits of weight inputs to the multiplier; and
gating the multiplier of the MAC hardware accelerator in response to detection of a zero-value digit weight input to the multiplier.

6. The system of claim 1, wherein the individual digits of the input weight are stored in a sign and magnitude coding format.

7. A system, comprising:
an addressable memory array;
one or more processing cores; and
an accelerator framework including a plurality of Multiply ACcumulate (MAC) hardware accelerators, wherein a MAC hardware accelerator of the plurality of MAC hardware accelerators, in operation, multiplies an input weight having a plurality of digits by an input feature by sequentially multiplying individual digits of the plurality of digits of the input weight by the input feature, wherein a MAC hardware accelerator of the plurality of MAC hardware accelerators has a number P of digit-serial multipliers, and, in operation, the P digit-serial multipliers produce one W-bit by W-bit multiplication result in a clock cycle, wherein W and P are integers greater than 1.

8. The system of claim 7, wherein the MAC hardware accelerator comprises accumulation circuitry and timing control circuitry, and the timing control circuitry, in operation, controls data flow between the P digit-serial multipliers and the accumulation circuitry of the MAC hardware accelerator.

9. The system of claim 8, wherein the accelerator framework, in operation, controls data flow to the plurality of MAC hardware accelerators to synchronize operation of the plurality of MAC hardware accelerators.

10. A system, comprising:
an addressable memory array;
one or more processing cores; and
an accelerator framework including a plurality of Multiply ACcumulate (MAC) hardware accelerators, wherein a MAC hardware accelerator of the plurality of MAC hardware accelerators, in operation, multiplies an input weight having a plurality of digits by an input feature by sequentially multiplying individual digits of the plurality of digits of the input weight by the input feature, wherein the MAC hardware accelerators, in operation, perform one or more multiplication operations via sign-magnitude coding.

11. The system of claim 10, wherein the MAC hardware accelerators, in operation, convert an output of at least one multiplication operation of the one or more multiplication operations to 2's complement prior to an accumulation step associated with the at least one multiplication operation.

12. A system, comprising:
an addressable memory array;
one or more processing cores; and
an accelerator framework including a plurality of Multiply ACcumulate (MAC) hardware accelerators, wherein a MAC hardware accelerator of the plurality of MAC hardware accelerators, in operation, multiplies an input weight having a plurality of digits by an input feature by sequentially multiplying individual digits of the plurality of digits of the input weight by the input feature, wherein the individual digits of the input weight are stored in a series of words of the memory array.

13. The system of claim 12, wherein a word in the series of words stores digits of a plurality of different input weights.

14. A mobile computing device, comprising:
an imaging sensor that captures images; and
processing circuitry, which, in operation, implements a deep convolutional neural network, the processing circuitry including:
a memory; and
an accelerator framework coupled to the memory, the accelerator framework including a plurality of Multiply ACcumulate (MAC) hardware accelerators, which, in operation, multiply an input weight having a plurality of digits by an input feature by sequentially multiplying individual digits of the plurality of digits of the input weight by the input feature.

15. The mobile computing device of claim 14, comprising pre-processing logic, which, in operation, controls gating of multipliers of the MAC hardware accelerators.

16. The mobile computing device of claim 15, wherein the controlling the gating of a multiplier of a MAC hardware accelerator of the plurality of MAC hardware accelerators comprises:
  detecting zero-value digits of weight inputs to the multiplier; and
  gating the multiplier of the MAC hardware accelerator in response to detection of a zero-value digit weight input to the multiplier.

17. The mobile computing device of claim 14, wherein a MAC hardware accelerator of the plurality of MAC hardware accelerators has a number P of digit-serial multipliers, and, in operation, the P digit-serial multipliers produce one W-bit by W-bit multiplication result in a clock cycle, wherein W and P are integers greater than 1.

18. The mobile computing device of claim 14, wherein the individual digits of the input weight are stored in a series of words of the memory.

19. A method, comprising:
  performing a plurality of multiply accumulate operations using a plurality of Multiply ACcumulate (MAC) hardware accelerators of an accelerator framework, wherein the MAC hardware accelerators multiply a digit-serial input having a plurality of digits by a parallel input having a plurality of bits by sequentially multiplying individual digits of the digit-serial input by the plurality of bits of the parallel input; and
  generating an output based on results of the plurality of multiple accumulate operations, wherein the performing the plurality of multiple accumulate operations includes controlling gating of multipliers of the MAC hardware accelerators using pre-processing logic of the accelerator framework.

20. The method of claim 19, comprising:
  gating a multiplier of a MAC hardware accelerator of the plurality of MAC hardware accelerators in response to detecting a zero-value input digit to the multiplier.

21. The method of claim 19, comprising:
  storing the individual digits of the digit-serial input in a series of words of a memory.

22. The method of claim 21, wherein a word in the series of words stores digits of a plurality of different digit-serial inputs.

23. A Multiple Accumulate (MAC) hardware accelerator, comprising:
  a plurality of multipliers, which, in operation, multiply a digit-serial input having a plurality of digits by a parallel input having a plurality of bits by sequentially multiplying individual digits of the digit-serial input by the plurality of bits of the parallel input; and
  circuitry coupled to the plurality of multipliers, wherein the circuitry, in operation, outputs a result based on the multiplication of the digit-serial input by the parallel input.

24. The MAC hardware accelerator of claim 23, comprising pre-processing logic that, in operation, controls gating of the plurality of multipliers.

25. The MAC hardware accelerator of claim 24, wherein the pre-processing logic includes an OR gate, a flip-flop, and an AND gate that are serially coupled to control a clock of a multiplier of the plurality of multipliers.

26. The MAC hardware accelerator of claim 24, wherein the pre-processing logic, in operation:
  detects zero-value digits input to a multiplier of the plurality of multipliers; and
  gates the multiplier in response to detection of a zero-value digit input to the multiplier.

27. The MAC hardware accelerator of claim 23, wherein the plurality of multipliers produce one W-bit by W-bit multiplication result in a clock cycle, wherein W is an integer greater than 1.

28. The MAC hardware accelerator of claim 27, wherein the MAC hardware accelerator comprises accumulation circuitry and timing control circuitry, and the timing control circuitry, in operation, controls data flow between the P digit-serial multipliers and the accumulation circuitry of the MAC hardware accelerator.

\* \* \* \* \*